(12) United States Patent
Hausman et al.

(10) Patent No.: US 12,435,157 B2
(45) Date of Patent: Oct. 7, 2025

(54) METHODS OF USING A BISPECIFIC ANTIGEN-BINDING CONSTRUCT TARGETING HER2 FOR THE TREATMENT OF BILIARY TRACT CANCERS

(71) Applicant: ZYMEWORKS BC INC., Vancouver (CA)

(72) Inventors: Diana F. Hausman, Seattle, WA (US);
Neil C. Josephson, Seattle, WA (US);
Rose Kamyee Lai, Seattle, WA (US);
Gerald James Rowse, Vancouver (CA);
Patrick Kaminker, Seattle, WA (US)

(73) Assignee: ZYMEWORKS BC INC., Vancouver (CA)

( * ) Notice: Subject to any disclaimer, the term of this patent is extended or adjusted under 35 U.S.C. 154(b) by 993 days.

(21) Appl. No.: 17/530,775

(22) Filed: Nov. 19, 2021

(65) Prior Publication Data
US 2022/0133903 A1 May 5, 2022

Related U.S. Application Data

(63) Continuation of application No. PCT/US2019/035042, filed on May 31, 2019.

(51) Int. Cl.
*C07K 16/32* (2006.01)
*A61K 31/7068* (2006.01)
(Continued)

(52) U.S. Cl.
CPC .......... *C07K 16/32* (2013.01); *A61K 31/7068* (2013.01); *A61K 33/243* (2019.01);
(Continued)

(58) Field of Classification Search
CPC ................ C07K 16/32; C07K 2317/51; C07K 2317/515; C07K 2317/24;
(Continued)

(56) References Cited

U.S. PATENT DOCUMENTS

| | | | |
|---|---|---|---|
| 2015/0139936 A1 | 5/2015 | Frye et al. | |
| 2017/0291955 A1 | 10/2017 | Li et al. | |
| 2017/0355779 A1* | 12/2017 | Wickman | ........... A61K 47/6869 |

FOREIGN PATENT DOCUMENTS

| | | |
|---|---|---|
| JP | 2017-503480 A | 2/2017 |
| JP | 2017-512765 A | 5/2017 |

(Continued)

OTHER PUBLICATIONS

Harder J, Waiz O, Otto F, Geissler M, Olschewski M, Weinhold B, Blum HE, Schmitt-Graeff A, Opitz Og. EGFR and HER2 expression in advanced biliary tract cancer. World J Gastroenterol. Sep. 28, 2009;15(36):4511-7. doi: 10.3748/wjg. 15.4511. PMID: 19777609; PMCID: PMC2751995. (Year: 2009).*

(Continued)

*Primary Examiner* — Jeffrey Stucker
*Assistant Examiner* — Laura Ann Essex
(74) *Attorney, Agent, or Firm* — Ice Miller LLP

(57) ABSTRACT

Described herein is a method of treating biliary tract cancer (BTC) comprising administering a bispecific antigen-binding construct targeting HER2 or a bispecific antigen-binding construct targeting HER2 linked to an auristatin analogue (ADC) to a subject.

26 Claims, 2 Drawing Sheets

Specification includes a Sequence Listing.

(51) Int. Cl.
  *A61K 33/243* (2019.01)
  *A61K 39/00* (2006.01)
  *A61K 47/54* (2017.01)
  *A61K 47/68* (2017.01)
(52) U.S. Cl.
  CPC ...... *A61K 47/545* (2017.08); *A61K 47/68031* (2023.08); *A61K 47/6817* (2017.08); *A61K 47/6851* (2017.08); *A61K 39/00* (2013.01); *C07K 2317/51* (2013.01); *C07K 2317/515* (2013.01)
(58) Field of Classification Search
  CPC .......... C07K 2317/622; C07K 2317/64; C07K 2317/31; C07K 2317/34; A61K 31/7068; A61K 33/243; A61K 47/545; A61K 47/68031; A61K 47/6817; A61K 47/6851; A61K 39/00; A61K 45/06; A61K 47/6879; A61K 2039/505; A61K 2039/545; A61K 47/68; A61K 2300/00; A61P 1/16; A61P 35/00
  See application file for complete search history.

(56) References Cited

FOREIGN PATENT DOCUMENTS

| WO | WO 2009117277 A2 | 9/2009 |
|---|---|---|
| WO | WO 2015/077891 A1 | 6/2015 |
| WO | WO 2017/185177 A1 | 11/2017 |
| WO | WO 2019104075 A1 | 5/2019 |
| WO | WO 2020264208 A1 | 12/2020 |

OTHER PUBLICATIONS

Galdy S, Lamarca A, McNamara MG, Hubner RA, Cella CA, Fazio N, Valle Jw. HER2/HER3 pathway in biliary tract malignancies; systematic review and meta-analysis: a potential therapeutic target? Cancer Metastasis Rev. Mar. 2017;36(1):141-157. doi: 10.1007/s10555-016-9645-x. PMID: 27981460; PMC5385197 (Year: 2017).*
Anderson et al., "Diagnosis and treatment of cholangiocarcinoma", Oncologist. 2004;9(1):43-57.
Beeram et al., "Single Agent Activity of ZW25, a HER2-Targeted Bispecific Antibody, in HER2-Expressing Gastroesophageal and Other Cancers," Abstract, 30th EORTC-NCI-AACR Symposium, Dublin, Ireland, 1 page.
Beeram et al., "Single Agent Activity of ZW25, a HER2-Targeted Bispecific Antibody, in HER2-Expressing Gastroesophageal and Other Cancers," Oral Presentation, 30th EORTC-NCI-AACR Symposium, Dublin, Ireland, Nov. 14, 2018, 16 pages.
Benavides et al., "Biliary tract cancers: SEOM clinical guidelines", Clinical and Translational Oncology. 2015;17(12):982-7.
Benson et al., "Hepatobiliary Cancers. Version 2.2019, Featured Updated to the NCCN Guidelines", Journal of the National Comprehensive Cancer Network, Apr. 2019, 17(4), 9 pages.
Javle et al., "HER2/neu-directed therapy for biliary tract cancer", Journal of Hematology & Oncology, 2015, 8:58.
De Groen et al., "Biliary Tract Cancers", The new England Journal of Medicine, Oct. 1999, pp. 1368-1378.
Javle et al., "Pertuzumab and trastuzumab for HER2-positive, metastatic biliary tract cancer (MyPathway): a multicentre, open-label, phase 2a, multiple basket study", Lancet Oncol. Sep. 2021; 22(9):1290-300.
JP Office Action in Japanese Application No. 2021-570770, dated Aug. 2, 2023, 6 pages (with English translation).
JP Office Action in Japanese Application No. 2021-570770, dated Apr. 19, 2023, 16 pages (with English translation).
Kawamoto et al., "Overexpression and gene amplification of EGFR, HER2, and HER3 in biliary tract carcinomas, and the possibility for therapy with the HER2-targeting antibody pertuzumab", J Gastroenterol, 2015, 50: 467-479.
Meric-Bernstam et al., "Single Agent Activity of ZW25, a HER2 Targeted Bispecific Antibody, in Heavily Pretreated HER2 Expressing Cancers," Abstract, ASCO Annual Meeting, Chicago, IL; Jun. 1, 2018, 1 page.
Meric-Bernstam et al., "Single Agent Activity of ZW25, a HER2 Targeted Bispecific Antibody, in Heavily Pretreated HER2 Expressing Cancers," Oral Presentation, ASCO Annual Meeting, Chicago, IL; Jun. 1, 2018, 21 pages.
Meric-Bernstam et al., "Single-Agent Activity of ZW25, a HER2 Targeted Bispecific Antibody, in HER2 Expressing Gastroesophageal and Other Cancers," Abstract, Cholangiocarcinoma Foundation, Salt Lake City, Utah, 2 pages.
Meric-Bernstam et al., "Single-Agent Activity of ZW25, a HER2 Targeted Bispecific Antibody, in HER2 Expressing Gastroesophageal and Other Cancers," Poster, Cholangiocarcinoma Foundation, Jan. 30-Feb. 2, 2019, Salt Lake City, Utah, 1 page.
Nam et al., "Therapeutic implication of HER2 in advanced biliary tract cancer", Oncotarget. Sep. 6, 2016;7(36):58007-58021.
Sahu et al., "Targeted therapy in biliary tract cancers-current limitations and potentials in the future", J Gastrointest Oncol. 2017;8(2):324-336.
Shengnan et al., "Development and clinical application of anti-HER2 monoclonal and bispecific antibodies for cancer treatment", Exp Hematol Oncol. Nov. 28, 2017;6:31—eCollection 2017.
Siegel et al., "Cancer statistics, 2014", CA: A Cancer Journal for Clinicians. 2014;64(1):9-29.
Simile et al., "Targeted Therapies in Cholangiocarcinoma: Emerging Evidence from Clinical Trials", Medicina (Kaunas). Feb. 8, 2019; 55(2):42, 16 pages.
Yamashita-Kashima et al., "Molecular targeting of HER2-overexpressing biliary tract cancer cells with trastuzumab emtansine, an antibody-cytotoxic drug conjugate", Cancer Chemotherapy and Pharmacology, Jan. 2019, 83: 659-671.
Zymeworks Corporate Overview, Jun. 1, 2018, posted to https://ir.zymeworks.com/events-and-presentations, 26 pages.
Zymeworks Corporate Overview, Nov. 14, 2018, posted to https://ir.zymeworks.com/events-and-presentations, 27 pages.
Ho et al., "Biliopancreatic malignancy: future prospects for progress", Ann Oncol., 1999, Suppl 4, p. 300-304.
Kontermann, "Recombinant bispecific antibodies for cancer therapy", Acta Pharmacol Sin., Jan. 2005, 26(1): 1-9.
RU Office Action in Russian Application No. 2021136185, dated Oct. 20, 2023, 24 pages (with English translation).
Yu et al., "A novel asymmetrical anti-HER2/CD3 bispecific antibody exhibits potent cytotoxicity for HER2-positive tumor cells", J Exp Clin Cancer Res., 2019, 38(1): 355, 16 pages.

* cited by examiner

METHODS OF USING A BISPECIFIC ANTIGEN-BINDING CONSTRUCT TARGETING HER2 FOR THE TREATMENT OF BILIARY TRACT CANCERS

CROSS-REFERENCE TO RELATED APPLICATIONS

This application is a bypass continuation of International Application No. PCT/US2019/035042, filed May 31, 2019, which is herein incorporated in its entirety by reference.

SEQUENCE LISTING

The instant application contains a Sequence Listing which will be submitted via EFS-Web and is hereby incorporated by reference in its entirety. Said ASCII copy, created on Nov. 19, 2021, is named ZWI063WOUSCsequencelisting.txt, and is 99,000 bytes in size.

BACKGROUND

Biliary tract cancers (BTC), including gall bladder cancer and cholangiocarcinoma, are rare malignancies with poor prognosis. The estimated annual incidence is 10,650 cases in the US (Siegel R, Ma J, Zou Z, Jemal A. Cancer statistics, 2014. CA: A Cancer Journal for Clinicians. 2014; 64 (1): 9-29). Most BTCs are diagnosed at an advanced stage, and only about 25% are operable. The 5-year overall survival rate is less than 10% (Anderson C D, Pinson C W, Berlin J, Chari R S. Diagnosis and treatment of cholangiocarcinoma. Oncologist. 2004; 9 (1): 43-57; de Groen P C, Gores G J, LaRusso N F, Gunderson L L, Nagorney D M. Biliary Tract Cancers. N Engl J Med. 1999;341 (18): 1368-78). HER2 is overexpressed in 3-25% of biliary cancers (Benavides M, Antón A, Gallego J, Gómez MA, Jiménez-Gordo A, La Casta A, et al. Biliary tract cancers: SEOM clinical guidelines. Clinical and Translational Oncology. 2015;17 (12): 982-7).

First-line treatment options for inoperable BTC include systemic chemotherapy (gemcitabine plus cisplatin, which improves overall survival compared to gemcitabine alone [11.7 months vs. 8.1 months, respectively]). Alternative first-line treatments include pembrolizumab for MSI-H/dMMR tumors, fluoropyrimidine-based chemoradiation, radiotherapy without additional chemotherapy, investigational agents, or best supportive care. There is a lack of supporting evidence for second-line chemotherapy in BTC and clinical trials are recommended (NCCN Clinical Practice Guidelines: Hepatobiliary Cancers. Version 2.2019).

There remains a need for treatments for biliary tract cancers.

International Patent Publication No. WO2015/077891 describes bispecific anti-HER2 antibodies directed against two distinct HER2 epitopes in ECD4 and ECD2, the same epitopes bound by trastuzumab and pertuzumab.

SUMMARY

Described herein are methods of using a bispecific antigen-binding construct targeting HER2 for the treatment of biliary tract cancers. In one aspect of the present disclosure there is provided a method of treating a subject with biliary tract cancer (BTC) comprising administering an effective amount of a bispecific anti-HER2 antigen-binding construct or antibody drug conjugate (ADC) to the subject.

In some embodiments, the BTC is resectable, partially resectable, or unresectable.

In some embodiments, the BTC is advanced.

In some embodiments, the BTC is HER2 3+, HER2 2+, or HER2 1+as measured by immunohistochemistry (IHC) and gene amplified.

In some embodiments, the BTC is HER2 3+, HER2 2+, or HER2 1+as measured by immunohistochemistry (IHC), without HER2 gene amplification.

In some embodiments, the BTC is gall bladder cancer.

In some embodiments, the BTC is cholangiocarcinoma (CCA).

In some embodiments, the bispecific anti-HER2 antigen-binding construct comprises a heavy chain H1, a heavy chain H2, and a light chain L1, wherein: a) heavy chain H1 comprises the CDR sequences set forth in SEQ ID NO:39, SEQ ID NO:40, and SEQ ID NO: 41; b) heavy chain H2 comprises the CDR sequences set forth in SEQ ID NO:67, SEQ ID NO: 68, SEQ ID NO:69, SEQ ID NO:70, SEQ ID NO:71, and SEQ ID NO: 72; and c) heavy chain L1 comprises the CDR sequences set forth in SEQ ID NO:27, SEQ ID NO:28, and SEQ ID NO: 29.

In some embodiments, the bispecific anti-HER2 antigen-binding construct comprises a heavy chain H1 comprising the amino acid sequence set forth in SEQ ID NO:36, a heavy chain H2 comprising the amino acid sequence set forth in SEQ ID NO:63, and a light chain L1 comprising the amino acid sequence set forth in SEQ ID NO:24.

In some embodiments, the effective amount of the bispecific anti-HER2 antigen-binding construct is 10 mg/kg per week.

In some embodiments, the effective amount of the bispecific anti-HER2 antigen-binding construct is 20 mg/kg every two weeks.

In some embodiments, the effective amount of the bispecific anti-HER2 antigen-binding construct is 30 mg/kg every three weeks.

In some embodiments, administering the bispecific anti-HER2 antigen-binding construct to the subject results in a complete response (CR), partial response (PR) or stable disease (SD) in the subject.

In some embodiments, the disease control rate in a group of subjects treated with the bispecific anti-HER2 antigen-binding construct is greater than 60%, 70%, or 80%.

In some embodiments, the overall response rate in a group of subjects treated with the bispecific anti-HER2 antigen-binding construct is greater than 50%, 60%, 70%, or 80%.

In some embodiments, the bispecific anti-HER2 antigen-binding construct is administered following at least one, two, or three first-line therapies.

In some embodiments, the bispecific anti-HER2 antigen-binding construct is administered as a first-line monotherapy.

In some embodiments, the bispecific anti-HER2 antigen-binding construct is administered as an adjuvant therapy or a neoadjuvant therapy.

In some embodiments, the bispecific anti-HER2 antigen-binding construct is administered in conjunction with one or more chemotherapeutic agents.

In some embodiments, the one or more chemotherapeutic agents is gemcitabine and/or cisplatin.

In another aspect of the present disclosure there is provided a use of a bispecific anti-HER2 antigen-binding construct or antibody drug conjugate (ADC) in the preparation of a medicament for the treatment of biliary tract cancer (BTC).

In yet another aspect of the present disclosure there is provide a use of an effective amount of the bispecific anti-HER2 antigen-binding construct or ADC for the treatment of BTC in a subject.

DETAILED DESCRIPTION

Figure 1:
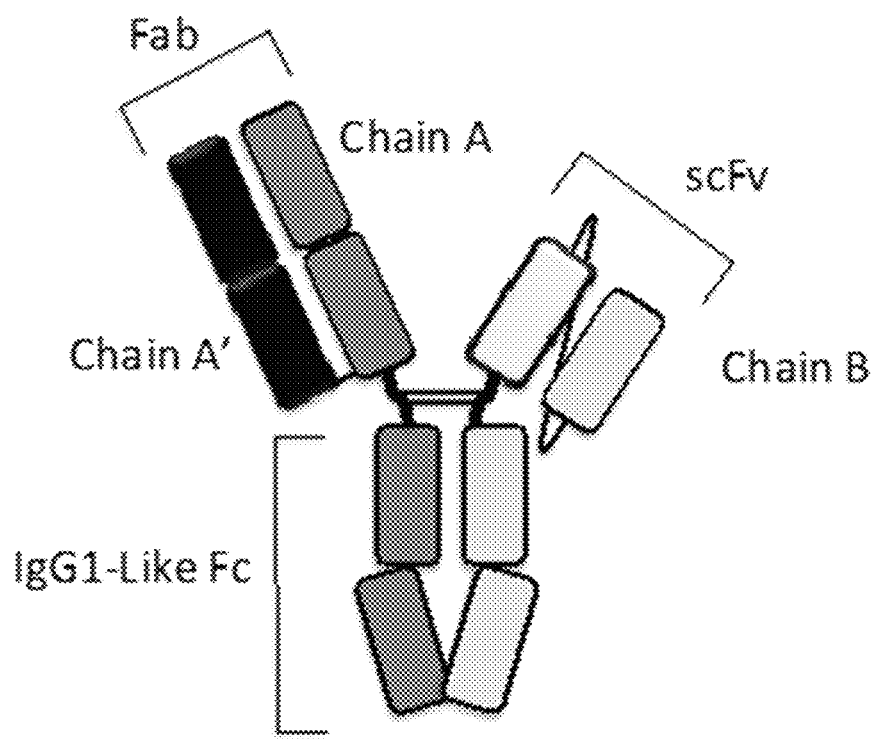
FIG. 1 depicts a representation of an exemplary bispecific anti-HER2 antigen-binding construct in a Fab/scFv format.

Described herein is a method of treating biliary tract cancer (BTC) in a subject comprising administering a bispecific antigen-binding construct targeting HER2 to the patient. In some embodiments, the bispecific antigen-binding construct targeting HEER2 is linked to an auristatin analogue (referred to herein as an antibody-drug conjugate or ADC). In some embodiments, the bispecific antigen-binding construct targeting HER2 may be used in a method of treating gall bladder cancer or cholangiocarcinoma. In other embodiments, the bispecific antigen-binding construct targeting HER2, when administered to a subject with BTC may result in a decrease in the size of tumors or lesions in the subject. In yet other embodiments, administration of the bispecific antigen-binding construct targeting HER2 may result in a complete response (CR), partial response (PR) or stable disease (SD) in a subject as measured by RECIST 1.1 guidelines.

Also described herein is a method of treating BTC comprising administering a bispecific antigen-binding construct targeting HER2 to a subject in conjunction with one or more chemotherapeutic agents.

Definitions

Unless defined otherwise, all technical and scientific terms used herein have the same meaning as commonly understood by one of ordinary skill in the art.

As used herein, the term "about" refers to an approximately +/−10% variation from a given value, unless otherwise indicated. It is to be understood that such a variation is always included in any given value provided herein, whether or not it is specifically referred to.

The use of the word "a" or "an" when used herein in conjunction with the term "comprising" may mean "one," but it is also consistent in certain embodiments with the meaning of "one or more," "at least one" or "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, use or method, denotes that additional elements and/or method steps may be present, but that these additions do not materially affect the manner in which the recited composition, method or use functions. The term "consisting of" when used herein in connection with a composition, use or method, excludes the presence of additional elements and/or method steps. A composition, use or method described herein as comprising certain elements and/or steps may also, in certain embodiments consist essentially of those elements and/or steps, and in other embodiments consist of those elements and/or steps, whether or not these embodiments are specifically referred to.

It is contemplated that any embodiment discussed herein can be implemented with respect to any method, use or composition disclosed herein.

Particular features, structures and/or characteristics described in connection with an embodiment disclosed herein may be combined with features, structures and/or characteristics described in connection with another embodiment disclosed herein in any suitable manner to provide one or more further embodiments.

It is also to be understood that the positive recitation of a feature in one embodiment, serves as a basis for excluding the feature in an alternative embodiment. For example, where a list of options is presented for a given embodiment or claim, it is to be understood that one or more option may be deleted from the list and the shortened list may form an alternative embodiment, whether or not such an alternative embodiment is specifically referred to.

Bispecific Antigen-Binding Constructs that Bind HER2

Bispecific antigen-binding constructs that bind HER2 (also referred to as bispecific anti-HER2 antigen-binding constructs) are described below.

The term "antigen-binding construct" refers to an agent, e.g., polypeptide or polypeptide complex capable of binding to an antigen. In some aspects an antigen-binding construct is a polypeptide that specifically binds to an antigen of interest. An antigen-binding construct can be a monomer, dimer, multimer, a protein, a peptide, or a protein or peptide complex; an antibody, an antibody fragment, or an antigen-binding fragment thereof; an scFv and the like. An antigen-binding construct can be a polypeptide construct that is monospecific, bispecific, or multispecific. In some aspects, an antigen-binding construct can include, e.g., one or more antigen-binding components (e.g., Fabs or scFvs) linked to one or more Fc. Further examples of antigen-binding constructs are described below and provided in the Examples.

The term "bispecific" is intended to include any agent, e.g., an antigen-binding construct, which has two antigen-binding moieties (e.g. antigen-binding polypeptide constructs), each with a unique binding specificity. For example, a first antigen-binding moiety binds to an epitope on a first antigen, and a second antigen-binding moiety binds to an epitope on a second antigen. The term "biparatopic" as used herein, refers to a bispecific antibody where the first antigen-binding moiety and the second antigen-binding moiety bind to different epitopes on the same antigen. A biparatopic bispecific antibody may bind to two epitopes on the same antigen molecule, or it may bind to epitopes on two different antigen molecules.

A monospecific antigen-binding construct refers to an antigen-binding construct with one binding specificity. In other words, both antigen-binding moieties bind to the same epitope on the same antigen. Examples of monospecific antigen-binding constructs include trastuzumab and pertuzumab, which bind to HER2.

An antigen-binding construct can be an antibody or antigen-binding portion thereof. As used herein, an "antibody" or "immunoglobulin" refers to a polypeptide substantially encoded by an immunoglobulin gene or immunoglobulin genes, or fragments thereof, which specifically bind and recognize an analyte (e.g., antigen). The recognized immunoglobulin genes include the kappa, lambda, alpha, gamma, delta, epsilon and mu constant region genes, as well as the myriad immunoglobulin variable region genes. Light chains are classified as either kappa or lambda. The "class" of an antibody or immunoglobulin refers to the type of constant domain or constant region possessed by its heavy chain. There are five major classes of antibodies: IgA, IgD, IgE, IgG, and IgM, and several of these may be further divided into subclasses (isotypes), e.g., IgG1, IgG2, IgG3, IgG4, IgA1, and IgA2. The heavy chain constant domains that correspond to the different classes of immunoglobulins are called α, δ, ε, γ, and μ, respectively.

An exemplary immunoglobulin (antibody) structural unit is composed of two pairs of polypeptide chains, each pair having one "light" (about 25 kD) and one "heavy" chain (about 50-70 kD). The N-terminal domain of each chain defines a variable region of about 100 to 110 or more amino acids primarily responsible for antigen recognition. The terms variable light chain (VL) and variable heavy chain (VH) refer to these light and heavy chain domains respectively. The $IgG_1$ heavy chain comprises of the VH, CH1, CH2 and CH3 domains respectively from the N to C-terminus. The light chain comprises of the VL and CL domains from N to C terminus. The $IgG_1$ heavy chain comprises a hinge between the CH1 and CH2 domains. In certain embodiments, the immunoglobulin constructs comprise at least one immunoglobulin domain from IgG, IgM, IgA, IgD, or IgE connected to a therapeutic polypeptide. In some embodiments, the immunoglobulin domain found in an antigen-binding construct provided herein, is from or derived from an immunoglobulin based construct such as a diabody, or a nanobody. In certain embodiments, the immunoglobulin constructs described herein comprise at least one immunoglobulin domain from a heavy chain antibody such as a camelid antibody. In certain embodiments, the immunoglobulin constructs provided herein comprise at least one immunoglobulin domain from a mammalian antibody such as a bovine antibody, a human antibody, a camelid antibody, a mouse antibody or any chimeric antibody.

A "complementarity determining region" or "CDR" is an amino acid sequence that contributes to antigen-binding specificity and affinity. "Framework" regions (FR) can aid in maintaining the proper conformation of the CDRs to promote binding between the antigen-binding region and an antigen. Structurally, framework regions can be located in antibodies between CDRs. The variable regions typically exhibit the same general structure of relatively conserved framework regions (FR) joined by three hyper variable regions, also known as CDRs. The CDRs from the variable domains of the heavy chain and light chain typically are aligned by the framework regions, which can enable binding to a specific epitope. From N-terminal to C-terminal, both light and heavy chain variable domains typically comprise the domains FR1, CDR1, FR2, CDR2, FR3, CDR3, and FR4. The assignment of amino acids to each domain is typically in accordance with the definitions of Kabat Sequences of Proteins of Immunological Interest (National Institutes of Health, Bethesda, Md. (1987 and 1991)), unless stated otherwise. Typically, there are three heavy chain and three light chain CDRs (or CDR regions) in the variable portion of an immunoglobulin. The three heavy chain CDRs are referred to herein as CDRH1, CDRH2, and CDRH3, while the three light chain CDRs are referred to as CDRL1, CDRL2, and CDRL3. Thus, "CDRs" as used herein may refer to all three heavy chain CDRs, or all three light chain CDRs (or both all heavy and all light chain CDRs, if appropriate). CDRs provide the majority of contact residues for the binding of the antibody to the antigen or epitope. Often, the three heavy chain CDRs and the three light chain CDRs are required to bind antigen. However, in some instances, even a single variable domain can confer binding specificity to the antigen. Furthermore, as is known in the art, in some cases, antigen-binding may also occur through a combination of a minimum of one or more CDRs selected from the VH and/or VL domains, for example CDRH3.

A number of different definitions of the CDR sequences are in common use, including those described by Kabat et al. (1983, Sequences of Proteins of Immunological Interest, NIH Publication No. 369-847, Bethesda, MD), by Chothia et al. (1987, J Mol Biol, 196:901-917), as well as the IMGT, AbM (University of Bath) and Contact (MacCallum R. M., and Martin A. C. R. and Thornton J. M, (1996), Journal of Molecular Biology, 262 (5), 732-745) definitions. By way of example, CDR definitions according to Kabat, Chothia, IMGT, AbM and Contact are provided in Table 1 below. Accordingly, as would be readily apparent to one skilled in the art, the exact numbering and placement of CDRs may differ based on the numbering system employed. However, it is to be understood that the disclosure herein of a VH includes the disclosure of the associated (inherent) heavy chain CDRs (HCDRs) as defined by any of the known numbering systems. Similarly, disclosure herein of a VL includes the disclosure of the associated (inherent) light chain CDRs (LCDRs) as defined by any of the known numbering systems.

TABLE 1

Common CDR Definitions[1]

| Defi- | Heavy Chain | | | Light Chain | | |
|---|---|---|---|---|---|---|
| nition | CDR1[2] | CDR2 | CDR3 | CDR1 | CDR2 | CDR3 |
| Kabat | H31-H35B | H50-H65 | H95-H102 | L24-L34 | L50-L56 | L89-L97 |
| Chothia | H26-H32, H33 or H34 | H52-H56 | H95-H102 | L24-L34 | L50-L56 | L89-L97 |
| IMGT | H26-H33, H34, H35, H35A or H35B | H51-H57 | H93-H102 | L27-L32 | L50-L52 | L89-L97 |
| AbM | H26-H35B | H50-H58 | H95-H102 | L24-L34 | L50-L56 | L89-L97 |
| Contact | H30-H35B | H47-H58 | H93-H101 | L30-L36 | L46-L55 | L89-L96 |

[1]Either the Kabat or Chothia numbering system may be used for HCDR2, HCDR3 and the light chain CDRs for all definitions except Contact, which uses Chothia numbering
[2]Using Kabat numbering. The position in the Kabat numbering scheme that demarcates the end of the Chothia and IMGT CDR-H1 loop varies depending on the length of the loop because Kabat places insertions outside of those CDR definitions at positions 35A and 35B. However, the IMGT and Chothia CDR-H1 loop can be unambiguously defined using Chothia numbering. CDR-H1 definitions using Chothia numbering: Kabat H31-H35, Chothia H26-H32, AbM H26-H35, IMGT H26-H33, Contact H30- H35.

As used herein, the term "single-chain" refers to a molecule comprising amino acid monomers linearly linked by peptide bonds. In certain embodiments, one of the antigen-binding polypeptide constructs is a single-chain Fv molecule (scFv). As described in more detail herein, an scFv has a variable domain of light chain (VL) connected from its C-terminus to the N-terminal end of a variable domain of heavy chain (VH) by a polypeptide chain. Alternatively, the scFv may be a polypeptide chain wherein the C-terminal end of the VH is connected to the N-terminal end of VL by a polypeptide chain.

Antigen-Binding Polypeptide Construct

The bispecific anti-HER2 antigen-binding construct comprises two antigen-binding polypeptide constructs that each bind to a particular domain or epitope of HER2. In one embodiment, each antigen-binding polypeptide construct binds to an extracellular domain of HER2, e.g., ECD2, or ECD4. The antigen-binding polypeptide construct can be, e.g., a Fab, or an scFv, depending on the application.

The format of the bispecific anti-HER2 antigen-binding construct determines the functional characteristics of the bispecific anti-HER2 antigen-binding construct. In one embodiment, the bispecific anti-HER2 antigen-binding construct has an scFv-Fab format (i.e. one antigen-binding polypeptide construct is an scFv and the other antigen-binding polypeptide construct is a Fab, also referred to as Fab-scFv format). In another embodiment, the bispecific anti-HER2 antigen-binding construct has an scFv-scFv format (i.e. both antigen-binding polypeptide constructs are scFvs).

The "Fab fragment" (also referred to as fragment antigen-binding) contains the constant domain (CL) of the light chain and the first constant domain (CH1) of the heavy chain along with the variable domains VL and VH on the light and heavy chains respectively. The variable domains comprise the complementarity determining loops (CDR, also referred to as hypervariable region) that are involved in antigen-binding. Fab' fragments differ from Fab fragments by the addition of a few residues at the carboxy terminus of the heavy chain CH1 domain including one or more cysteines from the antibody hinge region.

The "Single-chain Fv" or "scFv" includes the VH and VL domains of an antibody, wherein these domains are present in a single polypeptide chain. In one embodiment, the Fv polypeptide further comprises a polypeptide linker between the VH and VL domains which enables the scFv to form the desired structure for antigen-binding. For a review of scFv see Pluckthun in *The Pharmacology of Monoclonal Antibodies*, vol. 113, Rosenburg and Moore eds., Springer-Verlag, New York, pp. 269-315 (1994). HER2 antibody scFv fragments are described in WO93/16185; U.S. Pat. Nos. 5,571,894; and 5,587,458.

Format and Function of Antigen-binding Constructs

Provided herein are bispecific anti-HER2 antigen-binding constructs having two antigen-binding polypeptide constructs, the first of which specifically binds to HER2 ECD2, and the second of which specifically binds to HER2 ECD4. The format of the bispecific anti-HER2 antigen-binding construct is such that at least one of the first or the second antigen-binding polypeptide is an scFv. The format of the bispecific anti-HER2 antigen-binding construct may be scFv-scFv, or Fab-scFv or scFv-Fab (first antigen-binding polypeptide construct-second antigen-binding polypeptide respectively).

In certain embodiments, the bispecific anti-HER2 antigen-binding constructs exhibit anti-tumor activities in vitro, such as (i) the ability to inhibit cancer cell growth both in the presence or absence of stimulation by epidermal growth factor or heregulin, (ii) the ability to be internalized in cancer cells (through binding to the HER2 antigen and causing it to be internalized) and (iii) the ability to mediate antibody-directed effector cell killing (ADCC). These in vitro activities are observed both with the naked bispecific anti-HER2 antigen-binding construct, and with the bispecific anti-HER2 antigen-binding construct conjugated to an auristatin analogue, and at varying levels of HER2 expression (1+, 2+ and 3+).

The format (scFv/scFv, scFv/Fab or Fab/Fab) of the bispecific anti-HER2 antigen-binding constructs is important in determining its functional profile as described in International Patent Publication No. WO2015/077891. In certain embodiments, the anti-HER2 binding constructs exhibit an increased ability to be internalized by HER2-expressing tumor cells compared to a reference antigen-binding construct in which both the ECD2- and ECD4-binding polypeptide constructs are Fabs. It is contemplated that the degree of internalization of the bispecific anti-HER2 antigen-binding constructs can be further improved by increasing the affinity of one or both antigen-binding polypeptide construct for ECD2 or ECD4. In one embodiment in which the ECD2-binding polypeptide is a Fab and the ECD4-binding polypeptide is a scFv, the construct is internalized to a greater extent compared to constructs of equivalent affinity that have a Fab/Fab format, and is internalized to a similar extent as constructs of equivalent affinity that have a scFv/scFv format, by high and low HER2 expressing tumor cells. Embodiments that are readily internalized are good candidates for antibody-drug conjugates, which require internalization by a tumor cell to effect killing. Conversely, in certain embodiments, bispecific anti-HER2 antigen-binding constructs which are not as readily internalized exhibit an increased potency in ADCC killing of tumor cells that express low levels of HER2 compared to constructs of equivalent affinity that have a Fab/Fab format. In one embodiment, an bispecific anti-HER2 antigen-binding construct having a Fab/scFv format is more potent in ADCC killing of tumor cells expressing low levels of HER2 (HER2 0-1+ or 1+) than an anti-HER2 construct having a Fab/Fab format, which in turn is more potent than an bispecific anti-HER2 antigen-binding construct having a scFv/scFv format. The enhanced ADCC potency of some embodiments may be due to 1) their increased ability to avidly bind cells with low HER2 receptor density and subsequently to cluster the HER2 receptor on the target cell surface and mediate downstream cell-mediated killing; and/or 2) their increased ability to remain on the cell surface (rather than causing internalization); hence they are more available for cell-mediated effector killing.

HER2

The bispecific anti-HER2 antigen-binding constructs described herein comprise antigen-binding polypeptide constructs that bind to ECD2 and ECD4 of HER2.

The expressions "ErbB2" and "HER2" are used interchangeably herein and refer to human HER2 protein described, for example, in Semba et al., PNAS (USA) 82:6497-6501 (1985) and Yamamoto et al. Nature 319:230-234 (1986) (Genebank accession number X03363). The term "erbB2" and "neu" refers to the gene encoding human ErbB2 protein. p185 or p185neu refers to the protein product of the neu gene.

HER2 is a HER receptor. A "HER receptor" is a receptor protein tyrosine kinase which belongs to the human epidermal growth factor receptor (HER) family and includes EGFR, HER2, HER3 and HER4 receptors. A HER receptor will generally comprise an extracellular domain, which may bind an HER ligand; a lipophilic transmembrane domain; a conserved intracellular tyrosine kinase domain; and a carboxyl-terminal signaling domain harboring several tyrosine residues which can be phosphorylated. By "HER ligand" is meant a polypeptide which binds to and/or activates an HER receptor.

The extracellular (ecto) domain of HER2 comprises four domains, Domain I (ECD1, amino acid residues from about 1-195), Domain II (ECD2, amino acid residues from about 196-319), Domain III (ECD3, amino acid residues from about 320-488), and Domain IV (ECD4, amino acid residues from about 489-630) (residue numbering without signal peptide). See Garrett et al. *Mol. Cell.* 11:495-505 (2003), Cho et al. *Nature* 421:756-760 (2003), Franklin et al. *Cancer Cell* 5:317-328 (2004), Tse et al. Cancer Treat Rev. 2012

April; 38 (2): 133-42 (2012), or Plowman et al. *Proc. Natl. Acad. Sci.* 90:1746-1750 (1993).

The sequence of HER2 is as follows; ECD boundaries are Domain I: 1-165; Domain II: 166-322; Domain III: 323-488; Domain IV: 489-607.

(SEQ ID NO: 1)

```
  1  tqvctgtdmk  lrlpaspeth  ldmlrhlyqg  cqvvqgnlel  tylptnasls  flqdiqevqg 61  yvliahnqvr  qvplqrlriv  rgtqlfedny  alavldngdp  lnnttpvtga  spgglrelql 121  rslteilkgg  vliqrnpqlc  yqdtilwkdi  fhknnqlalt  lidtnrsrac  hpcspmckgs 181  rcwgessedc  qsltrtvcag  gcarckgplp  tdccheqcaa  gctgpkhsdc  laclhfnhsg 241  icelhcpalv  tyntdtfesm  pnpegrytfg  ascvtacpyn  ylstdvgsct  lvcplhnqev 301  taedgtqrce  kcskpcarvc  yglgmehlre  vravtsaniq  efagckkifg  slaflpesfd 361  gdpasntapl  qpeqlqvfet  leeitgylyi  sawpdslpdl  svfqnlqvir  grilhngays 421  ltlqglgisw  lglrslrelg  sglalihhnt  hlcfvhtvpw  dqlfrnphqa  llhtanrped 481  ecvgeglach  qlcarghcwg  pgptqcvncs  qflrgqecve  ecrvlqglpr  eyvnarhclp 541  chpecqpqng  svtcfgpead  qcvacahykd  ppfcvarcps  gvkpdlsymp  iwkfpdeega 601  cqpcpin
```

The "epitope 2C4" is the region in the extracellular domain of HER2 to which the antibody 2C4 binds. Epitope 2C4 comprises residues from domain II in the extracellular domain of HER2. 2C4 and Pertuzumab bind to the extracellular domain of HER2 at the junction of domains I, II and III. Franklin et al. *Cancer Cell* 5:317-328 (2004). In order to screen for antibodies which bind to the 2C4 epitope, a routine cross-blocking assay such as that described in *Antibodies, A Laboratory Manual*, Cold Spring Harbor Laboratory, Ed Harlow and David Lane (1988), can be performed. Alternatively, epitope mapping can be performed to assess whether the antibody binds to the 2C4 epitope of HER2 using methods known in the art and/or one can study the antibody-HER2 structure (Franklin et al. *Cancer Cell* 5:317-328 (2004)) to see what domain(s) of HER2 is/are bound by the antibody.

The "epitope 4D5" is the region in the extracellular domain of HER2 to which the antibody 4D5 (ATCC CRL 10463) and Trastuzumab bind. This epitope is close to the transmembrane domain of HER2, and within Domain IV of HER2. To screen for antibodies which bind to the 4D5 epitope, a routine cross-blocking assay such as that described in *Antibodies, A Laboratory Manual*, Cold Spring Harbor Laboratory, Ed Harlow and David Lane (1988), can be performed. Alternatively, epitope mapping can be performed to assess whether the antibody binds to the 4D5 epitope of HER2 (e.g. any one or more residues in the region from about residue 529 to about residue 625, inclusive, see FIG. 1 of US Patent Publication No. 2006/0018899).

"Specifically binds", "specific binding" or "selective binding" means that the binding is selective for the antigen and can be discriminated from unwanted or non-specific interactions. The ability of an bispecific anti-HER2 antigen-binding construct to bind to a specific antigenic determinant can be measured either through an enzyme-linked immunosorbent assay (ELISA) or other techniques familiar to one of skill in the art, e.g. surface plasmon resonance (SPR) technique (analyzed on a BIAcore instrument) (Liljeblad et al, Glyco J 17, 323-329 (2000)), and traditional binding assays (Heeley, Endocr Res 28, 217-229 (2002)). In one embodiment, the extent of binding of an antigen-binding moiety to an unrelated protein is less than about 10% of the binding of the bispecific anti-HER2 antigen-binding construct to the antigen as measured, e.g., by SPR. In certain embodiments, an bispecific anti-HER2 antigen-binding construct that binds to the antigen, or an antigen-binding molecule comprising that antigen-binding moiety, has a dissociation constant ($K_D$) of <1 μM, <100 nM, <10 nM, <1 nM, <0.1 nM, <0.01 nM, or <0.001 nM (e.g. 10~8 M or less, e.g. from $10^{-8}$ M to $10^{-13}$ M, e.g., from $10^{-9}$ M to $10^{-13}$ M).

"Heregulin" (HRG) when used herein refers to a polypeptide encoded by the heregulin gene product as disclosed in U.S. Pat. No. 5,641,869 or Marchionni et al., Nature, 362:312-318 (1993). Examples of heregulins include heregulin-α, heregulin-β1, heregulin-β2 and heregulin-β3 (Holmes et al., Science, 256:1205-1210 (1992); and U.S. Pat. No. 5,641,869); neu differentiation factor (NDF) (Peles et al. Cell 69:205-216 (1992)); acetylcholine receptor-inducing activity (ARIA) (Falls et al. Cell 72:801-815 (1993)); glial growth factors (GGFs) (Marchionni et al., Nature, 362:312-318 (1993)); sensory and motor neuron derived factor (SMDF) (Ho et al. J. Biol. Chem. 270:14523-14532 (1995)); γ-heregulin (Schaefer et al. Oncogene 15:1385-1394 (1997)). The term includes biologically active fragments and/or amino acid sequence variants of a native sequence HRG polypeptide, such as an EGF-like domain fragment thereof (e.g. HRGB1177-244).

"HER activation" or "HER2 activation" refers to activation, or phosphorylation, of any one or more HER receptors, or HER2 receptors. Generally, HER activation results in signal transduction (e.g. that caused by an intracellular kinase domain of a HER receptor phosphorylating tyrosine residues in the HER receptor or a substrate polypeptide). HER activation may be mediated by HER ligand binding to a HER dimer comprising the HER receptor of interest. HER ligand binding to a HER dimer may activate a kinase domain of one or more of the HER receptors in the dimer and thereby results in phosphorylation of tyrosine residues in one or more of the HER receptors and/or phosphorylation of tyrosine residues in additional substrate polypeptides(s), such as Akt or MAPK intracellular kinases.

"Humanized" forms of non-human (e.g., rodent) antibodies are chimeric antibodies that contain minimal sequence derived from non-human immunoglobulin. For the most part, humanized antibodies are human immunoglobulins (recipient antibody) in which residues from a hypervariable region of the recipient are replaced by residues from a hypervariable region of a non-human species (donor antibody) such as mouse, rat, rabbit or nonhuman primate having the desired specificity, affinity, and capacity. In some instances, framework region (FR) residues of the human immunoglobulin are replaced by corresponding non-human residues. Furthermore, humanized antibodies may comprise residues that are not found in the recipient antibody or in the donor antibody. These modifications are made to further refine antibody performance. In general, the humanized antibody will comprise substantially all of at least one, and typically two, variable domains, in which all or substantially all of the hypervariable loops correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin. For further details, see Jones et al., Nature 321:522-525 (1986); Riechmann et al., Nature 332:323-329 (1988); and Presta, Curr. Op. Struct. Biol. 2:593-596 (1992).

Fc of Bispecific Anti-HER2 Antigen-Binding Constructs.

In some embodiments, the bispecific anti-HER2 antigen-binding constructs described herein comprise an Fc, e.g., a dimeric Fc.

The term "Fc domain" or "Fc region" herein is used to define a C-terminal region of an immunoglobulin heavy chain that contains at least a portion of the constant region. The term includes native sequence Fc regions and variant Fc regions. Unless otherwise specified herein, numbering of amino acid residues in the Fc region or constant region is according to the EU numbering system, also called the EU index, as described in Kabat et al, Sequences of Proteins of Immunological Interest, 5th Ed. Public Health Service, National Institutes of Health, Bethesda, MD, 1991. An "Fc polypeptide" of a dimeric Fc as used herein refers to one of the two polypeptides forming the dimeric Fc domain, i.e. a polypeptide comprising C-terminal constant regions of an immunoglobulin heavy chain, capable of stable self-association. For example, an Fc polypeptide of a dimeric IgG Fc comprises an IgG CH2 and an IgG CH3 constant domain sequence.

An Fc domain comprises either a CH3 domain or a CH3 and a CH2 domain. The CH3 domain comprises two CH3 sequences, one from each of the two Fc polypeptides of the dimeric Fc. The CH2 domain comprises two CH2 sequences, one from each of the two Fc polypeptides of the dimeric Fc.

In some aspects, the Fc comprises at least one or two CH3 sequences. In some aspects, the Fc is coupled, with or without one or more linkers, to a first antigen-binding polypeptide construct and/or a second antigen-binding polypeptide construct. In some aspects, the Fc is a human Fc. In some aspects, the Fc is a human IgG or IgG1 Fc. In some aspects, the Fc is a heterodimeric Fc. In some aspects, the Fc comprises at least one or two CH2 sequences.

In some aspects, the Fc comprises one or more modifications in at least one of the CH3 sequences. In some aspects, the Fc comprises one or more modifications in at least one of the CH2 sequences. In some aspects, an Fc is a single polypeptide. In some aspects, an Fc is multiple peptides, e.g., two polypeptides.

In some aspects, an Fc is an Fc described in patent applications PCT/CA2011/001238, filed Nov. 4, 2011 or PCT/CA2012/050780, filed Nov. 2, 2012, the entire disclosure of each of which is hereby incorporated by reference in its entirety for all purposes.

Modified CH3 Domains

In some aspects, the bispecific anti-HER2 antigen-binding construct described herein comprises a heterodimeric Fc comprising a modified CH3 domain that has been asymmetrically modified. The heterodimeric Fc can comprise two heavy chain constant domain polypeptides: a first Fc polypeptide and a second Fc polypeptide, which can be used interchangeably provided that Fc comprises one first Fc polypeptide and one second Fc polypeptide. Generally, the first Fc polypeptide comprises a first CH3 sequence and the second Fc polypeptide comprises a second CH3 sequence.

Two CH3 sequences that comprise one or more amino acid modifications introduced in an asymmetric fashion generally results in a heterodimeric Fc, rather than a homodimer, when the two CH3 sequences dimerize. As used herein, "asymmetric amino acid modifications" refers to any modification where an amino acid at a specific position on a first CH3 sequence is different from the amino acid on a second CH3 sequence at the same position, and the first and second CH3 sequence preferentially pair to form a heterodimer, rather than a homodimer. This heterodimerization can be a result of modification of only one of the two amino acids at the same respective amino acid position on each sequence; or modification of both amino acids on each sequence at the same respective position on each of the first and second CH3 sequences. The first and second CH3 sequence of a heterodimeric Fc can comprise one or more than one asymmetric amino acid modification.

Table 2 provides the amino acid sequence of the human IgG1 Fc sequence, corresponding to amino acids 231 to 447 of the full-length human IgG1 heavy chain. The CH3 sequence comprises amino acid 341-447 of the full-length human IgG1 heavy chain.

Typically an Fc can include two contiguous heavy chain sequences (A and B) that are capable of dimerizing. In some aspects, one or both sequences of an Fc include one or more mutations or modifications at the following locations: L351, F405, Y407, T366, K392, T394, T350, S400, and/or N390, using EU numbering. In some aspects, an Fc includes a variant sequence shown in Table 2. In some aspects, an Fc includes the mutations of Variant 1 A-B. In some aspects, an Fc includes the mutations of Variant 2 A-B. In some aspects, an Fc includes the mutations of Variant 3 A-B. In some aspects, an Fc includes the mutations of Variant 4 A-B. In some aspects, an Fc includes the mutations of Variant 5 A-B.

TABLE 2

| IgG1 Fc sequences | |
|---|---|
| Human IgG1 Fc sequence 231-<br>447 (EU-numbering) | APELLGGPSVFLFPPKPKDTLMISRTPEVTCVVVDVSHEDPEVKFNWYV<br>DGVEVHNAKTKPREEQYNSTYRVVSVLTVLHQDWLNGKEYKCKVSNKAL<br>PAPIEKTISKAKGQPREPQVYTLPPSRDELTKNQVSLTCLVKGFYPSDI<br>AVEWESNGQPENNYKTTPPVLDSDGSFFLYSKLTVDKSRWQQGNVFSCS<br>VMHEALHNHYTQKSLSLSPGK (SEQ ID NO: 2) |

TABLE 2-continued

IgG1 Fc sequences

| Variant IgG1 Fc sequence (231-447) | Chain | Mutations |
|---|---|---|
| 1 | A | L351Y_F405A_Y407V |
| 1 | B | T366L_K392M_T394W |
| 2 | A | L351Y_F405A_Y407V |
| 2 | B | T366L_K392L_T394W |
| 3 | A | T350V_L351Y_F405A_Y407V |
| 3 | B | T350V_T366L_K392L_T394W |
| 4 | A | T350V_L351Y_F405A_Y407V |
| 4 | B | T350V_T366L_K392M_T394W |
| 5 | A | T350V_L351Y_S400E_F405A_Y407V |
| 5 | B | T350V_T366L_N390R_K392M_T394W |

The first and second CH3 sequences can comprise amino acid mutations as described herein, with reference to amino acids 231 to 447 of the full-length human IgG1 heavy chain. In one embodiment, the heterodimeric Fc comprises a modified CH3 domain with a first CH3 sequence having amino acid modifications at positions F405 and Y407, and a second CH3 sequence having amino acid modifications at position T394. In one embodiment, the heterodimeric Fc comprises a modified CH3 domain with a first CH3 sequence having one or more amino acid modifications selected from L351Y, F405A, and Y407V, and the second CH3 sequence having one or more amino acid modifications selected from T366L, T366I, K392L, K392M, and T394W.

In one embodiment, a heterodimeric Fc comprises a modified CH3 domain with a first CH3 sequence having amino acid modifications at positions L351, F405 and Y407, and a second CH3 sequence having amino acid modifications at positions T366, K392, and T394, and one of the first or second CH3 sequences further comprising amino acid modifications at position Q347, and the other CH3 sequence further comprising amino acid modification at position K360. In another embodiment, a heterodimeric Fc comprises a modified CH3 domain with a first CH3 sequence having amino acid modifications at positions L351, F405 and Y407, and a second CH3 sequence having amino acid modifications at position T366, K392, and T394, one of the first or second CH3 sequences further comprising amino acid modifications at position Q347, and the other CH3 sequence further comprising amino acid modification at position K360, and one or both of said CH3 sequences further comprise the amino acid modification T350V.

In one embodiment, a heterodimeric Fc comprises a modified CH3 domain with a first CH3 sequence having amino acid modifications at positions L351, F405 and Y407, and a second CH3 sequence having amino acid modifications at positions T366, K392, and T394 and one of said first and second CH3 sequences further comprising amino acid modification of D399R or D399K and the other CH3 sequence comprising one or more of T411E, T411D, K409E, K409D, K392E and K392D. In another embodiment, a heterodimeric Fc comprises a modified CH3 domain with a first CH3 sequence having amino acid modifications at positions L351, F405 and Y407, and a second CH3 sequence having amino acid modifications at positions T366, K392, and T394, one of said first and second CH3 sequences further comprises amino acid modification of D399R or D399K and the other CH3 sequence comprising one or more of T411E, T411D, K409E, K409D, K392E and K392D, and one or both of said CH3 sequences further comprise the amino acid modification T350V.

In one embodiment, a heterodimeric Fc comprises a modified CH3 domain with a first CH3 sequence having amino acid modifications at positions L351, F405 and Y407, and a second CH3 sequence having amino acid modifications at positions T366, K392, and T394, wherein one or both of said CH3 sequences further comprise the amino acid modification of T350V.

In one embodiment, a heterodimeric Fc comprises a modified CH3 domain comprising the following amino acid modifications, where "A" represents the amino acid modifications to the first CH3 sequence, and "B" represents the amino acid modifications to the second CH3 sequence:
A:L351Y_F40SA_Y407V, B:T366L_K392M_T394W,
A:L351Y_F405A_Y407V, B:T366L_K392L_T394W,
A:T350V_L351Y_F405A_Y407V,
B:T350V_T366L_K392L_T394W,
A:T350V_L351Y_F405A_Y407V,
B:T350V_T366L_K392M_T394W,
A:T350V_L351Y_S400E F40SA_Y407V, and/or
B:T350V_T366L N390R K392M_T394W.

The one or more asymmetric amino acid modifications can promote the formation of a heterodimeric Fc in which the heterodimeric CH3 domain has a stability that is comparable to a wild-type homodimeric CH3 domain. In an embodiment, the one or more asymmetric amino acid modifications promote the formation of a heterodimeric Fc domain in which the heterodimeric Fc domain has a stability that is comparable to a wild-type homodimeric Fc domain. In an embodiment, the one or more asymmetric amino acid modifications promote the formation of a heterodimeric Fc domain in which the heterodimeric Fc domain has a stability observed via the melting temperature (Tm) in a differential scanning calorimetry study, and where the melting temperature is within 4° C. of that observed for the corresponding symmetric wild-type homodimeric Fc domain. In some aspects, the Fc comprises one or more modifications in at least one of the CH3 sequences that promote the formation of a heterodimeric Fc with stability comparable to a wild-type homodimeric Fc.

Exemplary Bispecific Anti-HER2 Antigen-Binding Constructs

In certain embodiments, the bispecific anti-HER2 antigen-binding construct is one of the biparatopic antibodies described in U.S. Patent Application Publication No. 2016/0289335 or International Patent Publication No. WO2015/077891. In some embodiments, the bispecific anti-HER2 antigen-binding construct is one of v5019, v5020, v7091, v10000, v6902, v6903 or v6717 (see Tables 3, 4, 5, and Sequence Tables). In some embodiments, one of the antigen-binding polypeptide constructs of the bispecific anti-HER2 antigen-binding construct comprises a VH sequence and a VL sequence from the ECD2-binding arm of one of v5019, v5020, v7091, v10000, v6902, v6903 or v6717. In some embodiments, one of the antigen-binding polypeptide constructs of the bispecific anti-HER2 antigen-binding construct comprises a VH sequence and a VL sequence from the ECD2-binding arm of one of v5019, v5020, v7091, v10000, v6902, v6903 or v6717, and the other antigen-binding polypeptide construct comprises a VH sequence and a VL sequence from the ECD4-binding arm of one of v5019, v5020, v7091, v10000, v6902, v6903 or v6717.

In some embodiments, one of the antigen-binding polypeptide constructs of the bispecific anti-HER2 antigen-binding construct comprises the CDR sequences from the ECD2-binding arm of one of v5019, v5020, v7091, v10000, v6902, v6903 or v6717. In some embodiments, one of the antigen-binding polypeptide constructs of the bispecific anti-HER2 antigen-binding construct comprises the CDR sequences from the ECD2-binding arm of one of v5019, v5020, v7091, v10000, v6902, v6903 or v6717, and the other antigen-binding polypeptide construct comprises the CDR sequences from the ECD4-binding arm of one of v5019, v5020, v7091, v10000, v6902, v6903 or v6717.

One skilled in the art will appreciate that a limited number of amino acid substitutions may be introduced into the CDR sequences or to the VH or VL sequences of known antibodies without the antibody losing its ability to bind its target. Candidate amino acid substitutions may be identified by computer modeling or by art-known techniques such as alanine scanning, with the resulting variants being tested for binding activity by standard techniques. Accordingly, in certain embodiments, one of the antigen-binding polypeptide constructs of the bispecific anti-HER2 antigen-binding construct comprises a set of CDRs (i.e. heavy chain CDR1, CDR2 and CDR3, and light chain CDR1, CDR2 and CDR3) that have 90% or greater, 95% or greater, 98% or greater, 99% or greater, or 100% sequence identity to a set of CDRs from the ECD2-binding arm of one of v5019, v5020, v7091, v10000, v6902, v6903 or v6717, wherein the antigen-binding polypeptide construct retains the ability to bind ECD2. In certain embodiments, one of the antigen-binding polypeptide constructs of the bispecific anti-HER2 antigen-binding construct comprises a variant of these CDR sequences comprising between 1 and 10 amino acid substitutions across the six CDRs (that is, the CDRs may be modified by including up to 10 amino acid substitutions with any combination of CDRs being modified), for example, between 1 and 7 amino acid substitutions, between 1 and 5 amino acid substitutions, between 1 and 4 amino acid substitutions, between 1 and 3 amino acid substitutions, between 1 and 2 amino acid substitutions, or 1 amino acid substitution, across the CDRs, wherein the variant retains the ability to bind ECD2. Typically, such amino acid substitutions will be conservative amino acid substitutions. In certain embodiments, one of the antigen-binding polypeptide constructs of the bispecific anti-HER2 antigen-binding construct comprises a set of CDRs (i.e. heavy chain CDR1, CDR2 and CDR3, and light chain CDR1, CDR2 and CDR3) that have 90% or greater, 95% or greater, 98% or greater, 99% or greater, or 100% sequence identity to a set of CDRs from the ECD2-binding arm of v10000, wherein the antigen-binding polypeptide construct retains the ability to bind ECD2.

In certain embodiments, one of the antigen-binding polypeptide constructs of the bispecific anti-HER2 antigen-binding construct comprises a VH sequence that is at least 80%, at least 85%, at least 90%, at least 91%, at least 92%, at least 93%, at least 94%, at least 95%, at least 96%, at least 97%, at least 98%, at least 99%, or 100% identical to the VH sequence from the ECD2-binding arm of one of v5019, v5020, v7091, v10000, v6902, v6903 or v6717, wherein the antigen-binding polypeptide construct retains the ability to bind ECD2. In some embodiments, one of the antigen-binding polypeptide constructs of the bispecific anti-HER2 antigen-binding construct comprises a VL sequence that is at least 80%, at least 85%, at least 90%, at least 91%, at least 92%, at least 93%, at least 94%, at least 95%, at least 96%, at least 97%, at least 98%, at least 99%, or 100% identical to the VL sequence from the ECD2-binding arm of one of v5019, v5020, v7091, v10000, v6902, v6903 or v6717, wherein the antigen-binding polypeptide construct retains the ability to bind ECD2.

In certain embodiments, one of the antigen-binding polypeptide constructs of the bispecific anti-HER2 antigen-binding construct comprises a VH sequence that is at least 80%, at least 85%, at least 90%, at least 91%, at least 92%, at least 93%, at least 94%, at least 95%, at least 96%, at least 97%, at least 98%, at least 99%, or 100% identical to the VH sequence from the ECD2-binding arm of v10000, wherein the antigen-binding polypeptide construct retains the ability to bind ECD2. In some embodiments, one of the antigen-binding polypeptide constructs of the bispecific anti-HER2 antigen-binding construct comprises a VL sequence that is at least 80%, at least 85%, at least 90%, at least 91%, at least 92%, at least 93%, at least 94%, at least 95%, at least 96%, at least 97%, at least 98%, at least 99%, or 100% identical to the VL sequence from the ECD2-binding arm of v10000, wherein the antigen-binding polypeptide construct retains the ability to bind ECD2.

In certain embodiments, one of the antigen-binding polypeptide constructs of the bispecific anti-HER2 antigen-binding construct comprises a set of CDRs (i.e. heavy chain CDR1, CDR2 and CDR3, and light chain CDR1, CDR2 and CDR3) that have 90% or greater, 95% or greater, 98% or greater, 99% or greater, or 100% sequence identity to a set of CDRs from the ECD4-binding arm of one of v5019, v5020, v7091, v10000, v6902, v6903 or v6717, wherein the antigen-binding polypeptide construct retains the ability to bind ECD4. In certain embodiments, one of the antigen-binding polypeptide constructs of the bispecific anti-HER2 antigen-binding construct comprises a variant of these CDR sequences comprising between 1 and 10 amino acid substitutions across the six CDRs (that is, the CDRs may be modified by including up to 10 amino acid substitutions with any combination of CDRs being modified), for example, between 1 and 7 amino acid substitutions, between 1 and 5 amino acid substitutions, between 1 and 4 amino acid substitutions, between 1 and 3 amino acid substitutions, between 1 and 2 amino acid substitutions, or 1 amino acid substitution, across the CDRs, wherein the variant retains the ability to bind ECD4. Typically, such amino acid substitutions will be conservative amino acid substitutions. In certain embodiments, one of the antigen-binding polypeptide constructs of the bispecific anti-HER2 antigen-binding construct comprises a set of CDRs (i.e. heavy chain CDR1, CDR2 and CDR3, and light chain CDR1, CDR2 and CDR3) that have 90% or greater, 95% or greater, 98% or greater, 99% or greater, or 100% sequence identity to a set of CDRs from the ECD4-binding arm of v10000, wherein the antigen-binding polypeptide construct retains the ability to bind ECD4.

In certain embodiments, one of the antigen-binding polypeptide constructs of the bispecific anti-HER2 antigen-binding construct comprises a VH sequence that is at least 80%, at least 85%, at least 90%, at least 91%, at least 92%, at least 93%, at least 94%, at least 95%, at least 96%, at least 97%, at least 98%, at least 99%, or 100% identical to the VH sequence from the ECD4-binding arm of one of v5019, v5020, v7091, v10000, v6902, v6903 or v6717, wherein the antigen-binding polypeptide construct retains the ability to bind ECD4. In some embodiments, one of the antigen-binding polypeptide constructs of the bispecific anti-HER2 antigen-binding construct comprises a VL sequence that is at least 80%, at least 85%, at least 90%, at least 91%, at least 92%, at least 93%, at least 94%, at least 95%, at least 96%, at least 97%, at least 98%, at least 99%, or 100% identical to the VL sequence from the ECD4-binding arm of one of v5019, v5020, v7091, v10000, v6902, v6903 or v6717, wherein the antigen-binding polypeptide construct retains the ability to bind ECD4.

In certain embodiments, one of the antigen-binding polypeptide constructs of the bispecific anti-HER2 antigen-binding construct comprises a VH sequence that is at least 80%, at least 85%, at least 90%, at least 91%, at least 92%, at least 93%, at least 94%, at least 95%, at least 96%, at least 97%, at least 98%, at least 99%, or 100% identical to the VH sequence from the ECD4-binding arm of v10000, wherein the antigen-binding polypeptide construct retains the ability to bind ECD4. In some embodiments, one of the antigen-binding polypeptide constructs of the bispecific anti-HER2 antigen-binding construct comprises a VL sequence that is at least 80%, at least 85%, at least 90%, at least 91%, at least 92%, at least 93%, at least 94%, at least 95%, at least 96%, at least 97%, at least 98%, at least 99%, or 100% identical to the VL sequence from the ECD4-binding arm of v10000, wherein the antigen-binding polypeptide construct retains the ability to bind ECD4.

TABLE 3

Exemplary bispecific anti-HER2 antigen-binding constructs

| Variant | | Chain A | Chain B |
|---|---|---|---|
| 5019 | Domain containing target epitope | ECD2 | ECD4 |
| | Format | Fab | scFv |
| | Antibody name | Pertuzumab | Trastuzumab |
| | CH3 sequence substitutions§ | T350V_L351Y_F405A_Y407V | T366I_N390R_K392M_T394W |
| 5020 | Domain containing target epitope | ECD4 | ECD2 |
| | Format | scFv | Fab |
| | Antibody name | Trastuzumab | Pertuzumab |
| | CH3 sequence substitutions | L351Y_S400E_F405A_Y407V | T350V_T366L_K392L_T394W |
| 7091 | Domain containing target epitope | ECD2 | ECD4 |
| | Format | Fab | scFv |
| | Antibody name | Pertuzumab | Trastuzumab |
| | CH3 sequence substitutions | T350V_L351Y_F405A_Y407V | T350V_T366L_K392L_T394W |
| 10000 | Domain containing target epitope | ECD2 | ECD4 |
| | Format | Fab | scFv |
| | Antibody name | Pertuzumab | Trastuzumab |
| | Fab sequence substitutions* | HC: T30A_A49G_L69F LC: Y96A | |
| | CH3 sequence substitutions | T350V_L351Y_F405A_Y407V | T350V_T366L_K392L_T394W |
| 6902 | Domain containing target epitope | ECD4 | ECD2 |
| | Format | Fab | Fab |
| | Antibody name | Trastuzumab | Pertuzumab |
| | Fab sequence substitutions | HC: L143E_K145T LC: Q124R | HC: D146G_Q179K LC: Q124E_Q160E_T180E |
| | CH3 sequence substitutions | T350V_L351Y_F405A_Y407V | T350V_T366L_K392L_T394W |
| 6903 | Domain containing target epitope | ECD4 | ECD2 |
| | Format | Fab | Fab |
| | Fab sequence substitutions | HC: L143E_K145T LC: Q124R_Q1160K_T178R | HC: D146G_Q179K LC: Q124E_Q160E_T180E |
| | Antibody name | Trastuzumab | Pertuzumab |
| | CH3 sequence substitutions | T350V_L351Y_F405A_Y407V | T350V_T366L_K392L_T394W |

TABLE 3-continued

Exemplary bispecific anti-HER2 antigen-binding constructs

| Variant | | Chain A | Chain B |
|---|---|---|---|
| 6717 | Domain containing target epitope | ECD2 | ECD4 |
| | Format | scFv | scFv |
| | Antibody name | Pertuzumab | Trastuzumab |
| | CH3 sequence substitutions | T350V_L351Y_F405A_Y407V | T366I_N390R_K392M_T394W |

*Fab or variable domain numbering according to Kabat (Kabat et al., *Sequences of proteins of immunological interest*, 5th Edition, US Department of Health and Human Services, NIH Publication No. 91-3242, p.647, 1991)
§CH3 numbering according to EU index as in Kabat (Edelman et al., 1969, PNAS USA, 63: 78-85)

TABLE 4

CDR Sequences of the ECD2-Binding Arm of Variants v5019, v5020, v7091, v10000, v6902, v6903 and v6717

| Variant | HC CDRs | SEQ ID NO | LC CDRs | SEQ ID NO |
|---|---|---|---|---|
| 5019, 5020, 7091, 6902, 6903 & 6717 | H1: GFTFTDYT<br>H2: VNPNSGGS<br>H3: ARNLGPSFYFDY | 6<br>8<br>7 | L1: QDVSIG<br>L2: SAS<br>L3: QQYYIYPYT | 12<br>14<br>13 |
| 10000 | H1: GFTFADYT<br>H2: VNPNSGGS<br>H3: ARNLGPSFYFDY | 39<br>41<br>40 | L1: QDVSIG<br>L2: SAS<br>L3: QQYYIYPAT | 27<br>29<br>28 |

TABLE 5

CDR Sequences of the ECD4-Binding Arm of Variants v5019, v5020, v7091, v10000, v6902, v6903 and v6717

| HC CDRs | SEQ ID NO | LC CDRs | SEQ ID NO |
|---|---|---|---|
| H1: GFNIKDTY | 33 | L1: QDVNTA | 67 |
| H2: IYPTNGYT | 35 | L2: SAS | 68 |
| H3: SRWGGDGFYAMDY | 34 | L3: QQHYTTPPT | 69 |

Preparation of Bispecific Anti-HER2 Antigen-Binding Constructs

Bispecific anti-HER2 antigen-binding constructs described herein may be produced using recombinant methods and compositions, e.g., as described in U.S. Pat. No. 4,816,567 or International Patent Publication No. WO2015/077891.

In one embodiment, isolated nucleic acid encoding a bispecific anti-HER2 antigen-binding construct described herein is provided. Such nucleic acid may encode an amino acid sequence comprising the VL and/or an amino acid sequence comprising the VH of the bispecific anti-HER2 antigen-binding construct (e.g., the light and/or heavy chains of the antigen-binding construct). In a further embodiment, one or more vectors (e.g., expression vectors) comprising such nucleic acid are provided. As is known in the art, because many amino acid acids are encoded by more than one codon, multiple nucleic acids may encode a single polypeptide sequence. An exemplary nucleic acid is provided herein for each polypeptide of the bispecific anti-HER2 antigen-binding construct; however it is understood that other nucleic acids may be used to prepare the bispecific anti-HER2 antigen-binding construct described herein.

In one embodiment, the nucleic acid is provided in a multicistronic vector. In a further embodiment, a host cell comprising such nucleic acid is provided. In one such embodiment, a host cell comprises (e.g., has been transformed with): (1) a vector comprising a nucleic acid that encodes an amino acid sequence comprising the VL of the bispecific anti-HER2 antigen-binding construct and an amino acid sequence comprising the VH of the antigen-binding polypeptide construct, or (2) a first vector comprising a nucleic acid that encodes an amino acid sequence comprising the VL of the antigen-binding polypeptide construct and a second vector comprising a nucleic acid that encodes an amino acid sequence comprising the VH of the antigen-binding polypeptide construct. In one embodiment, the host cell is eukaryotic, e.g. a Chinese Hamster Ovary (CHO) cell, or human embryonic kidney (HEK) cell, or lymphoid cell (e.g., Y0, NS0, Sp20 cell). In one embodiment, a method of making an bispecific anti-HER2 antigen-binding construct is provided, wherein the method comprises culturing a host cell comprising nucleic acid encoding the bispecific anti-HER2 antigen-binding construct, as provided above, under conditions suitable for expression of the bispecific anti-HER2 antigen-binding construct, and optionally recovering the bispecific anti-HER2 antigen-binding construct from the host cell (or host cell culture medium).

For recombinant production of the bispecific anti-HER2 antigen-binding construct, nucleic acid encoding a bispecific anti-HER2 antigen-binding construct, e.g., as described above, is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the bispecific anti-HER2 antigen-binding construct).

The term "substantially purified" refers to a construct described herein, or variant thereof that may be substantially or essentially free of components that normally accompany or interact with the protein as found in its naturally occurring environment, i.e. a native cell, or host cell in the case of recombinantly produced bispecific anti-HER2 antigen-binding construct that in certain embodiments, is substantially free of cellular material includes preparations of protein having less than about 30%, less than about 25%, less than about 20%, less than about 15%, less than about 10%, less than about 5%, less than about 4%, less than about 3%, less than about 2%, or less than about 1% (by dry weight) of contaminating protein. When the bispecific anti-HER2 antigen-binding construct is recombinantly produced by the host cells, the protein in certain embodiments is present at about 30%, about 25%, about 20%, about 15%, about 10%, about 5%, about 4%, about 3%, about 2%, or about 1% or less of the dry weight of the cells. When the bispecific anti-HER2 antigen-binding construct is recombinantly produced by the host cells, the protein, in certain embodiments, is present in the culture medium at about 5 g/L, about 4 g/L, about 3 g/L, about 2 g/L, about 1 g/L, about 750 mg/L, about 500 mg/L, about 250 mg/L, about 100 mg/L, about 50 mg/L, about 10 mg/L, or about 1 mg/L or less of the dry weight of the cells. In certain embodiments, "substantially purified" bispecific anti-HER2 antigen-binding construct produced by the methods described herein, has a purity level of at least about 30%, at least about 35%, at least about 40%, at least about 45%, at least about 50%, at least about 55%, at least about 60%, at least about 65%, at least about 70%, specifically, a purity level of at least about 75%, 80%, 85%, and more specifically, a purity level of at least about 90%, a purity level of at least about 95%, a purity level of at least about 99% or greater as determined by appropriate methods such as SDS/PAGE analysis, RP-HPLC, SEC, and capillary electrophoresis.

Suitable host cells for cloning or expression of bispecific anti-HER2 antigen-binding construct-encoding vectors include prokaryotic or eukaryotic cells described herein.

A "recombinant host cell" or "host cell" refers to a cell that includes an exogenous polynucleotide, regardless of the method used for insertion, for example, direct uptake, transduction, f-mating, or other methods known in the art to create recombinant host cells. The exogenous polynucleotide may be maintained as a nonintegrated vector, for example, a plasmid, or alternatively, may be integrated into the host genome.

As used herein, the term "eukaryote" refers to organisms belonging to the phylogenetic domain Eucarya such as animals (including but not limited to, mammals, insects, reptiles, birds, etc.), ciliates, plants (including but not limited to, monocots, dicots, algae, etc.), fungi, yeasts, flagellates, microsporidia, protists, etc.

As used herein, the term "prokaryote" refers to prokaryotic organisms. For example, a non-eukaryotic organism can belong to the Eubacteria (including but not limited to, *Escherichia coli, Thermus thermophilus, Bacillus stearothermophilus, Pseudomonas fluorescens, Pseudomonas aeruginosa, Pseudomonas putida*, etc.) phylogenetic domain, or the Archaea (including but not limited to, *Methanococcus jannaschii, Methanobacterium thermoautotrophicum, Halobacterium* such as *Haloferax volcanii* and *Halobacterium* species NRC-1, *Archaeoglobus fulgidus, Pyrococcus furiosus, Pyrococcus horikoshii, Aeuropyrum pernix*, etc.) phylogenetic domain.

For example, bispecific anti-HER2 antigen-binding construct may be produced in bacteria, in particular when glycosylation and Fc effector function are not needed. For expression of bispecific anti-HER2 antigen-binding construct fragments and polypeptides in bacteria, see, e.g., U.S. Pat. Nos. 5,648,237, 5,789,199, and 5,840,523. (See also Charlton, *Methods in Molecular Biology*, Vol. 248 (B.K.C. Lo, ed., Humana Press, Totowa, N.J., 2003), pp. 245-254, describing expression of antibody fragments in *E. coli*.) After expression, the bispecific anti-HER2 antigen-binding construct may be isolated from the bacterial cell paste in a soluble fraction and can be further purified.

In addition to prokaryotes, eukaryotic microbes such as filamentous fungi or yeast are suitable cloning or expression hosts for bispecific anti-HER2 antigen-binding construct-encoding vectors, including fungi and yeast strains whose glycosylation pathways have been "humanized," resulting in the production of an bispecific anti-HER2 antigen-binding construct with a partially or fully human glycosylation pattern. See Gerngross, *Nat. Biotech.* 22:1409-1414 (2004), and Li et al., *Nat. Biotech.* 24:210-215 (2006).

Suitable host cells for the expression of glycosylated bispecific anti-HER2 antigen-binding constructs are also derived from multicellular organisms (invertebrates and vertebrates). Examples of invertebrate cells include plant and insect cells. Numerous baculoviral strains have been identified which may be used in conjunction with insect cells, particularly for transfection of *Spodoptera frugiperda* cells.

Plant cell cultures can also be utilized as hosts. See, e.g., U.S. Pat. Nos. 5,959,177, 6,040,498, 6,420,548, 7,125,978, and 6,417,429 (describing PLANTIBODIES™ technology for producing antigen-binding constructs in transgenic plants).

Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., *J. Gen Virol.* 36:59 (1977)); baby hamster kidney cells (BHK); mouse sertoli cells (TM4 cells as described, e.g., in Mather, *Biol. Reprod.* 23:243-251 (1980)); monkey kidney cells (CV1); African green monkey kidney cells (VERO-76); human cervical carcinoma cells (HELA); canine kidney cells (MDCK; buffalo rat liver cells (BRL 3A); human lung cells (W138); human liver cells (Hep G2); mouse mammary tumor (MMT 060562); TRI cells, as described, e.g., in Mather et al., *Annals N.Y. Acad. Sci.* 383:44-68 (1982); MRC 5 cells; and FS4 cells. Other useful mammalian host cell lines include Chinese hamster ovary (CHO) cells, including DHFR CHO cells (Urlaub et al., *Proc. Natl. Acad. Sci. USA* 77:4216 (1980)); and myeloma cell lines such as YO, NS0 and Sp2/0. For a review of certain mammalian host cell lines suitable for antigen-binding construct production, see, e.g., Yazaki and Wu, *Methods in*

*Molecular Biology*, Vol. 248 (B.K.C. Lo, ed., Humana Press, Totowa, N.J.), pp. 255-268 (2003).

In one embodiment, the bispecific anti-HER2 antigen-binding constructs described herein are produced in stable mammalian cells, by a method comprising: transfecting at least one stable mammalian cell with: nucleic acid encoding the bispecific anti-HER2 antigen-binding construct, in a predetermined ratio; and expressing the nucleic acid in the at least one mammalian cell. In some embodiments, the predetermined ratio of nucleic acid is determined in transient transfection experiments to determine the relative ratio of input nucleic acids that results in the highest percentage of the bispecific anti-HER2 antigen-binding construct in the expressed product.

In some embodiments the bispecific anti-HER2 antigen-binding construct is produced in stable mammalian cells wherein the expression product of the at least one stable mammalian cell comprises a larger percentage of the desired glycosylated bispecific anti-HER2 antigen-binding construct as compared to the monomeric heavy or light chain polypeptides, or other antibodies. In some embodiments, identification of the glycosylated bispecific anti-HER2 antigen-binding construct is by one or both of liquid chromatography and mass spectrometry.

If required, the bispecific anti-HER2 antigen-binding constructs can be purified or isolated after expression. Proteins may be isolated or purified in a variety of ways known to those skilled in the art. Standard purification methods include chromatographic techniques, including ion exchange, hydrophobic interaction, affinity, sizing or gel filtration, and reversed-phase, carried out at atmospheric pressure or at high pressure using systems such as FPLC and HPLC. Purification methods also include electrophoretic, immunological, precipitation, dialysis, and chromatofocusing techniques. Ultrafiltration and diafiltration techniques, in conjunction with protein concentration, are also useful. As is well known in the art, a variety of natural proteins bind Fc and antibodies, and these proteins can find use for purification of bispecific anti-HER2 antigen-binding constructs described herein. For example, the bacterial proteins A and G bind to the Fc region. Likewise, the bacterial protein L binds to the Fab region of some antibodies. Purification can often be enabled by a particular fusion partner. For example, antibodies may be purified using glutathione resin if a GST fusion is employed, $Ni^{+2}$ affinity chromatography if a His-tag is employed, or immobilized anti-flag antibody if a flag-tag is used. For general guidance in suitable purification techniques, see, e.g. incorporated entirely by reference Protein Purification: Principles and Practice, 3rd Ed., Scopes, Springer-Verlag, NY, 1994, incorporated entirely by reference. The degree of purification necessary will vary depending on the use of the bispecific anti-HER2 antigen-binding constructs. In some instances no purification is necessary.

In certain embodiments the bispecific anti-HER2 antigen-binding constructs are purified using Anion Exchange Chromatography including, but not limited to, chromatography on Q-sepharose, DEAE sepharose, poros HQ, poros DEAF, Toyopearl Q, Toyopearl QAE, Toyopearl DEAE, Resource/Source Q and DEAE, Fractogel Q and DEAE columns.

In specific embodiments the bispecific anti-HER2 antigen-binding construct described herein are purified using Cation Exchange Chromatography including, but not limited to, SP-sepharose, CM sepharose, poros HS, poros CM, Toyopearl SP, Toyopearl CM, Resource/Source S and CM, Fractogel S and CM columns and their equivalents and comparables.

In addition, bispecific anti-HER2 antigen-binding constructs described herein can be chemically synthesized using techniques known in the art (e.g., see Creighton, 1983, Proteins: Structures and Molecular Principles, W. H. Freeman & Co., N.Y and Hunkapiller et al., Nature, 310:105-111 (1984)). For example, a polypeptide corresponding to a fragment of a polypeptide can be synthesized by use of a peptide synthesizer. Furthermore, if desired, nonclassical amino acids or chemical amino acid analogs can be introduced as a substitution or addition into the polypeptide sequence. Non-classical amino acids include, but are not limited to, the D-isomers of the common amino acids, 2,4diaminobutyric acid, alpha-amino isobutyric acid, 4aminobutyric acid, Abu, 2-amino butyric acid, γ-Abu, ε-Ahx, 6amino hexanoic acid, Aib, 2-amino isobutyric acid, 3-amino propionic acid, ornithine, norleucine, norvaline, hydroxyproline, sarcosine, citrulline, homocitrulline, cysteic acid, t-butylglycine, t-butylalanine, phenylglycine, cyclohexylalanine, β-alanine, fluoro-amino acids, designer amino acids such as β-methyl amino acids, Cα-methyl amino acids, N α-methyl amino acids, and amino acid analogs in general. Furthermore, the amino acid can be D (dextrorotary) or L (levorotary).

Post-Translational Modifications:

In certain embodiments bispecific anti-HER2 antigen-binding constructs described herein are differentially modified during or after translation.

The term "modified," as used herein refers to any changes made to a given polypeptide, such as changes to the length of the polypeptide, the amino acid sequence, chemical structure, co-translational modification, or post-translational modification of a polypeptide. The form "(modified)" term means that the polypeptides being discussed are optionally modified, that is, the polypeptides of the bispecific anti-HER2 antigen-binding construct can be modified or unmodified.

The term "post-translationally modified" refers to any modification of a natural or non-natural amino acid that occurs to such an amino acid after it has been incorporated into a polypeptide chain. The term encompasses, by way of example only, co-translational in vivo modifications, co-translational in vitro modifications (such as in a cell-free translation system), post-translational in vivo modifications, and post-translational in vitro modifications.

In some embodiments, the modification is at least one of: glycosylation, acetylation, phosphorylation, amidation, derivatization by known protecting/blocking groups, proteolytic cleavage and linkage to an antibody molecule or bispecific anti-HER2 antigen-binding construct or other cellular ligand. In some embodiments, the bispecific anti-HER2 antigen-binding construct is chemically modified by known techniques, including but not limited, to specific chemical cleavage by cyanogen bromide, trypsin, chymotrypsin, papain, V8 protease, $NaBH_4$; acetylation, formylation, oxidation, reduction; and metabolic synthesis in the presence of tunicamycin.

Additional post-translational modifications of bispecific anti-HER2 antigen-binding constructs include, for example, N-linked or O-linked carbohydrate chains, processing of N-terminal or C-terminal ends), attachment of chemical moieties to the amino acid backbone, chemical modifications of N-linked or O-linked carbohydrate chains, and addition or deletion of an N-terminal methionine residue as a result of prokaryotic host cell expression. The bispecific anti-HER2 antigen-binding constructs described herein are modified with a detectable label, such as an enzymatic, fluorescent, isotopic or affinity label to allow for detection and isolation of the protein. In certain embodiments, examples of suitable enzyme labels include horseradish peroxidase, alkaline phosphatase, beta-galactosidase, or acetylcholinesterase; examples of suitable prosthetic group complexes include streptavidin biotin and avidin/biotin; examples of suitable fluorescent materials include umbelliferone, fluorescein, fluorescein isothiocyanate, rhodamine, dichlorotriazinylamine fluorescein, dansyl chloride or phycoerythrin; an example of a luminescent material includes luminol; examples of bioluminescent materials include luciferase, luciferin, and aequorin; and examples of suitable radioactive material include iodine, carbon, sulfur, tritium, indium, technetium, thallium, gallium, palladium, molybdenum, xenon, fluorine.

In specific embodiments, bispecific anti-HER2 antigen-binding constructs described herein are attached to macrocyclic chelators that associate with radiometal ions.

In some embodiments, the bispecific anti-HER2 antigen-binding constructs described herein are modified by either natural processes, such as post-translational processing, or by chemical modification techniques which are well known in the art. In certain embodiments, the same type of modification may be present in the same or varying degrees at several sites in a given polypeptide. In certain embodiments, polypeptides from bispecific anti-HER2 antigen-binding constructs described herein are branched, for example, as a result of ubiquitination, and in some embodiments are cyclic, with or without branching. Cyclic, branched, and branched cyclic polypeptides are a result from posttranslation natural processes or made by synthetic methods. Modifications include acetylation, acylation, ADP-ribosylation, amidation, covalent attachment of flavin, covalent attachment of a heme moiety, covalent attachment of a nucleotide or nucleotide derivative, covalent attachment of a lipid or lipid derivative, covalent attachment of phosphotidylinositol, cross-linking, cyclization, disulfide bond formation, demethylation, formation of covalent cross-links, formation of cysteine, formation of pyroglutamate, formylation, gamma-carboxylation, glycosylation, GPI anchor formation, hydroxylation, iodination, methylation, myristylation, oxidation, pegylation, proteolytic processing, phosphorylation, prenylation, racemization, selenoylation, sulfation, transfer-RNA mediated addition of amino acids to proteins such as arginylation, and ubiquitination. (See, for instance, PROTEINS—STRUCTURE AND MOLECULAR PROPERTIES, 2nd Ed., T. E. Creighton, W. H. Freeman and Company, New York (1993); POST-TRANSLATIONAL COVALENT MODIFICATION OF PROTEINS, B. C. Johnson, Ed., Academic Press, New York, pgs. 1-12 (1983); Seifter et al., Meth. Enzymol. 182:626-646 (1990); Rattan et al., Ann. N.Y. Acad. Sci. 663:48-62 (1992)).

Antibody Drug Conjugates (ADCs)

Certain embodiments relate to a method of treating BTC using an antibody-drug conjugate (ADC) comprising a bispecific anti-HER2 antigen-binding construct conjugated to an auristatin analogue at a low average drug-to-antibody ratio (DAR). "Low average DAR," as used herein, refers to an average DAR of <3.9. Of particular use in the described methods are ADCs comprising a bispecific anti-HER2 antigen-binding construct conjugated to an auristatin analogue having an average DAR of about 2.5 or less, such as between about 1.8 and 2.5. In certain embodiments, the bispecific anti-HER2 antigen-binding construct included in the ADCs is v10000.

In certain embodiments, the auristatin analogue comprised by the ADCs for use in the methods described herein may be an auristatin analogue as described in International Patent Application Publication No. WO 2016/041082. In certain embodiments, the auristatin analogue comprised by the ADCs for use in the methods described herein is a compound of general Formula (I):

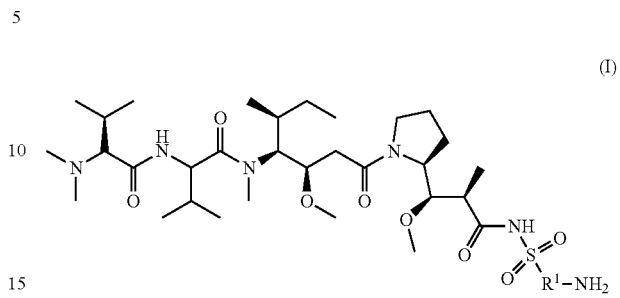

wherein $R^1$ is selected from:

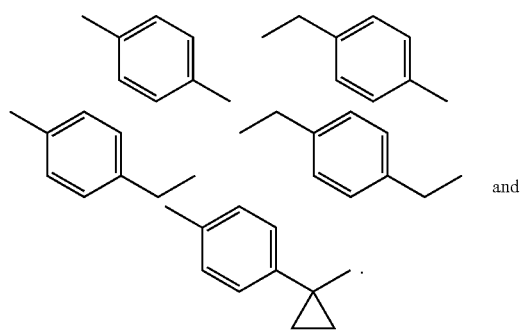

and

In certain embodiments, in compounds of Formula (I), $R^1$ is:

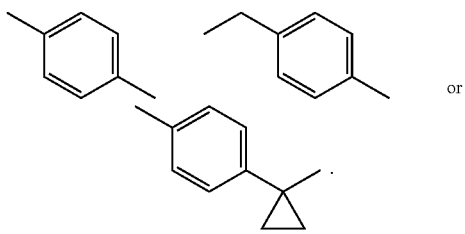

or

In certain embodiments, in compounds of Formula (I), $R^1$ is:

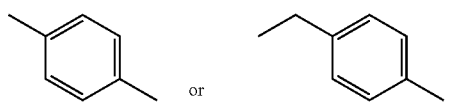

or

In certain embodiments, in compounds of Formula (I), $R^1$ is:

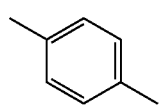

.

In certain embodiments, the compound of Formula (I) is selected from:

Compound 16

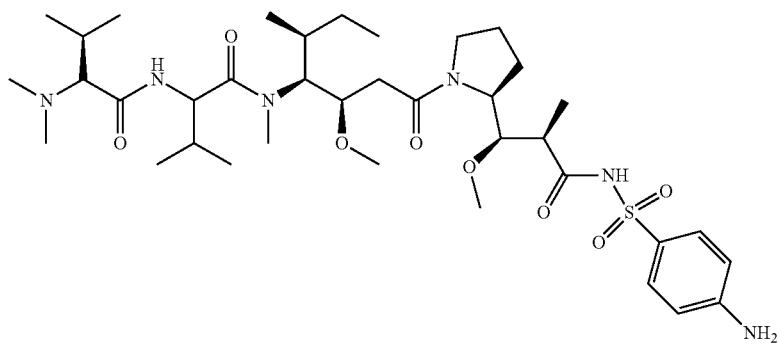

Compound 17

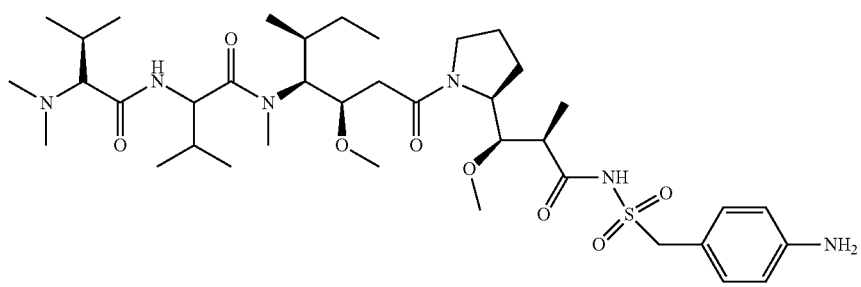

Compound 18

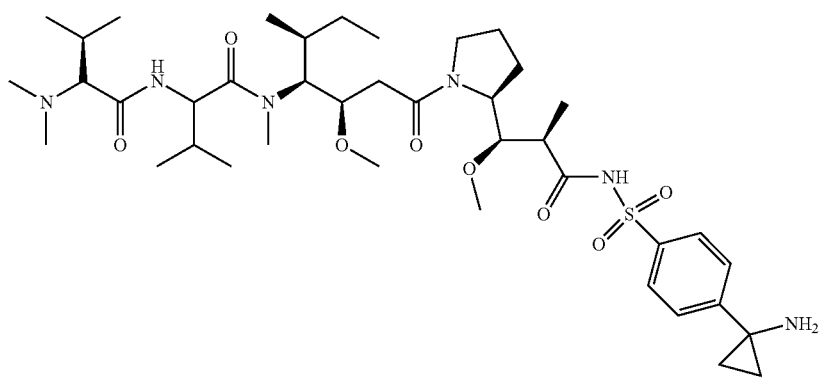

Compounds of general Formula (I) may be prepared by standard synthetic organic chemistry protocols from commercially available starting materials. Exemplary methods of synthesis are provided in International Patent Application Publication No. WO 2016/041082.

In certain embodiments, the ADC for use in the methods described herein comprises the bispecific anti-HER2 antigen-binding construct conjugated to an auristatin analogue (toxin) via a linker (L), in which the linker-toxin has general Formula (II):

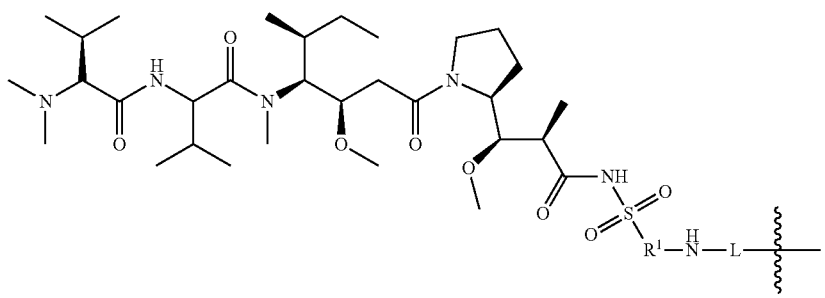

(II)

wherein:
$R^1$ is selected from:

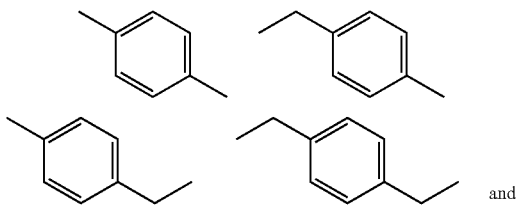

and

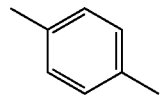

In some embodiments, in the linker-toxin of general Formula (II), L is a peptide-containing linker.

In some embodiments, in the linker-toxin of general Formula (II), L is a protease-cleavable linker.

In certain embodiments, the ADC for use in the methods described herein comprises the bispecific anti-HER2 antigen-binding construct conjugated to an auristatin analogue (toxin) via a linker (L) and has general Formula (III):

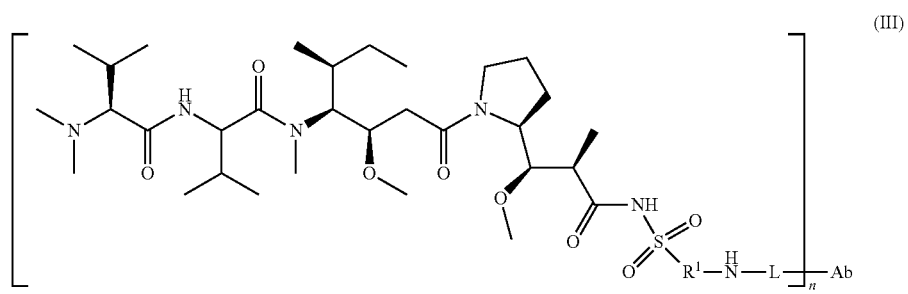

(III)

-continued

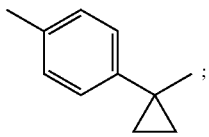

;

L is a cleavable linker, and

⸳ represents the point of attachment of the linker-toxin to the bispecific anti-HER2 antigen-binding construct.

In some embodiments, in the linker-toxin of general Formula (II), $R^1$ is:

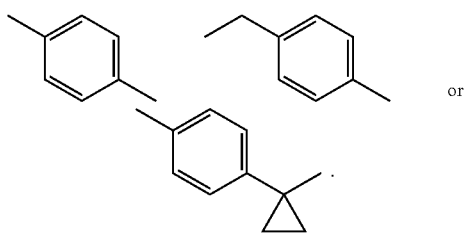

or

In some embodiments, in the linker-toxin of general Formula (II), $R^1$ is:

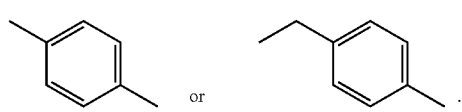

or

In some embodiments, in the linker-toxin of Formula (II), $R^1$ is:

wherein:
$R^1$ and L are as defined for general Formula (II);
n is the average drug-to-antibody ratio (DAR) and is less than 3.9, and
Ab is the bispecific anti-HER2 antigen-binding construct.

In some embodiments, in the ADC of general Formula (III), $R^1$ is:

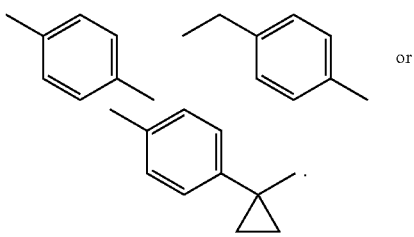

or

In some embodiments, in the ADC of general Formula (III), $R^1$ is:

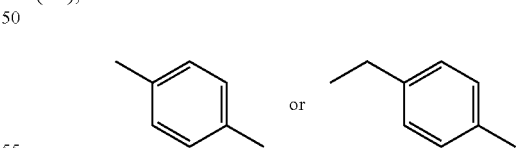

or

In some embodiments, in the ADC of general Formula (III), $R^1$ is:

In some embodiments, in the ADC of general Formula (III), L is a peptide-containing linker.

In some embodiments, in the ADC of general Formula (III), L is a protease-cleavable linker.

In some embodiments, in the ADC of general Formula (III), n is between 0.5 and 3.8.

In some embodiments, in the ADC of general Formula (III), n is between about 1.0 and 3.8, between about 1.0 and 3.5, between about 1.0 and 3.0, or between about 1.0 and 2.5.

In some embodiments, in the ADC of general Formula (III), n is between about 1.5 and 3.8, between about 1.5 and 3.5, between about 1.5 and 3.0, or between about 1.5 and 2.5.

In some embodiments, in the ADC of general Formula (III), n is between about 1.8 and 2.8, or between about 1.8 and 2.5.

In some embodiments, in the ADC of general Formula (III), Ab is v10000.

Combinations of any of the foregoing embodiments for ADCs of general Formula (III) are also contemplated and each combination forms a separate embodiment for the purposes of the present disclosure.

In the ADCs described herein, the bispecific anti-HER2 antigen-binding construct is linked to the auristatin analogue (toxin) by a linker. Linkers are bifunctional or multifunctional moieties capable of linking one or more toxin molecules to an antibody. A bifunctional (or monovalent) linker links a single drug to a single site on the antibody, whereas a multifunctional (or polyvalent) linker links more than one toxin molecule to a single site on the antibody. Linkers capable of linking one toxin molecule to more than one site on the antibody may also be considered to be multifunctional.

Attachment of a linker to an antibody can be accomplished in a variety of ways, such as through surface lysines on the antibody, reductive-coupling to oxidized carbohydrates on the antibody, or through cysteine residues on the antibody liberated by reducing interchain disulfide linkages. Alternatively, attachment of a linker to an antibody may be achieved by modification of the antibody to include additional cysteine residues (see, for example, U.S. Pat. Nos. 7,521,541; 8,455,622 and 9,000,130) or non-natural amino acids that provide reactive handles, such as selenomethionine, p-acetylphenylalanine, formylglycine or p-azidomethyl-L-phenylalanine (see, for example, Hofer et al., Biochemistry, 48:12047-12057 (2009); Axup et al., PNAS, 109:16101-16106 (2012); Wu et al., PNAS, 106:3000-3005 (2009); Zimmerman et al., Bioconj. Chem., 25:351-361 (2014)), to allow for site-specific conjugation.

Linkers include a functional group capable of reacting with the target group or groups on the antibody, and one or more functional groups capable of reacting with a target group on the toxin. Suitable functional groups are known in the art and include those described, for example, in *Bioconjugate Techniques* (G. T. Hermanson, 2013, Academic Press).

Non-limiting examples of functional groups for reacting with free cysteines or thiols include maleimide, haloacetamide, haloacetyl, activated esters such as succinimide esters, 4-nitrophenyl esters, pentafluorophenyl esters, tetrafluorophenyl esters, anhydrides, acid chlorides, sulfonyl chlorides, isocyanates and isothiocyanates. Also useful in this context are "self-stabilizing" maleimides as described in Lyon et al., Nat. Biotechnol., 32:1059-1062 (2014).

Non-limiting examples of functional groups for reacting with surface lysines on an antibody or free amines on a toxin include activated esters such as N-hydroxysuccinamide (NHS) esters, sulfo-NHS esters, imido esters such as Traut's reagent, isothiocyanates, aldehydes and acid anhydrides such as diethylenetriaminepentaacetic anhydride (DTPA). Other examples include succinimido-1,1,3,3-tetra-methyluronium tetrafluoroborate (TSTU) and benzotriazol-1-yl-oxytripyrrolidinophosphonium hexafluorophosphate (PyBOP).

Non-limiting examples of functional groups capable of reacting with an electrophilic group on the antibody or toxin (such as an aldehyde or ketone carbonyl group) include hydrazide, oxime, amino, hydrazine, thiosemicarbazone, hydrazine carboxylate and arylhydrazide.

Other linkers include those having a functional group that allows for bridging of two interchain cysteines on the antibody, such as a ThioBridge™ linker (Badescu et al., Bioconjug. Chem., 25:1124-1136 (2014)), a dithiomaleimide (DTM) linker (Behrens et al., Mol. Pharm., 12:3986-3998 (2015)), a dithioaryl (TCEP)pyridazinedione based linker (Lee et al., Chem. Sci., 7:799-802 (2016)), a dibromopyridazinedione based linker (Maruani et al., Nat. Commun., 6:6645 (2015)) and others known in the art.

A linker may comprise various linker components. Typically, a linker will comprise two or more linker components. Exemplary linker components include functional groups for reaction with the antibody, functional groups for reaction with the toxin, stretchers, peptide components, self-immolative groups, self-elimination groups, hydrophilic moieties, and the like. Various linker components are known in the art, some of which are described below.

Certain useful linker components can be obtained from various commercial sources, such as Pierce Biotechnology, Inc. (now Thermo Fisher Scientific, Waltham, MA) and Molecular Biosciences Inc. (Boulder, Colo.), or may be synthesized in accordance with procedures described in the art (see, for example, Toki et al., J. Org. Chem., 67:1866-1872 (2002); Dubowchik, et al., Tetrahedron Letters, 38:5257-60 (1997); Walker, M. A., J. Org. Chem., 60:5352-5355 (1995); Frisch, et al., Bioconjugate Chem., 7:180-186 (1996); U.S. Pat. Nos. 6,214,345 and 7,553,816, and International Patent Application Publication No. WO 02/088172).

The linker employed in the ADCs described herein is a cleavable linker. A cleavable linker is typically susceptible to cleavage under intracellular conditions, for example, through lysosomal processes. Examples include linkers that are protease-sensitive, acid-sensitive, reduction-sensitive or photolabile.

Suitable cleavable linkers include, for example, linkers comprising a peptide component that includes two or more amino acids and is cleavable by an intracellular protease, such as lysosomal protease or an endosomal protease. A peptide component may comprise amino acid residues that occur naturally and/or minor amino acids and/or non-naturally occurring amino acid analogues, such as citrulline. Peptide components may be designed and optimized for enzymatic cleavage by a particular enzyme, for example, a tumour-associated protease, cathepsin B, C or D, or a plasmin protease.

In certain embodiments, the linker included in the ADCs may be a dipeptide-containing linker, such as a linker containing valine-citrulline (Val-Cit) or phenylalanine-lysine (Phe-Lys). Other examples of suitable dipeptides for inclusion in linkers include Val-Lys, Ala-Lys, Me-Val-Cit, Phe-homoLys, Phe-Cit, Leu-Cit, Ile-Cit, Trp-Cit, Phe-Arg, Ala-Phe, Val-Ala, Met-Lys, Asn-Lys, Ile-Pro, Ile-Val, Asp-Val, His-Val, Met-(D)Lys, Asn-(D)Lys, Val-(D) Asp, Nor-Val-(D) Asp, Ala-(D) Asp, Me₃Lys-Pro, PhenylGly-(D)Lys, Met-(D)Lys, Asn-(D)Lys, Pro-(D)Lys and Met-(D)Lys.

Cleavable linkers may also include longer peptide components such as tripeptides, tetrapeptides or pentapeptides. Examples include, but are not limited to, the tripeptides Met-Cit-Val, Gly-Cit-Val, (D) Phe-Phe-Lys and (D) Ala-Phe-Lys, and the tetrapeptides Gly-Phe-Leu-Gly and Ala-Leu-Ala-Leu.

Additional examples of cleavable linkers include disulfide-containing linkers, such as, for example, N-succinimydyl-4-(2-pyridyldithio) butanoate (SPBD) and N-succinimydyl-4-(2-pyridyldithio)-2-sulfo butanoate (sulfo-SPBD). Disulfide-containing linkers may optionally include additional groups to provide steric hindrance adjacent to the disulfide bond in order to improve the extracellular stability of the linker, for example, inclusion of a geminal dimethyl group. Other suitable linkers include linkers hydrolyzable at a specific pH or within a pH range, such as hydrazone linkers. Linkers comprising combinations of these functionalities may also be useful, for example, linkers comprising both a hydrazone and a disulfide are known in the art.

A further example of a cleavable linker is a linker comprising a β-glucuronide, which is cleavable by β-glucuronidase, an enzyme present in lysosomes and tumour interstitium (see, for example, De Graaf et al., Curr. Pharm. Des., 8:1391-1403 (2002)).

Cleavable linkers may optionally further comprise one or more additional components such as self-immolative and self-elimination groups, stretchers or hydrophilic moieties.

Self-immolative and self-elimination groups that find use in linkers include, for example, p-aminobenzyloxycarbonyl (PABC) and p-aminobenzyl ether (PABE) groups, and methylated ethylene diamine (MED). Other examples of self-immolative groups include, but are not limited to, aromatic compounds that are electronically similar to the PABC or PABE group such as heterocyclic derivatives, for example 2-aminoimidazol-5-methanol derivatives as described in U.S. Pat. No. 7,375,078. Other examples include groups that undergo cyclization upon amide bond hydrolysis, such as substituted and unsubstituted 4-aminobutyric acid amides (Rodrigues et al., Chemistry Biology, 2:223-227 (1995)) and 2-aminophenylpropionic acid amides (Amsberry, et al., J. Org. Chem., 55:5867-5877 (1990)).

Stretchers that find use in linkers for ADCs include, for example, alkylene groups and stretchers based on aliphatic acids, diacids, amines or diamines, such as diglycolate, malonate, caproate and caproamide. Other stretchers include, for example, glycine-based stretchers, polyethylene glycol (PEG) stretchers and monomethoxy polyethylene glycol (mPEG) stretchers. PEG and mPEG stretchers also function as hydrophilic moieties.

In certain embodiments, the linker comprised by the ADCs for use in the methods described herein are peptide-based linkers having general Formula (IV):

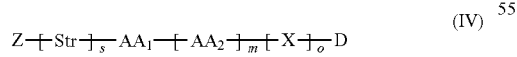
(IV)

wherein:
Z is a functional group capable of reacting with the target group on the bispecific anti-HER2 antigen-binding construct;
Str is a stretcher;
$AA_1$ and $AA_2$ are each independently an amino acid, wherein $AA_1$-$[AA_2]_m$ forms a protease cleavage site;
X is a self-immolative group;
D is the point of attachment to the auristatin analogue;
s is 0 or 1;
m is an integer between 1 and 4, and
o is 0, 1 or 2.

In some embodiments, in general Formula (IV), Z is:

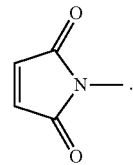

In some embodiments, in general Formula (IV), Str is selected from:

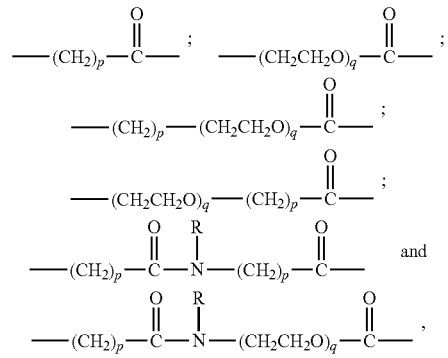

wherein:
R is H or $C_1$-$C_6$ alkyl;
p is an integer between 2 and 10, and
q is an integer between 1 and 10.

In some embodiments, in general Formula (IV), Str is:

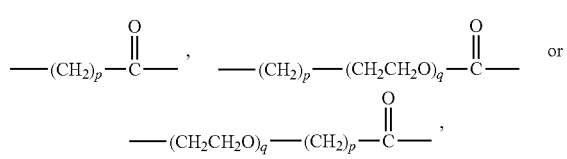

wherein p and q are as defined above.
In some embodiments, in general Formula (IV), Str is:

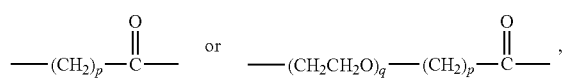

wherein p is an integer between 2 and 6, and
q is an integer between 2 and 8.

In some embodiments, in general Formula (IV), $AA_1$-$[AA_2]_m$ is selected from Val-Lys, Ala-Lys, Phe-Lys, Val-Cit, Phe-Cit, Leu-Cit, Ile-Cit, Trp-Cit, Phe-Arg, Ala-Phe, Val-Ala, Met-Lys, Asn-Lys, Ile-Pro, Ile-Val, Asp-Val, His-Val, Met-(D)Lys, Asn-(D)Lys, Val-(D) Asp, NorVal-(D) Asp, Ala-(D) Asp, Me₃Lys-Pro, PhenylGly-(D)Lys, Met-(D)Lys, Asn-(D)Lys, Pro-(D)Lys, Met-(D)Lys, Met-Cit-Val, Gly-Cit-Val, (D) Phe-Phe-Lys, (D) Ala-Phe-Lys, Gly-Phe-Leu-Gly and Ala-Leu-Ala-Leu.

In some embodiments, in general Formula (IV), m is 1 (i.e. $AA_1$-$[AA_2]_m$ is a dipeptide).

In some embodiments, in general Formula (IV), $AA_1$-$[AA_2]_m$ is a dipeptide selected from Val-Lys, Ala-Lys, Phe-Lys, Val-Cit, Phe-Cit, Leu-Cit, Ile-Cit and Trp-Cit.

In some embodiments, in general Formula (IV), m is 1, 2 or 3.

In some embodiments, in general Formula (IV), s is 1.
In some embodiments, in general Formula (IV), o is 0.
In some embodiments, in general Formula (IV):
Z is

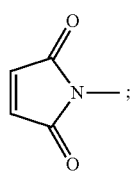

Str is

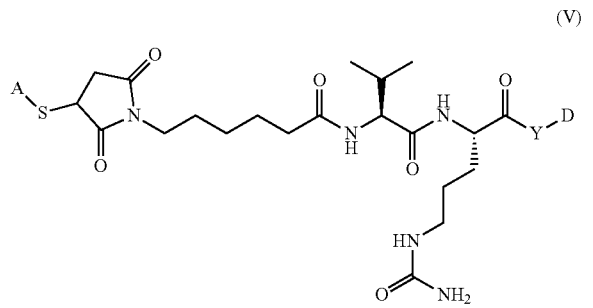

wherein p is an integer between
2 and 6, and q is an integer between 2 and 8;
m is 1 and $AA_1$-$[AA_2]_m$ is a dipeptide selected from Val-Lys, Ala-Lys, Phe-Lys, Val-Cit, Phe-Cit, Leu-Cit, Ile-Cit and Trp-Cit;
s is 1, and
o is 0.

In certain embodiments, the linker included in the ADCs for use in the methods described herein has general Formula (V):

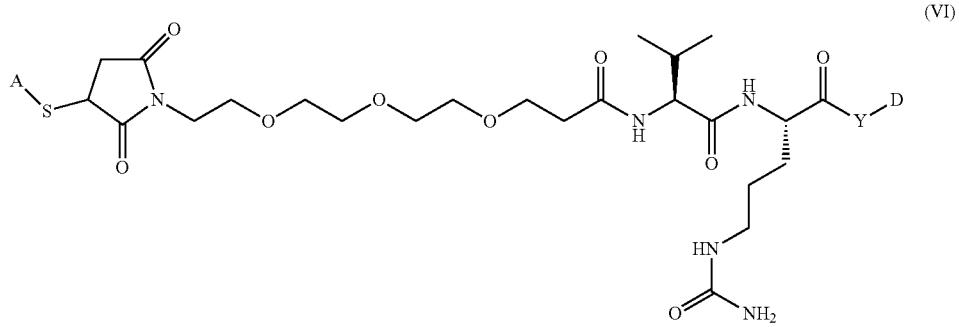

wherein:
A-S— is the point of attachment to the bispecific anti-HER2 antigen-binding construct;
Y is one or more additional linker components, or is absent, and
D is the point of attachment to the auristatin analogue.

In certain embodiments, the linker included in the ADCs for use in the methods described herein has general Formula (VI):

wherein:
A-S—is the point of attachment to the bispecific anti-HER2 antigen-binding construct;
Y is one or more additional linker components, or is absent, and
D is the point of attachment to the auristatin analogue.

In certain embodiments, the ADC for use in the methods described herein comprises an auristatin analogue of general Formula (I) conjugated to v10000 at a low average DAR via a linker having general Formula (IV), (V) or (VI).

In certain embodiments, the ADC for use in the methods described herein comprises v10000 conjugated at a low average DAR to a linker-toxin of general Formula (II) ni which the linker (L) has general Formula (IV), (V) or (VI).

In certain embodiments, the ADC for use in the methods described herein comprises v10000 and has general Formula (III) shown above in which the linker (L) has general Formula (IV), (V) or (VI).

In certain embodiments, the ADC for use in the methods described herein comprises an auristatin analogue conjugated to v10000 at a low average DAR via a linker having general Formula (IV), (V) or (VI), in which the auristatin analogue is Compound 16, Compound 17 or Compound 18.

In certain embodiments, the ADC for use in the methods described herein comprises a linker-toxin having the structure:

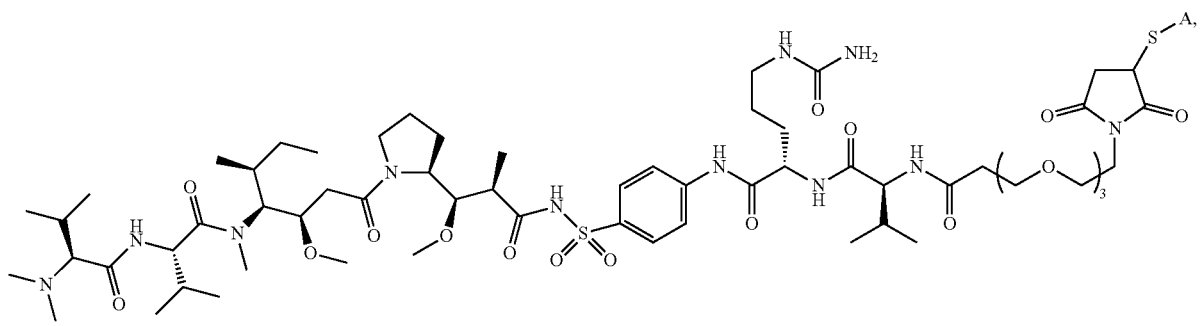

wherein A-S— is the point of attachment to the bispecific anti-HER2 antigen-binding construct.

Preparation of Antibody Drug Conjugates

The ADCs for use in the methods described herein may be prepared by one of several routes known in the art, employing organic chemistry reactions, conditions, and reagents known to those skilled in the art (see, for example, *Bioconjugate Techniques* (G.T. Hermanson, 2013, Academic Press, and the Examples provided herein). For example, conjugation may be achieved by (1) reaction of a nucleophilic group or an electrophilic group of an antibody with a bifunctional linker to form an antibody-linker intermediate Ab-L, via a covalent bond, followed by reaction with an activated auristatin analogue (D), or (2) reaction of a nucleophilic group or an electrophilic group of an auristatin analogue with a linker to form linker-toxin D-L, via a covalent bond, followed by reaction with a nucleophilic group or an electrophilic group of an antibody.

As described above, the auristatin analogue may be conjugated via an appropriate linker to various groups on the antibody to provide the ADC. For example, conjugation may be through surface lysines, through oxidized carbohydrates or through cysteine residues that have been liberated by reducing one or more interchain disulfide linkages. Alternatively, the antibody may be modified to include additional cysteine residues or non-natural amino acids that provide reactive handles, such as selenomethionine, p-acetylphenylalanine, formylglycine or p-azidomethyl-L-phenylalanine. Such modifications are well-known in the art (see, for example, U.S. Pat. Nos. 7,521,541; 8,455,622 and 9,000,130; Hofer et al., Biochemistry, 48:12047-12057 (2009); Axup et al., PNAS, 109:16101-16106 (2012); Wu et al., PNAS, 106:3000-3005 (2009); Zimmerman et al., Bioconj. Chem., 25:351-361 (2014)).

In certain embodiments, the ADCs for use in the methods described herein comprise an auristatin analogue conjugated via an appropriate linker to cysteine residues on the bispecific anti-HER2 antigen-binding construct that have been liberated by reducing one or more interchain disulfide linkages.

In the ADCs described herein, the bispecific anti-HER2 antigen-binding construct is conjugated to the toxin via a linker at a low average drug-to-antibody ratio (DAR), specifically an average DAR of less than 3.9 but more than 0.5, for example, between about 1.5 and about 2.5 in certain embodiments.

Various methods are known in the art to prepare ADCs with a low average DAR (see, for example, review by McCombs and Owen, The AAPS Journal, 17 (2): 339-351 (2015) and references therein; Boutureira & Bernardes, Chem. Rev., 115:2174-2195 (2015)).

For example, for conjugation to cysteine residues, a partial reduction of the antibody interchain disulfide bonds may be conducted followed by conjugation to linker-toxin. Partial reduction can be achieved by limiting the amount of reducing agent used in the reduction reaction (see, for example, Lyon et al., Methods in Enzymology, 502:123-138 (2012), and examples therein, and the Examples provided herein). Suitable reducing agents are known in the art and include, for example, dithiothreitol (DTT), tris(2-carboxyethyl)phosphine (TCEP), 2-mercaptoethanol, cysteamine and a number of water soluble phosphines. Alternatively, or in addition, fewer equivalents of linker-toxin may be employed in order to obtain a low average DAR.

Alternatively, an engineered antibody may be employed in which one or more of the cysteine residues that make up the interchain disulfide bonds is replaced with a serine residue resulting in fewer available cysteine residues for conjugation (see McDonagh et al., Protein Eng. Des. Sel. PEDS, 19 (7): 299-307). The engineered antibody can then be treated with reducing agent and conjugated to linker-toxin.

Another approach is to employ a bis-thiol linker that bridges two cysteines that normally make up an interchain disulfide bond. Use of a bis-thiol linker that carries only one toxin molecule would produce an ADC with a maximum DAR4 for a full-size antibody, if all four interchain disulfide bonds are reduced and replaced with the bis-thiol linker. Partial reduction of the interchain disulfide bonds and/or fewer equivalents of linker may be used in conjunction with a bis-thiol linker in order to further reduce the DAR. Various bis-thiol linkers are known in the art (see, for example, Badescu et al., Bioconjug. Chem., 25 (6): 1124-1136 (2014); Behrens et al., Mol. Pharm., 12:3986-3998 (2015); Lee et al., Chem. Sci., 7:799-802 (2016); Maruani et al., Nat. Commun., 6:6645 (2015)).

Cysteine engineering approaches may also be employed in order to generate ADCs with a low average DAR. Such approaches involve engineering solvent-accessible cysteines into the antibody in order to provide a site-specific handle for conjugation. A number of appropriate sites for introduction of a cysteine residue have been identified with the IgG structure, and include those described in Junutula, et al., J. Immunol Methods, 332 (1-2): 41-52 (2008); Junutula, et al., Nat. Biotechnol., 26 (8), 925-932 (2008), and U.S. Pat. Nos. 9,315,581; 9,000,130; 8,455,622; 8,507,654 and 7,521,541.

Low average DAR ADCs may also be prepared by lysine conjugation employing limiting amounts of activated linker-toxin. Selective reaction at the antibody N-terminal amino acids may also be employed. For example, N-terminal serine may be oxidized to an aldehyde with periodate, then reacted with linker-toxin (see, for example, Thompson, et al., Bioconjug. Chem., 26 (10): 2085-2096 (2015)). Similarly, N-terminal cysteine residues can be selectively reacted with aldehydes to give thiazolidinones (see, for example, Bernardes, et al., Nature Protocols, 8:2079-2089).

Additional approaches include engineering the antibody to include one or more unnatural amino acids, such as p-acetylphenylalanine (pAcPhe) or selenocysteine (Sec). The keto group in pAcPhe can be reacted with a linker-toxin comprising a terminal alkoxyamine or hydrazide to form an oxime or hydrazone bond (see, for example, Axup, et al., PNAS USA, 109:16101-16106 (2012)). Sec-containing antibodies can be reacted with maleimide- or iodoacetamide containing linker-toxins to form a selenoether conjugate (see, for example, Hofer, et al., Biochemistry, 48:12047-12057 (2009)).

Antibodies may also be engineered to include peptide tags recognized by certain enzymes to allow for enzyme-catalyzed conjugation. For example, Sortase-A (SortA) recognizes the sequence LPXTG. This pentapeptide may be engineered into the N- or C-terminus of the antibody to allow for SortA-mediated conjugation (see, for example, U.S. Patent Application Publication No. 2016/0136298; Kornberger and Skerra, mAbs, 6 (2): 354-366 (2014)). Transglutaminases have also been employed to generate DAR2 ADCs by using antibodies that have been deglycosylated at position N297 (which exposes Q295 for enzymatic conjugation) or by engineering antibodies to include a "glutamine tag" (LLQG) (Jeger, et al., Angew. Chem., 49:9995-9997 (2010); Strop, et al., Chem. Biol., 20 (2): 161-167 (2013)). In another approach, a formylglycine residue can be introduced into an antibody by engineering an appropriate consensus sequence into the antibody and co-expressing the engineered antibody with formylglycine-generating enzyme (FGE). The aldehyde functionality of the introduced formylglycine may then be used as a handle for conjugation of toxin (see, for example, Drake, et al., Bioconjug. Chem., 25 (7): 1331-1341 (2014)).

Another approach used to generate DAR2 ADCs is by conjugation of linker-toxin to the native sugars found on glycosylated antibodies. Conjugation to glycosylated antibodies may be achieved, for example, by periodate oxidation of terminal sugar residues to yield aldehydes, which may then be conjugated to an appropriate linker-toxin, or by glycoengineering approaches in which native sugars are modified with terminal sialic acid residues, which can then be oxidized to yield aldehydes for conjugation to linker-toxin (Zhou, et al., Bioconjug. Chem., 25 (3): 510-520 (2014)).

The use of UV cross-linking for conjugation of active moieties to antibodies has also been reported. This method uses the nucleotide binding site (NBS) for site-specific covalent functionalization of antibodies with reactive thiol moieties. An indole-3-butyric acid (IBA) conjugated version of cysteine was used to site-specifically photo-cross-link a reactive thiol moiety to antibodies at the NBS. The thiol moiety may then be used to conjugate linker-toxin having a thiol reactive group (Alves, et al., Bioconjug. Chem., 25 (7): 1198-1202 (2014)).

Alternatively, ADCs with a low average DAR may be isolated from an ADC preparation containing a mixture of DAR species using chromatographic separation techniques, such as hydrophobic interaction chromatography (see, for example, Hamblett, et al., Clin. Cancer Res., 10:7063-7070 (2004); Sun, et al., Bioconj Chem., 28:1371-81 (2017); U.S. Patent Application Publication No. 2014/0286968).

ADCs with a low average DAR may also be generated by adding unconjugated (i.e. DARO) antibody to preparations of ADC having an average DAR≥3.9. As is known in the art, the majority of conjugation methods yield an ADC preparation that includes various DAR species, with the reported DAR being the average of the individual DAR species. In certain embodiments, ADCs that include a proportion of DARO species may be advantageous. In some embodiments, the ADC for use in the methods described herein having an average DAR of less than 3.9 includes at least 5% DARO species. In some embodiments, the ADC for use in the methods described herein includes at least 10% DARO species, for example, at least 15% DARO species or at least 20% DARO species. In some embodiments, the ADC for use in the methods described herein includes between about 5% and about 50% DARO species, for example, between about 10% and about 50% DARO species, between about 10% and about 40%, or between about 10% and about 30% DARO species.

The average DAR for the ADCs may be determined by standard techniques such as UV/VIS spectroscopic analysis, ELISA-based techniques, chromatography techniques such as hydrophobic interaction chromatography (HIC), UV-MALDI mass spectrometry (MS) and MALDI-TOF MS. In addition, distribution of drug-linked forms (for example, the fraction of DARO, DAR1, DAR2, etc. species) may also be analyzed by various techniques known in the art, including MS (with or without an accompanying chromatographic separation step), hydrophobic interaction chromatography, reverse-phase HPLC or iso-electric focusing gel electrophoresis (IEF) (see, for example, Sun et al., Bioconj Chem., 28:1371-81 (2017); Wakankar et al., mAbs, 3:161-172 (2011)).

In certain embodiments, the average DAR of the ADCs is determined by hydrophobic interaction chromatography (HIC) techniques.

Following conjugation, the ADCs may be purified and separated from unconjugated reactants and/or any conjugate aggregates by purification methods known in the art. Such methods include, but are not limited to, size exclusion chromatography (SEC), hydrophobic interaction chromatography (HIC), ion exchange chromatography, chromato-focusing, ultrafiltration, centrifugal ultrafiltration, and combinations thereof.

Pharmaceutical Compositions

Also provided herein are pharmaceutical compositions comprising a bispecific anti-HER2 antigen-binding construct described herein. Pharmaceutical compositions comprise the bispecific anti-HER2 antigen-binding construct and a pharmaceutically acceptable carrier.

The term "pharmaceutically acceptable" means approved by a regulatory agency of the Federal or a state government or listed in the U.S. Pharmacopeia or other generally recognized pharmacopeia for use in animals, and more particularly in humans. The term "carrier" refers to a diluent, adjuvant, excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. In some aspects, the carrier is a man-made carrier not found in nature. Water can be used as a carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained-release formulations and the like. The composition can be formulated as a suppository, with traditional binders and carriers such as triglycerides. Oral formulation can include standard carriers such as pharmaceutical grades of mannitol, lactose, starch, magnesium stearate, sodium saccharine, cellulose, magnesium carbonate, etc. Examples of suitable pharmaceutical carriers are described in "Remington's Pharmaceutical Sciences" by E. W. Martin. Such compositions will contain a therapeutically effective amount of the bispecific anti-HER2 antigen-binding construct, preferably in purified form, together with a suitable amount of carrier so as to provide the form for proper administration to the patient. The formulation should suit the mode of administration.

In certain embodiments, the composition comprising the bispecific anti-HER2 antigen-binding construct is formulated in accordance with routine procedures as a pharmaceutical composition adapted for intravenous administration to human beings. Typically, compositions for intravenous administration are solutions in sterile isotonic aqueous buffer. Where necessary, the composition may also include a solubilizing agent and a local anesthetic such as lignocaine to ease pain at the site of the injection. Generally, the ingredients are supplied either separately or mixed together in unit dosage form, for example, as a dry lyophilized powder or water free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration.

In certain embodiments, the compositions described herein are formulated as neutral or salt forms. Pharmaceutically acceptable salts include those formed with anions such as those derived from hydrochloric, phosphoric, acetic, oxalic, tartaric acids, etc., and those formed with cations such as those derived from sodium, potassium, ammonium, calcium, ferric hydroxide isopropylamine, triethylamine, 2-ethylamino ethanol, histidine, procaine, etc.

Methods of Treating Biliary Tract Cancer (BTC)

Described herein are methods of treating biliary tract cancer (BTC) comprising administering to a subject having BTC, a bispecific anti-HER2 antigen-binding construct or ADC as described herein, in an amount effective to treat, prevent or ameliorate this disease or disorder. In specific embodiments of the methods described herein, the bispecific anti-HER2 antigen-binding construct is v10000. In other specific embodiments of the methods described herein, the ADC is v10000 linked to an auristatin analogue.

"Disorder" or "disease" refers to any condition that would benefit from treatment with a bispecific anti-HER2 antigen-binding construct or method described herein. This includes chronic and acute disorders or diseases including those pathological conditions which predispose the mammal to the disorder in question. In the embodiments described herein, the disorder or disease is biliary tract cancer, described in more detail below.

The term "subject" or "patient" refers to an animal, in some embodiments a mammal, which is the object of treatment, observation or experiment. An animal may be a human, a non-human primate, a companion animal (e.g., dogs, cats, and the like), farm animal (e.g., cows, sheep, pigs, horses, and the like) or a laboratory animal (e.g., rats, mice, guinea pigs, and the like).

The term "mammal" as used herein includes but is not limited to humans, non-human primates, canines, felines, murines, bovines, equines, and porcines.

"Treatment" refers to clinical intervention in an attempt to alter the natural course of the individual or cell being treated and can be performed during the course of clinical pathology. Desirable effects of treatment include, but are not limited to, preventing recurrence of disease, alleviation of symptoms, diminishing of any direct or indirect pathological consequences of the disease, preventing metastasis, decreasing the rate of disease progression, amelioration or palliation of the disease state, and remission or improved prognosis. In some embodiments, bispecific anti-HER2 antigen-binding constructs or ADCs may be used to delay development of a disease or to slow the progression of a disease. In some embodiments, bispecific anti-HER2 antigen-binding constructs or ADCs may be used to delay development of a BTC. In one embodiment, bispecific anti-HER2 antigen-binding constructs, ADCs, and methods described herein may effect inhibition of BTC tumor/cancer growth. In another embodiment, the bispecific anti-HER2 antigen-binding construct or ADC may be used to slow the progression of a BTC.

The term "effective amount" as used herein refers to that amount of bispecific anti-HER2 antigen-binding construct being administered, which will accomplish the goal of the recited method, e.g., relieve to some extent one or more of the symptoms of the disease, condition or disorder being treated. The amount of the bispecific anti-HER2 antigen-binding construct which will be effective in the treatment, or inhibition of the disease or disorder can be determined by standard clinical techniques. In addition, in vitro assays may optionally be employed to help identify optimal dosage ranges. The precise dose to be employed in the formulation will also depend on the route of administration, and the seriousness of the BTC, and should be decided according to the judgment of the practitioner and each patient's circumstances. Effective doses can be extrapolated from dose-response curves derived from in vitro or animal model test systems.

The term "first-line therapy," "first-line treatment" or "primary therapy" is a treatment regimen that is generally accepted as the initial treatment for a patient, taking into account the type and stage of a cancer. The term "second-line therapy" or "second-line treatment" is a treatment regimen that is typically administered if the first-line therapy does not provide the desired efficacy.

The term "neoadjuvant therapy" refers to treatment given as a first step to shrink a tumor before the main treatment, usually surgery, is given. Examples of neoadjuvant therapy include, but are not limited to, chemotherapy, radiation therapy, and hormone therapy. Neoadjuvant therapy may be considered as a first-line therapy.

The term "adjuvant therapy" refers to an additional cancer treatment given after the first-line treatment to lower the risk that the cancer will come back. Adjuvant therapy may include, but are not limited to, chemotherapy, radiation therapy, hormone therapy, targeted therapy (typically small molecule drugs or antibodies that target specific types of cancer cells rather than normal cells), or biological therapy (such as vaccines, cytokines, antibodies, or gene therapy, for example).

An "advanced cancer" is a cancer that has developed to the point where it cannot be safely removed or where a cure or long-term remission is highly unlikely. Cancers become advanced by growing adjacent to structures that prevent their removal or by spreading from where they started, crossing tissue lines, or to other parts of the body such as lymph nodes or other organs. Advanced cancers may be locally advanced, meaning that they have spread outside the organ of the primary site, but have not yet spread to distant sites. Advanced cancers may also be metastatic, meaning that the cancer cells have spread from the site were the cancer started (the primary site) to other more distant parts of the body (secondary sites).

A "resectable" cancer is one that can be treated by surgery. An "unresectable" cancer is one that cannot be treated by surgery, typically because the cancer has spread to the tissues surrounding the main tumor. Certain cancers may be assessed by a medical practitioner as "partially resectable" based on the degree of spread to surrounding tissues.

The bispecific anti-HER2 antigen-binding construct or ADC may be administered to the subject according to known methods. Various delivery systems are known and can be used to administer a bispecific anti-HER2 antigen-binding construct formulation described herein, e.g., encapsulation in liposomes, microparticles, microcapsules, recombinant cells capable of expressing the compound, receptor-mediated endocytosis (see, e.g., Wu and Wu, J. Biol. Chem. 262:4429-4432 (1987)), construction of a nucleic acid as part of a retroviral or other vector, etc. Methods of introduction include but are not limited to intradermal, intramuscular, intraperitoneal, intravenous, subcutaneous, intranasal, epidural, and oral routes. The bispecific anti-HER2 antigen-binding construct or ADC may be administered by any convenient route, for example by infusion or bolus injection, by absorption through epithelial or mucocutaneous linings (e.g., oral mucosa, rectal and intestinal mucosa, etc.) and may be administered together with other biologically active agents. Administration can be systemic or local. In addition, in certain embodiments, it may be desirable to introduce the bispecific anti-HER2 antigen-binding constructs described herein into the central nervous system by any suitable route, including intraventricular and intrathecal injection; intraventricular injection may be facilitated by an intraventricular catheter, for example, attached to a reservoir, such as an Ommaya reservoir. Pulmonary administration can also be employed, e.g., by use of an inhaler or nebulizer, and formulation with an aerosolizing agent. In specific embodiments, the bispecific anti-HER2 antigen-binding construct or ADC may be administered intravenously (IV).

In a specific embodiment, it may be desirable to administer the bispecific anti-HER2 antigen-binding constructs, or ADCs described herein locally to the area in need of treatment; this may be achieved by, for example, and not by way of limitation, local infusion during surgery, topical application, e.g., in conjunction with a wound dressing after surgery, by injection, by means of a catheter, by means of a suppository, or by means of an implant, said implant being of a porous, non-porous, or gelatinous material, including membranes, such as sialastic membranes, or fibers. Preferably, when administering a protein, such as a bispecific anti-HER2 antigen-binding construct, care must be taken to use materials to which the protein does not absorb.

In another embodiment, the bispecific anti-HER2 antigen-binding constructs or ADCs can be delivered in a vesicle, in particular a liposome (see Langer, Science 249:1527-1533 (1990); Treat et al., in Liposomes in the Therapy of Infectious Disease and Cancer, Lopez-Berestein and Fidler (eds.), Liss, New York, pp. 353-365 (1989); Lopez-Berestein, ibid., pp. 317-327; see generally ibid.)

In yet another embodiment, the bispecific anti-HER2 antigen-binding constructs or ADCs can be delivered in a controlled release system. In one embodiment, a pump may be used (see Langer, supra; Sefton, CRC Crit. Ref. Biomed. Eng. 14:201 (1987); Buchwald et al., Surgery 88:507 (1980); Saudek et al., N. Engl. J. Med. 321:574 (1989)). In another embodiment, polymeric materials can be used (see Medical Applications of Controlled Release, Langer and Wise (eds.), CRC Pres., Boca Raton, Fla. (1974); Controlled Drug Bioavailability, Drug Product Design and Performance, Smolen and Ball (eds.), Wiley, New York (1984); Ranger and Peppas, J., Macromol. Sci. Rev. Macromol. Chem. 23:61 (1983); see also Levy et al., Science 228:190 (1985); During et al., Ann. Neurol. 25:351 (1989); Howard et al., J. Neurosurg. 71:105 (1989)). In yet another embodiment, a controlled release system can be placed in proximity of the therapeutic target, thus requiring only a fraction of the systemic dose (see, e.g., Goodson, in Medical Applications of Controlled Release, vol. 2, pp. 115-138 (1984)).

The bispecific anti-HER2 antigen-binding constructs or ADCs may be administered alone or in conjunction with other types of treatments (e.g., radiation therapy, chemotherapy, hormonal therapy, immunotherapy and anti-tumor agents). Generally, administration of products of a species origin or species reactivity (in the case of antibodies) that is the same species as that of the patient is preferred. Thus, in an embodiment, human or humanized bispecific anti-HER2 antigen-binding constructs, fragments derivatives, analogs, or nucleic acids, are administered to a human patient for therapy or prophylaxis.

Biliary tract cancers (BTCs, also referred to as "biliary cancers") include gall bladder cancer, ampullary carcinoma, cholangiocarcinoma, and cystic duct adenocarcinoma. Cholangiocarcinoma (CCA) can also be classified as intrahepatic CCA or extrahepatic CCA. In one embodiment, the bispecific anti-HER2 antigen-binding constructs or ADCs may be used in a method of treating BTC. In one embodiment, the bispecific anti-HER2 antigen-binding constructs or ADCs described herein may be used in a method of treating advanced unresectable BTC. In other embodiments, the bispecific anti-HER2 antigen-binding constructs or ADCs described herein may be used in a method of treating gall bladder cancer, ampullary carcinoma, cholangiocarcinoma, or cystic duct adenocarcinoma. In other embodiments, the bispecific anti-HER2 antigen-binding constructs or ADCs described herein may be used in a method of treating intrahepatic CCA or extrahepatic CCA.

In one embodiment, the bispecific anti-HER2 antigen-binding constructs or ADCs may be used to treat a subject having a BTC that displays HER2 expression, amplification, or activation. A BTC which "displays HER2 expression, amplification, or activation" is one which, in a diagnostic test, expresses (including overexpresses) a HER2 receptor, has amplified HER2 gene, and/or otherwise demonstrates activation or phosphorylation of a HER2 receptor.

A BTC which "displays HER2 activation" is one which, in a diagnostic test, demonstrates activation or phosphorylation of a HER2 receptor. Such activation can be determined directly (e.g. by measuring HER2 phosphorylation by ELISA) or indirectly (e.g. by gene expression profiling). In one embodiment, the bispecific anti-HER2 antigen-binding constructs or ADCs may be used to treat a subject having a BTC that displays HER2 expression.

A BTC with "HER2 receptor overexpression or amplification" is one which has significantly higher levels of a HER2 receptor protein or gene compared to a noncancerous cell of the same tissue type. Such overexpression may be caused by gene amplification or by increased transcription or translation. HER2 receptor overexpression or amplification may be determined in a diagnostic or prognostic assay by evaluating increased levels of the HER2 protein present on the surface of a cell (e.g. via an immunohistochemistry assay; IHC). In one embodiment, HER2 overexpression may be analyzed by IHC, e.g. using the HERCEPTEST® (Dako). Paraffin embedded tissue sections from a tumor biopsy may be subjected to the IHC assay and accorded a HER2 protein staining intensity criteria as follows:

Score 0: no staining is observed or membrane staining is observed in less than 10% of tumor cells.

Score 1+: a faint/barely perceptible membrane staining is detected in more than 10% of the tumor cells. The cells are only stained in part of their membrane.

Score 2+: a weak to moderate complete membrane staining is observed in more than 10% of the tumor cells.

Score 3+: a moderate to strong complete membrane staining is observed in more than 10% of the tumor cells.

Those tumors with 0 or 1+ scores for HER2 overexpression assessment may be characterized as not overexpressing HER2, whereas those tumors with 2+ or 3+ scores may be characterized as overexpressing HER2. In one embodiment, the bispecific anti-HER2 antigen-binding constructs or ADCs may be used to treat a subject having a BTC that displays HER2 overexpression and/or amplification.

Alternatively, or additionally, one may measure levels of HER2-encoding nucleic acid in the cell, e.g. via in situ hybridization (ISH), including fluorescent in situ hybridization (FISH; see WO98/45479 published October 1998) and chromogenic in situ hybridization (CISH; see, e.g. Tanner et al., Am. J. Pathol. 157 (5): 1467-1472 (2000); Bella et al., J. Clin. Oncol. 26: (May 20 suppl; abstr 22147) (2008)), southern blotting, polymerase chain reaction (PCR) techniques, such as quantitative real time PCR (qRT-PCR), or next-generation sequencing (NGS). Assessment of HER2 gene amplification using these methods is typically reported as positive (+) or negative (−), for example FISH+ for HER2 gene amplified cancers or FISH− for cancers that are not HER2 gene amplified. Assessment of HER2 gene amplification by NGS may also be reported with regard to the number of HER2 gene copies. In normal cells, there are two copies of the HER2 gene. Accordingly, a cancer may be considered to be a HER2 gene amplified cancer if it has more than two copies of the HER2 gene.

Described herein are methods of treating a subject having a BTC that displays HER2 expression, amplification or activation, comprising providing to the subject an effective amount of a bispecific anti-HER2 antigen-binding construct or ADC described herein. In some embodiments, the bispecific anti-HER2 antigen-binding construct or ADC may be used in the treatment of a subject having a HER2 3+, gene amplified BTC. In other embodiments, the bispecific anti-HER2 antigen-binding construct or ADC may be used in the treatment of a HER2 2+, gene amplified BTC. In other embodiments, the bispecific anti-HER2 antigen-binding construct or ADC may be used in the treatment of a HER2 1+, gene amplified BTC. In other embodiments, the bispecific anti-HER2 antigen-binding construct or ADC may be used in the treatment of a BTC assessed as HER2 3+, without HER2 gene amplification. In other embodiments, the bispecific anti-HER2 antigen-binding construct or ADC may be used in the treatment of a BTC assessed as HER2 2+, without HER2 gene amplification. In other embodiments, the bispecific anti-HER2 antigen-binding construct or ADC may be used in the treatment of a BTC assessed as HER2 1+, without HER2 gene amplification.

In some embodiments, the subject being treated may have had no prior treatment for BTC and the bispecific anti-HER2 antigen-binding construct or ADC is administered as a first-line treatment. In some embodiments, the bispecific anti-HER2 antigen-binding construct or ADC may be used as adjuvant or neoadjuvant therapy to treat subjects having resectable or partially resectable cancer. In other embodiments, the subject being treated may have had one or more prior treatments for BTC and the bispecific anti-HER2 antigen-binding construct or ADC is administered as a second-line treatment. One or more prior treatments for BTC may include treatments selected from systemic chemotherapy such as gemcitabine alone or with a platinum-based chemotherapeutic, fluoropyrimidine-based chemoradiation, radiotherapy without additional chemotherapy, antibodies (including, but not limited to anti-HER2 targeting antibodies) and investigational agents (i.e. those currently undergoing clinical trials but that have not yet been approved by the FDA). Platinum-based chemotherapeutic agents may include cisplatin or oxaliplatin. In one embodiment, systemic chemotherapy comprises gemcitabine with cisplatin, or gemcitabine with oxaliplatin.

Exemplary effective amounts of the bispecific anti-HER2 antigen-binding construct or ADC that may be administered to a subject with BTC can be between 0.1 mg/kg and 100 mg/kg body weight of the subject. In some embodiments, the bispecific anti-HER2 antigen-binding construct or ADC is administered at 1, 2, 3, 4, 5, 6, 7, 8, 9, 10, 20, 30, 40, 50, 60, 70, 80, 90, or 100 mg/kg body weight.

In some embodiments, the bispecific anti-HER2 antigen-binding construct is administered weekly, biweekly (Q2W), every three weeks (Q3W), or every 4 weeks (Q4W). Exemplary effective amounts for weekly dosing of the bispecific anti-HER2 antigen-binding construct range between about 1 mg/kg to about 30 mg/kg. Exemplary effective amounts for biweekly dosing of the bispecific anti-HER2 antigen-binding construct range between about 10 mg/kg to about 50 mg/kg. Exemplary effective amounts for dosing of the bispecific anti-HER2 antigen-binding construct every three weeks range between about 15 mg/kg to about 50 mg/kg. Exemplary effective amounts for dosing of the bispecific anti-HER2 antigen-binding construct every four weeks range between about 40 mg/kg to about 70 mg/kg.

In some embodiments the effective amount of the bispecific anti-HER2 antigen-binding construct is 5, 10, or 15 mg/kg weekly. In some embodiments the bispecific anti-HER2 antigen-binding construct is 10 mg/kg weekly. In some embodiments the effective amount of the bispecific anti-HER2 antigen-binding construct is 20, 25, or 30 mg/kg every two weeks. In other embodiments, the effective amount of the bispecific anti-HER2 antigen-binding construct is 20 mg/kg every two weeks. In alternate embodiments, the effective amount of the bispecific anti-HER2 antigen-binding construct is 20 mg/kg every three weeks. In still other embodiments, the effective amount of the bispecific anti-HER2 antigen-binding construct is 30 mg/kg every three weeks. In further embodiments, the effective amount of the bispecific anti-HER2 antigen-binding construct is 40 mg/kg every four weeks. In some embodiments the effective amount of the bispecific anti-HER2 antigen-binding construct is an initial dose of 20, 25, or 30 mg/kg, followed by a lower dose of the bispecific anti-HER2 antigen-binding construct.

As is known in the art, ADCs may be administered to subjects in doses that are lower than the doses used for the bispecific anti-HER2 antigen-binding construct. In some embodiments, the ADC described herein (i.e. a bispecific anti-HER2 antigen-binding construct linked to an auristatin analogue) is administered weekly, biweekly (Q2W), every three weeks (Q3W), or every 4 weeks (Q4W). In some embodiments the ADC that may be administered to a subject with BTC is between about 1 to about 15 mg/kg weekly, every two weeks, or every three weeks.

As indicated above, in specific embodiments, the bispecific anti-HER2 antigen-binding construct or ADC may be administered intravenously. In one embodiment, the bispecific anti-HER2 antigen-binding construct may be administered by IV infusion in 0.9% saline over 120 to 150 minutes. In one embodiment, the bispecific anti-HER2 antigen-binding construct may be administered by IV infusion in 0.9% saline over 90 minutes. In one embodiment, the bispecific anti-HER2 antigen-binding construct may be administered by IV infusion in 0.9% saline over 60 minutes. In related embodiments, the infusion rate may not exceed 250 mL of normal saline per hour.

Also provided herein are methods of treating a subject having a BTC comprising administering an effective amount of a bispecific anti-HER2 antigen-binding construct or ADC in conjunction with additional anti-tumor treatments. The additional anti-tumor treatments may be selected from one or more treatments for BTC including systemic chemotherapy such as gemcitabine alone or with a platinum-based chemotherapeutic, fluoropyrimidine-based chemoradiation, radiotherapy without additional chemotherapy, and investigational agents (i.e. those currently undergoing clinical trials but that have not yet been approved by the FDA). In one embodiment, method of treating a subject having BTC comprises administering an effective amount of a bispecific anti-HER2 antigen-binding construct or ADC in conjunction with gemcitabine and cisplatin, or in conjunction with gemcitabine and oxaliplatin. In one embodiment, the bispecific anti-HER2 antigen-binding construct or ADC may be administered in conjunction with a fluoropyrimidine drug and a platinum-based drug. Examples of fluoropyrimidine drugs include but are not limited to fluorouracil (5-FU), capecitabine or gemcitabine. Examples of platinum-based drugs include but are not limited to cisplatin or oxaliplatin. In other embodiments, the bispecific anti-HER2 antigen-binding construct or ADC may be administered in conjunction with 5-FU, oxaliplatin, and leucovorin. In still other embodiments where the subject has a BTC that is MSI-H/dMMR (High levels of MicroSatellite Instability/deficient MisMatch Repair), the bispecific anti-HER2 antigen-binding construct or ADC may be administered in conjunction with an immune checkpoint inhibitor such as the anti-PD1 antibody pembrolizumab (Keytruda™) or the anti-PD-L1 antibody atezolizumab (TECENTRIQ®).

Additional anti-tumor treatments for BTC are known in the art as described in Table 2 of Simile et al. (2019) Medicina 55:42. One of skill in the art would be able to identify which of these treatments may be administered in conjunction with the bispecific anti-HER2 antigen-binding construct or ADCs described herein.

The additional anti-tumor treatments described in the preceding paragraphs may be administered concurrently with the bispecific anti-HER2 antigen-binding construct or ADC, or may be administered sequentially.

In some embodiments, the result of providing an effective amount of the bispecific anti-HER2 antigen-binding construct to a subject having a BTC is shrinking the lesion(s), inhibiting growth of the lesion(s), increasing time to progression of the lesion(s), prolonging disease-free survival of the subject, decreasing metastases, increasing the progression-free survival of the subject, or increasing overall survival of the subject or increasing the overall survival of a group of subjects receiving the treatment. In related embodiments, the result of providing an effective amount of the bispecific anti-HER2 antigen-binding construct to a subject is a partial response (PR) or stable disease (SD) in the subject, as measured by the revised Response Evaluation Criteria in Solid Tumors (RECIST) guideline (version 1.1) [Eur J Ca 45:228-247, 2009]. In subjects having metastatic disease and either a CR or PR, duration of response may also be measured.

As used herein, the term "progressive disease" (PD) refers to the appearance of one or more new lesions and/or unequivocal progression of existing non-target lesions. PD may be declared on the basis of "unequivocal progression" in cases where the overall tumor burden increases significantly enough to require a change in therapy; in most cases, a modest increase in the size of one or more non-target lesions is not sufficient to qualify (especially in the presence of SD or PR in target disease).

As used herein, the term "partial response," (PR) refers to at least a 30% decrease in the sum of the diameters of target lesions (including the short axes of any target lymph nodes), taking as reference the baseline sum diameter.

As used herein, the term "complete response" (CR) refers to the disappearance of all non-target lesions, the normalization of the tumor marker level (if tumor markers are measured and are initially above the upper limit of normal, those must normalize for a patient to be considered in complete clinical response). All lymph nodes must be <10 mm (short axis).

As used herein, the term "stable disease" (SD) refers to neither sufficient shrinkage to qualify for PR nor sufficient increase to qualify for PD, taking as reference the smallest sum diameter since the treatment started.

As used herein, the term "objective response rate" (ORR) is the proportion of all randomized patients who receive any amount of study medication with PR or CR according to RECIST v 1.1 from the start of the treatment until disease progression/recurrence (taking as reference for PD the smallest measurements recorded since the treatment started).

As used herein, the term "overall survival" (OS) refers to the time from the date of randomization to the date of death from any cause.

As used herein, the term "progression-free survival" (PFS) refers to the patient remaining alive without the cancer progressing or getting worse. In one embodiment, PFS is defined as the time from randomization in the Study until the first radiographic documentation of objective progression as defined by RECIST (Version 1.1), or death from any cause. Patients who die without a reported prior progression will be considered to have progressed on the day of their death. Patients who did not progress or are lost to follow-up will be censored at the day of their last radiographic tumor assessment.

As used herein, the term "disease-free survival" (DFS) refers to the length of time after primary treatment for a cancer ends that the patient survives without any signs or symptoms of that cancer. DFS may also be referred to as "relapse-free survival" (RFS).

As used herein, the term "time to progression" (TTP) refers to the length of time from the date of diagnosis or the start of treatment for a cancer until the cancer starts to get worse or spread to other parts of the body.

As used herein, the term "disease control rate" (DCR) refers to lack of disease progression and rate thereof. It refers to the group of patients with a best overall response categorized as CR, PR or SD (specifically excluding the patients with PD), wherein the best overall response is the best response recorded from the start of treatment until PD.

As used herein, the term "duration of overall response" (DOR) refers to the period measured from the time that measurement criteria are met for complete or partial response (whichever status is recorded first) until the first date that recurrent or progressive disease is objectively documented, taking as reference the smallest measurements recorded since treatment started.

In some embodiments, the result of providing an effective amount of the bispecific anti-HER2 antigen-binding construct or ADC to a subject having a BTC is increasing the disease control rate (DCR) in a group of subjects. DCR may be useful to measure the efficacy of therapies that have tumoristatic effects rather than tumoricidal effects. The DCR is calculated as the percentage of patients having BTC exhibiting CR, PR or SD after treatment with the bispecific anti-HER2 or ADC. In one embodiment, administration of an effective amount of the bispecific anti-HER2 antigen-binding construct or ADC to subjects results in a DCR greater than 10%, 15%, 20%, 25%, 30%, 35%, 40%, 45%, 50%, 55%, 60%, 65%, 70%, 75%, 80%, 85%, 90%, or 95%. In other embodiments, administration of an effective amount of the bispecific anti-HER2 antigen-binding construct or ADC to subjects results in a DCR greater than 20%, 25%, 30%, 35%, 40%, 45%, 50%, 55%, 60%, 65%, 70%, 75%, 80%, 85%, 90%, or 95%.

PFS (progression-free survival) and ORR (overall response rate) may also be used to determine the efficacy of the bispecific anti-HER2 antigen-binding construct or ADC and are measured according to the revised RECIST 1.1 guidelines noted above. PFS is defined as the time from randomization until objective tumor progression or death. ORR is defined as the proportion of subjects having BTC who have a partial or complete response to therapy with a bispecific anti-HER2 antigen-binding construct or ADC. ORR may be used as a measure of drug tumoricidal activity. In some embodiments, the result of providing an effective amount of the bispecific anti-HER2 antigen-binding construct or ADC to a subject having BTC is increasing the progression-free survival (PFS) in a group of subjects. In some embodiments, the result of providing an effective amount of the bispecific anti-HER2 antigen-binding construct or ADC to a subject having BTC is increasing the overall response rate (ORR). In one embodiment, administration of an effective amount of the bispecific anti-HER2 antigen-binding construct or ADC to subjects results in an ORR greater than 10%, 15%, 20%, 25%, 30%, 35%, 40%, 45%, 50%, 55%, 60%, 65%, 70%, 75%, 80%, 85%, 90%, or 95%. In yet another embodiment, administration of an effective amount of the bispecific anti-HER2 antigen-binding construct or ADC to subjects results in an ORR greater than 20%, 25%, 30%, 35%, 40%, 45%, 50%, 55%, 60%, 65%, 70%, 75%, 80%, 85%, 90%, or 95%.

Overall survival, time to progression, duration of response (DOR) (may also be used to determine the efficacy of the bispecific anti-HER2 antigen-binding construct or ADC.

When the bispecific anti-HER2 antigen-binding construct or ADC is administered as an adjuvant or neoadjuvant therapy, disease-free survival may also be measured to determine the efficacy of the therapy.

Kits and Articles of Manufacture

Also described herein are kits comprising one or more bispecific anti-HER2 antigen-binding constructs or ADCs. Individual components of the kit would be packaged in separate containers and, associated with such containers, can be a notice in the form prescribed by a governmental agency regulating the manufacture, use or sale of pharmaceuticals or biological products, which notice reflects approval by the agency of manufacture, use or sale. The kit may optionally contain instructions or directions outlining the method of use or administration regimen for the bispecific anti-HER2 antigen-binding construct or ADC.

When one or more components of the kit are provided as solutions, for example an aqueous solution, or a sterile aqueous solution, the container means may itself be an inhalant, syringe, pipette, eye dropper, or other such like apparatus, from which the solution may be administered to a subject or applied to and mixed with the other components of the kit.

The components of the kit may also be provided in dried or lyophilized form and the kit can additionally contain a suitable solvent for reconstitution of the lyophilized components. Irrespective of the number or type of containers, the kits described herein also may comprise an instrument for assisting with the administration of the composition to a patient. Such an instrument may be an inhalant, nasal spray device, syringe, pipette, forceps, measured spoon, eye dropper or similar medically approved delivery vehicle.

In another aspect described herein, an article of manufacture containing materials useful for the treatment, prevention and/or diagnosis of BTC is provided. The article of manufacture comprises a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). The label or package insert indicates that the composition is used for treating the condition of choice. Moreover, the article of manufacture may comprise (a) a first container with a composition contained therein, wherein the composition comprises an bispecific anti-HER2 antigen-binding construct or ADC described herein; and (b) a second container with a composition contained therein, wherein the composition comprises a further cytotoxic or otherwise therapeutic agent. The article of manufacture in this embodiment described herein may further comprise a package insert indicating that the compositions can be used to treat BTC. Alternatively, or additionally, the article of manufacture may further comprise a second (or third) container comprising a pharmaceutically acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

Polypeptides and Polynucleotides

The bispecific anti-HER2 antigen-binding constructs described herein comprise at least one polypeptide. Also described are polynucleotides encoding the polypeptides described herein. The bispecific anti-HER2 antigen-binding constructs are typically isolated.

As used herein, "isolated" means an agent (e.g., a polypeptide or polynucleotide) that has been identified and separated and/or recovered from a component of its natural cell culture environment. Contaminant components of its natural environment are materials that would interfere with diagnostic or therapeutic uses for the bispecific anti-HER2 antigen-binding construct, and may include enzymes, hormones, and other proteinaceous or non-proteinaceous solutes. Isolated also refers to an agent that has been synthetically produced, e.g., via human intervention.

The terms "polypeptide," "peptide" and "protein" are used interchangeably herein to refer to a polymer of amino acid residues. That is, a description directed to a polypeptide applies equally to a description of a peptide and a description of a protein, and vice versa. The terms apply to naturally occurring amino acid polymers as well as amino acid polymers in which one or more amino acid residues is a non-naturally encoded amino acid. As used herein, the terms encompass amino acid chains of any length, including full length proteins, wherein the amino acid residues are linked by covalent peptide bonds.

The term "amino acid" refers to naturally occurring and non-naturally occurring amino acids, as well as amino acid analogs and amino acid mimetics that function in a manner similar to the naturally occurring amino acids. Naturally encoded amino acids are the 20 common amino acids (alanine, arginine, asparagine, aspartic acid, cysteine, glutamine, glutamic acid, glycine, histidine, isoleucine, leucine, lysine, methionine, phenylalanine, praline, serine, threonine, tryptophan, tyrosine, and valine) and pyrrolysine and selenocysteine. Amino acid analogs refers to compounds that have the same basic chemical structure as a naturally occurring amino acid, i.e., an a carbon that is bound to a hydrogen, a carboxyl group, an amino group, and an R group, such as, homoserine, norleucine, methionine sulfoxide, methionine methyl sulfonium. Such analogs have modified R groups (such as, norleucine) or modified peptide backbones, but retain the same basic chemical structure as a naturally occurring amino acid. Reference to an amino acid includes, for example, naturally occurring proteogenic L-amino acids; D-amino acids, chemically modified amino acids such as amino acid variants and derivatives; naturally occurring non-proteogenic amino acids such as B-alanine, ornithine, etc.; and chemically synthesized compounds having properties known in the art to be characteristic of amino acids. Examples of non-naturally occurring amino acids include, but are not limited to, «-methyl amino acids (e.g. α-methyl alanine), D-amino acids, histidine-like amino acids (e.g., 2-amino-histidine, β-hydroxy-histidine, homohistidine), amino acids having an extra methylene in the side chain ("homo" amino acids), and amino acids in which a carboxylic acid functional group in the side chain is replaced with a sulfonic acid group (e.g., cysteic acid). The incorporation of non-natural amino acids, including synthetic non-native amino acids, substituted amino acids, or one or more D-amino acids into the proteins described herein may be advantageous in a number of different ways. D-amino acid-containing peptides, etc., exhibit increased stability in vitro or in vivo compared to L-amino acid-containing counterparts. Thus, the construction of peptides, etc., incorporating D-amino acids can be particularly useful when greater intracellular stability is desired or required. More specifically, D-peptides, etc., are resistant to endogenous peptidases and proteases, thereby providing improved bioavailability of the molecule, and prolonged lifetimes in vivo when such properties are desirable. Additionally, D-peptides, etc., cannot be processed efficiently for major histocompatibility complex class II-restricted presentation to T helper cells, and are therefore, less likely to induce humoral immune responses in the whole organism.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

Also described herein are polynucleotides encoding polypeptides of the bispecific anti-HER2 antigen-binding constructs. The term "polynucleotide" or "nucleotide sequence" is intended to indicate a consecutive stretch of two or more nucleotide molecules. The nucleotide sequence may be of genomic, cDNA, RNA, semisynthetic or synthetic origin, or any combination thereof.

The term "nucleic acid" refers to deoxyribonucleotides, deoxyribonucleosides, ribonucleosides, or ribonucleotides and polymers thereof in either single- or double-stranded form. Unless specifically limited, the term encompasses nucleic acids containing known analogues of natural nucleotides which have similar binding properties as the reference nucleic acid and are metabolized in a manner similar to naturally occurring nucleotides. Unless specifically limited otherwise, the term also refers to oligonucleotide analogs including PNA (peptidonucleic acid), analogs of DNA used in antisense technology (phosphorothioates, phosphoroamidates, and the like). Unless otherwise indicated, a particular nucleic acid sequence also implicitly encompasses conservatively modified variants thereof (including but not limited to, degenerate codon substitutions) and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260:2605-2608 (1985); Rossolini et al., Mol. Cell. Probes 8:91-98 (1994)).

"Conservatively modified variants" applies to both amino acid and nucleic acid sequences. With respect to particular nucleic acid sequences, "conservatively modified variants" refers to those nucleic acids which encode identical or essentially identical amino acid sequences, or where the nucleic acid does not encode an amino acid sequence, to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of ordinary skill in the art will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid which encodes a polypeptide is implicit in each described sequence.

As to amino acid sequences, one of ordinary skill in the art will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the deletion of an amino acid, addition of an amino acid, or substitution of an amino acid with a chemically similar amino acid. Conservative substitution tables providing functionally similar amino acids are known to those of ordinary skill in the art. Such conservatively modified variants are in addition to and do not exclude polymorphic variants, interspecies homologs, and alleles described herein.

Conservative substitution tables providing functionally similar amino acids are known to those of ordinary skill in the art. The following eight groups each contain amino acids that are conservative substitutions for one another: 1) Alanine (A), Glycine (G); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); 6) Phenylalanine (F), Tyrosine (Y), Tryptophan (W); 7) Serine(S), Threonine (T); and 8) Cysteine (C), Methionine (M) (see, e.g., Creighton, Proteins: Structures and Molecular Properties (W H Freeman & Co.; 2nd edition (December 1993)

The terms "identical" or percent "identity," in the context of two or more nucleic acids or polypeptide sequences, refer to two or more sequences or subsequences that are the same. Sequences are "substantially identical" if they have a percentage of amino acid residues or nucleotides that are the same (i.e., about 60% identity, about 65%, about 70%, about 75%, about 80%, about 85%, about 90%, or about 95% identity over a specified region), when compared and aligned for maximum correspondence over a comparison window, or designated region as measured using one of the following sequence comparison algorithms (or other algorithms available to persons of ordinary skill in the art) or by manual alignment and visual inspection. This definition also refers to the complement of a test sequence. The identity can exist over a region that is at least about 50 amino acids or nucleotides in length, or over a region that is 75-100 amino acids or nucleotides in length, or, where not specified, across the entire sequence of a polynucleotide or polypeptide. A polynucleotide encoding a polypeptide described herein, including homologs from species other than human, may be obtained by a process comprising the steps of screening a library under stringent hybridization conditions with a labeled probe having a polynucleotide sequence described herein or a fragment thereof, and isolating full-length cDNA and genomic clones containing said polynucleotide sequence. Such hybridization techniques are well known to the skilled artisan.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

A "comparison window", as used herein, includes reference to a segment of any one of the number of contiguous positions selected from the group consisting of from 20 to 600, usually about 50 to about 200, more usually about 100 to about 150 in which a sequence may be compared to a reference sequence of the same number of contiguous positions after the two sequences are optimally aligned. Methods of alignment of sequences for comparison are known to those of ordinary skill in the art. Optimal alignment of sequences for comparison can be conducted, including but not limited to, by the local homology algorithm of Smith and Waterman (1970) Adv. Appl. Math. 2:482c, by the homology alignment algorithm of Needleman and Wunsch (1970) J. Mol. Biol. 48:443, by the search for similarity method of Pearson and Lipman (1988) Proc. Nat'l. Acad. Sci. USA 85:2444, by computerized implementations of these algorithms (GAP, BESTFIT, FASTA, and TFASTA in the Wisconsin Genetics Software Package, Genetics Computer Group, 575 Science Dr., Madison, Wis.), or by manual alignment and visual inspection (see, e.g., Ausubel et al., Current Protocols in Molecular Biology (1995 supplement)).

One example of an algorithm that is suitable for determining percent sequence identity and sequence similarity are the BLAST and BLAST 2.0 algorithms, which are described in Altschul et al. (1997) Nuc. Acids Res. 25:3389-3402, and Altschul et al. (1990) J. Mol. Biol. 215:403-410, respectively. Software for performing BLAST analyses is publicly available through the National Center for Biotechnology Information available at the World Wide Web at ncbi.nlm.nih.gov. The BLAST algorithm parameters W, T, and X determine the sensitivity and speed of the alignment. The BLASTN program (for nucleotide sequences) uses as defaults a wordlength (W) of 11, an expectation (E) or 10, M=5, N=−4 and a comparison of both strands. For amino acid sequences, the BLASTP program uses as defaults a wordlength of 3, and expectation (E) of 10, and the BLOSUM62 scoring matrix (see Henikoff and Henikoff (1992) Proc. Natl. Acad. Sci. USA 89:10915) alignments (B) of 50, expectation (E) of 10, M=5, N=−4, and a comparison of both strands. The BLAST algorithm is typically performed with the "low complexity" filter turned off.

The BLAST algorithm also performs a statistical analysis of the similarity between two sequences (see, e.g., Karlin and Altschul (1993) Proc. Natl. Acad. Sci. USA 90:5873-5787). One measure of similarity provided by the BLAST algorithm is the smallest sum probability (P (N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, or less than about 0.01, or less than about 0.001.

The phrase "selectively (or specifically) hybridizes to" refers to the binding, duplexing, or hybridizing of a molecule only to a particular nucleotide sequence under stringent hybridization conditions when that sequence is present in a complex mixture (including but not limited to, total cellular or library DNA or RNA).

The phrase "stringent hybridization conditions" refers to hybridization of sequences of DNA, RNA, or other nucleic acids, or combinations thereof under conditions of low ionic strength and high temperature as is known in the art. Typically, under stringent conditions a probe will hybridize to its target subsequence in a complex mixture of nucleic acid (including but not limited to, total cellular or library DNA or RNA) but does not hybridize to other sequences in the complex mixture. Stringent conditions are sequence-dependent and will be different in different circumstances. Longer sequences hybridize specifically at higher temperatures. An extensive guide to the hybridization of nucleic acids is found in Tijssen, Laboratory Techniques in Biochemistry and Molecular Biology--Hybridization with Nucleic Probes, "Overview of principles of hybridization and the strategy of nucleic acid assays" (1993).

As used herein, the terms "engineer, engineered, engineering", are considered to include any manipulation of the peptide backbone or the post-translational modifications of a naturally occurring or recombinant polypeptide or fragment thereof. Engineering includes modifications of the amino acid sequence, of the glycosylation pattern, or of the side chain group of individual amino acids, as well as combinations of these approaches. The engineered proteins are expressed and produced by standard molecular biology techniques.

By "isolated nucleic acid molecule or polynucleotide" is intended a nucleic acid molecule, DNA or RNA, which has been removed from its native environment. For example, a recombinant polynucleotide encoding a polypeptide contained in a vector is considered isolated. Further examples of an isolated polynucleotide include recombinant polynucleotides maintained in heterologous host cells or purified (partially or substantially) polynucleotides in solution. An isolated polynucleotide includes a polynucleotide molecule contained in cells that ordinarily contain the polynucleotide molecule, but the polynucleotide molecule is present extra-chromosomally or at a chromosomal location that is different from its natural chromosomal location. Isolated RNA molecules include in vivo or in vitro RNA transcripts, as well as positive and negative strand forms, and double-stranded forms. Isolated polynucleotides or nucleic acids described herein, further include such molecules produced synthetically, e.g., via PCR or chemical synthesis. In addition, a polynucleotide or a nucleic acid, in certain embodiments, include a regulatory element such as a promoter, ribosome binding site, or a transcription terminator.

The term "polymerase chain reaction" or "PCR" generally refers to a method for amplification of a desired nucleotide sequence in vitro, as described, for example, in U.S. Pat. No. 4,683,195. In general, the PCR method involves repeated cycles of primer extension synthesis, using oligonucleotide primers capable of hybridising preferentially to a template nucleic acid.

By a nucleic acid or polynucleotide having a nucleotide sequence at least, for example, 95% "identical" to a reference nucleotide sequence of the present invention, it is intended that the nucleotide sequence of the polynucleotide is identical to the reference sequence except that the polynucleotide sequence may include up to five point mutations per each 100 nucleotides of the reference nucleotide sequence. In other words, to obtain a polynucleotide having a nucleotide sequence at least 95% identical to a reference nucleotide sequence, up to 5% of the nucleotides in the reference sequence may be deleted or substituted with another nucleotide, or a number of nucleotides up to 5% of the total nucleotides in the reference sequence may be inserted into the reference sequence. These alterations of the reference sequence may occur at the 5' or 3' terminal positions of the reference nucleotide sequence or anywhere between those terminal positions, interspersed either individually among residues in the reference sequence or in one or more contiguous groups within the reference sequence. As a practical matter, whether any particular polynucleotide sequence is at least 80%, 85%, 90%, 95%, 96%, 97%, 98% or 99% identical to a nucleotide sequence of the present invention can be determined conventionally using known computer programs, such as the ones discussed above for polypeptides (e.g. ALIGN-2).

A derivative, or a variant of a polypeptide is said to share "homology" or be "homologous" with the peptide if the amino acid sequences of the derivative or variant has at least 50% identity with a 100 amino acid sequence from the original peptide. In certain embodiments, the derivative or variant is at least 75% the same as that of either the peptide or a fragment of the peptide having the same number of amino acid residues as the derivative. In certain embodiments, the derivative or variant is at least 85% the same as that of either the peptide or a fragment of the peptide having the same number of amino acid residues as the derivative. In certain embodiments, the amino acid sequence of the derivative is at least 90% the same as the peptide or a fragment of the peptide having the same number of amino acid residues as the derivative. In some embodiments, the amino acid sequence of the derivative is at least 95% the same as the peptide or a fragment of the peptide having the same number of amino acid residues as the derivative. In certain embodiments, the derivative or variant is at least 99% the same as that of either the peptide or a fragment of the peptide having the same number of amino acid residues as the derivative.

The term "modified," as used herein refers to any changes made to a given polypeptide, such as changes to the length of the polypeptide, the amino acid sequence, chemical structure, co-translational modification, or post-translational modification of a polypeptide. The form "(modified)" term means that the polypeptides being discussed are optionally modified, that is, the polypeptides under discussion can be modified or unmodified.

In some aspects, an bispecific anti-HER2 antigen-binding construct comprises an amino acid sequence that is at least 80, 85, 90, 91, 92, 93, 94, 95, 96, 97, 98, 99, or 100% identical to a relevant amino acid sequence or fragment thereof set forth in the Table(s) or accession number(s) disclosed herein. In some aspects, an isolated bispecific anti-HER2 antigen-binding construct comprises an amino acid sequence encoded by a polynucleotide that is at least 80, 85, 90, 91, 92, 93, 94, 95, 96, 97, 98, 99, or 100% identical to a relevant nucleotide sequence or fragment thereof set forth in the Table(s) or accession number(s) disclosed herein.

It is to be understood that the disclosure is not limited to the particular protocols; cell lines, constructs, and reagents described herein and as such may vary. It is also to be understood that the terminology used herein is for the purpose of describing particular embodiments only, and is not intended to limit the scope of the present disclosure All publications and patents mentioned herein are incorporated herein by reference for the purpose of describing and disclosing, for example, the constructs and methodologies that are described in the publications, which might be used in connection with the constructs described herein. The publications discussed herein are provided solely for their disclosure prior to the filing date of the present application. Nothing herein is to be construed as an admission that the inventors are not entitled to antedate such disclosure by virtue of prior invention or for any other reason.

TABLE 6

Clone Numbers for Variants v5019, v5020, v7091, v10000, v6903, v6902 and v6717

| Variant | H1 clone # | H2 clone # | L1 clone # | L2 clone # |
|---|---|---|---|---|
| 5019 | 3057 | 720 | 1811 | — |
| 5020 | 719 | 3041 | — | 1811 |

TABLE 6-continued

Clone Numbers for Variants v5019, v5020, v7091, v10000, v6903, v6902 and v6717

| Variant | H1 clone # | H2 clone # | L1 clone # | L2 clone # |
|---|---|---|---|---|
| 7091 | 3057 | 5244 | 1811 | — |
| 10000 | 6586 | 5244 | 3382 | — |
| 6903 | 5065 | 3468 | 5037 | 3904 |

TABLE 6-continued

Clone Numbers for Variants v5019, v5020, v7091, v10000, v6903, v6902 and v6717

| Variant | H1 clone # | H2 clone # | L1 clone # | L2 clone # |
|---|---|---|---|---|
| 6902 | 5065 | 3468 | 5034 | 3904 |
| 6717 | 3317 | 720 | — | — |

TABLE 7

Sequence for Variants v5019, v5020, v7091, v10000, v6903, v6902 and v6717 by Clone Number

| SEQ ID NO.# | Clone # | Desc | Sequence (amino acid or DNA) |
|---|---|---|---|
| 3 | 3468 | Full | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSSASTKGPSVFPLAPSSKS TSGGTAALGCLVKGYFPEPVTVSWNSGALTSGVHTFPAVLKSSGLY SLSSVVTVPSSSLGTQTYICNVNHKPSNTKVDKKVEPKSCDKTHTCP PCPAPELLGGPSVFLFPPKPKDTLMISRTPEVTCVVVDVSHEDPEVKF NWYVDGVEVHNAKTKPREEQYNSTYRVVSVLTVLHQDWLNGKEY KCKVSNKALPAPIEKTISKAKGQPREPQVYVLPPSRDELTKNQVSLL CLVKGFYPSDIAVEWESNGQPENNYLTWPPVLDSDGSFFLYSKLTV DKSRWQQGNVFSCSVMHEALHNHYTQKSLSLSPG |
| 4 | 3468 | Full | GAAGTGCAGCTGGTCGAATCTGGAGGAGGACTGGTGCAGCCAGG AGGGTCCCTGCGCCTGTCTTGCCGCCGCTAGTGGCTTCACTTTTAC CGACTACACCATGGATTGGGTGCGACAGGCACCTGGAAAGGGCC TGGAGTGGGTCGCCGATGTGAACCCAAATAGCGGAGGCTCCATC TACAACCAGCGGTTCAAGGGCCGGTTCACCCTGTCAGTGGACCG GAGCAAAAACACCCTGTATCTGCAGATGAATAGCCTGCGAGCCG AAGATACTGCTGTGTACTATTGCGCCCGGAATCTGGGGCCCTCCT TCTACTTTGACTATTGGGGCAGGGAACTCTGGTCACCGTGAGCT CCGCCTCCACCAAGGGACCTTCTGTGTTCCCACTGGCTCCCTCTA GTAAATCCACATCTGGGGGAACTGCAGCCCTGGGCTGTCTGGTG AAGGGCTACTTCCCAGAGCCCGTCACAGTGTCTTGGAACAGTGG CGCTCTGACTTCTGGGGTCCACACCTTTCCTGCAGTGCTGAAGTC AAGCGGGCTGTACAGCCTGTCCTCTGTGGTCACCGTGCCAAGTTC AAGCCTGGGAACACAGACTTATATCTGCAACGTGAATCACAAGC CATCCAATACAAAAGTCGACAAGAAAGTGGAACCCAAGTCTTGT GATAAAACCCATACATGCCCCCCTTGTCCTGCACCAGAGCTGCTG GGAGGACCAAGCGTGTTCCTGTTTCCACCCAAGCCTAAAGATAC ACTGATGATTAGTAGGACCCCAGAAGTCACATGCGTGGTCGTGG ACGTGAGCCACGAGGACCCCGAAGTCAAGTTTAACTGGTACGTG GACGGCGTCGAGGTGCATAATGCCAAGACTAAACCCAGGGAGG AACAGTACAACAGTACCTATCGCGTCGTGTCAGTCCTGACAGTG CTGCATCAGGATTGGCTGAACGGGAAAGAGTATAAGTGCAAAGT GAGCAATAAGGCTCTGCCCGCACCTATCGAGAAAACAATTTCCA AGGCAAAAGGACAGCCTAGAGAACCACAGGTGTACGTGCTGCCT CCATCAAGGGATGAGCTGACAAAGAACCAGGTCAGCCTGCTGTG TCTGGTGAAAGGATTCTATCCCTCTGACATTGCTGTGGAGTGGGA AAGTAATGGCCAGCCTGAGAACAATTACCTGACCTGGCCCCCTG TGCTGGACTCAGATGGCAGCTTCTTTCTGTATAGCAAGCTGACCG TCGACAAATCCCGGTGGCAGCAGGGGAATGTGTTTAGTTGTTCA GTCATGCACGAGGCACTGCACAACCATTACACCCAGAAGTCACT GTCACTGTCACCAGGG |
| 5 | 3468 | VH | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSS |
| 6 | 3468, 3057, 3041, 3317 | H1 | GFTFTDYT |
| 7 | 3468, 3057, 3041, 3317 | H3 | ARNLGPSFYFDY |

TABLE 7-continued

Sequence for Variants v5019, v5020, v7091, v10000, v6903, v6902 and v6717 by Clone Number

| SEQ ID NO. # | Clone | Desc | Sequence (amino acid or DNA) |
|---|---|---|---|
| 8 | 3468, 3057, 3041, 3317 | H2 | VNPNSGGS |
| 9 | 1811 | Full | DIQMTQSPSSLSASVGDRVTITCKASQDVSIGVAWYQQKPGKAPKL LIYSASYRYTGVPSRFSGSGSGTDFTLTISSLQPEDFATYYCQQYYIY PYTFGQGTKVEIKRTVAAPSVFIFPPSDEQLKSGTASVVCLLNNFYPR EAKVQWKVDNALQSGNSQESVTEQDSKDSTYSLSSTLTLSKADYE KHKVYACEVTHQGLSSPVTKSFNRGEC |
| 10 | 1811 | Full | GATATTCAGATGACCCAGTCCCCAAGCTCCCTGAGTGCCTCAGTG GGCGACCGAGTCACCATCACATGCAAGGCTTCCCAGGATGTGTC TATTGGAGTCGCATGGTACCAGCAGAAGCCAGGCAAAGCACCCA AGCTGCTGATCTATAGCGCCTCCTACCGGTATACCGGCGTGCCCT CTAGATTCTCTGGCAGTGGGTCAGGAACAGACTTTACTCTGACCA TCTCTAGTCTGCAGCCTGAGGATTTCGCTACCTACTATTGCCAGC AGTACTATATCTACCCATATACCTTTGGCCAGGGGACAAAAGTG GAGATCAAGAGGACTGTGGCCGCTCCCTCCGTCTTCATTTTTCCC CCTTCTGACGAACAGCTGAAAAGTGGCACAGCCAGCGTGGTCTG TCTGCTGAACAATTTCTACCCTCGCGAAGCCAAAGTGCAGTGGA AGGTCGATAACGCTCTGCAGAGCGGCAACAGCCAGGAGTCTGTG ACTGAACAGGACAGTAAAGATTCAACCTATAGCCTGTCAAGCAC ACTGACTCTGAGCAAGGCAGACTACGAGAAGCACAAAGTGTATG CCTGCGAAGTCACACATCAGGGGCTGTCCTCTCCTGTGACTAAG AGCTTTAACAGAGGAGAGTGT |
| 11 | 1811 | VL | DIQMTQSPSSLSASVGDRVTITCKASQDVSIGVAWYQQKPGKAPKL LIYSASYRYTGVPSRFSGSGSGTDFTLTISSLQPEDFATYYCQQYYIY PYTFGQGTKVEIK |
| 12 | 1811, 3904, 3317 | L1 | QDVSIG |
| 13 | 1811, 3904, 3317 | L3 | QQYYIYPYT |
| 14 | 1811, 3904, 3317 | L2 | SAS |
| 15 | 5034 | Full | DYKDDDDKDIQMTQSPSSLSASVGDRVTITCRASQDVNTAVAWYQ QKPGKAPKLLIYSASFLYSGVPSRFSGSRSGTDFTLTISSLQPEDFATY YCQQHYTTPPTFGQGTKVEIKRTVAAPSVFIFPPSDERLKSGTASVV CLLNNFYPREAKVQWKVDNALQSGNSQESVTEQDSKDSTYSLSSTL TLSKADYEKHKVYACEVTHQGLSSPVTKSFNRGEC |
| 16 | 5034 | Full | GACTACAAAGACGACGATGACAAAGATATCCAGATGACCCAGTC CCCTAGCTCCCTGTCCGCTTCTGTGGGCGATAGGGTCACTATTAC CTGCCGCGCATCTCAGGACGTGAACACCGCAGTCGCCTGGTACC AGCAGAAGCCTGGGAAAGCTCCAAAGCTGCTGATCTACAGTGCA TCATTCCTGTATTCAGGAGTGCCCAGCCGGTTTAGCGGCAGCAG ATCTGGCACCGATTTCACACTGACTATTTCTAGTCTGCAGCCTGA GGACTTTGCCACATACTATTGCCAGCAGCACTATACCACACCCCC TACTTTCGGCCAGGGGACCAAAGTGGAGATCAAGCGAACTGTGG CCGCTCCAAGTGTCTTCATTTTTCCACCCAGCGATGAAAGACTGA AGTCCGGCACAGCTTCTGTGGTCTGTCTGCTGAACAATTTTTACC CCAGAGAGGCCAAAGTGCAGTGGAAGGTCGACAACGCTCTGCA GAGTGGCAACAGCCAGGAGAGCGTGACAGAACAGGATTCCAAA GACTCTACTTATAGTCTGTCAAGCACCCTGACACTGAGCAAGGC AGACTACGAAAAGCATAAAGTGTATGCCTGTGAGGTCACACATC AGGGGCTGTCATCACCAGTCACCAAATCATTCAATCGGGGGAG TGC |
| 17 | 5034 | VL | DIQMTQSPSSLSASVGDRVTITCRASQDVNTAVAWYQQKPGKAPKL LIYSASFLYSGVPSRFSGSRSGTDFTLTISSLQPEDFATYYCQQHYTT PPTFGQGTKVEIK |
| 18 | 5037 | Full | DYKDDDDKDIQMTQSPSSLSASVGDRVTITCRASQDVNTAVAWYQ QKPGKAPKLLIYSASFLYSGVPSRFSGSRSGTDFTLTISSLQPEDFATY YCQQHYTTPPTFGQGTKVEIKRTVAAPSVFIFPPSDERLKSGTASVV |

TABLE 7-continued

Sequence for Variants v5019, v5020, v7091, v10000, v6903, v6902 and v6717 by Clone Number

| SEQ ID NO.# | Clone # | Desc | Sequence (amino acid or DNA) |
|---|---|---|---|
| | | | CLLNNFYPREAKVQWKVDNALQSGNSKESVTEQDSKDSTYSLSSRL TLSKADYEKHKVYACEVTHQGLSSPVTKSFNRGEC |
| 19 | 5037 | Full | GACTACAAAGACGACGATGACAAAGATATCCAGATGACCCAGTC CCCTAGCTCCCTGTCCGCTTCTGTGGGCGATAGGGTCACTATTAC CTGCCGCGCATCTCAGGACGTGAACACCGCAGTCGCCTGGTACC AGCAGAAGCCTGGGAAAGCTCCAAAGCTGCTGATCTACAGTGCA TCATTCCTGTATTCAGGAGTGCCCAGCCGGTTTAGCGGCAGCAG ATCTGGCACCGATTTCACACTGACTATTTCTAGTCTGCAGCCTGA GGACTTTGCCACATACTATTGCCAGCAGCACTATACCACACCCCC TACTTTCGGCCAGGGGACCAAAGTGGAGATCAAGCGAACTGTGG CCGCTCCAAGTGTCTTCATTTTTCCACCCAGCGATGAAAGACTGA AGTCCGGCACAGCTTCTGTGGTCTGTCTGCTGAACAATTTTTACC CCAGAGAGGCCAAAGTGCAGTGGAAGGTCGACAACGCTCTGCA GAGTGGCAACAGCAAGGAGAGCGTGACAGAACAGGATTCCAAA GACTCTACTTATAGTCTGTCAAGCAGACTGACACTGAGCAAGGC AGACTACGAAAAGCATAAAGTGTATGCCTGTGAGGTCACACATC AGGGGCTGTCATCACCAGTCACCAAATCATTCAATCGGGGGGAG TGC |
| 20 | 5037 | VL | DIQMTQSPSSLSASVGDRVTITCRASQDVNTAVAWYQQKPGKAPKL LIYSASFLYSGVPSRFSGSRSGTDFTLTISSLQPEDFATYYCQQHYTTP PTFGQGTKVEIK |
| 21 | 5037 | L1 | QDVNTA |
| 22 | 5037 | L3 | QQHYTTPPT |
| 23 | 5037 | L2 | SAS |
| 24 | 3382 | Full | DIQMTQSPSSLSASVGDRVTITCKASQDVSIGVAWYQQKPGKAPKL LIYSASYRYTGVPSRFSGSGSGTDFTLTISSLQPEDFATYYCQQYYIY PATFGQGTKVEIKRTVAAPSVFIFPPSDEQLKSGTASVVCLLNNFYPR EAKVQWKVDNALQSGNSQESVTEQDSKDSTYSLSSTLTLSKADYE KHKVYACEVTHQGLSSPVTKSFNRGEC |
| 25 | 3382 | Full | GATATTCAGATGACCCAGTCCCCAAGCTCCCTGAGTGCCTCAGTG GGCGACCGAGTCACCATCACATGCAAGGCTTCCCAGGATGTGTC TATTGGAGTCGCATGGTACCAGCAGAAGCCAGGCAAAGCACCCA AGCTGCTGATCTATAGCGCCTCCTACCGGTATACCGGCGTGCCCT CTAGATTCTCTGGCAGTGGGTCAGGAACAGACTTTACTCTGACCA TCTCTAGTCTGCAGCCTGAGGATTTCGCTACCTACTATTGCCAGC AGTACTATATCTACCCAGCCACCTTTGGCCAGGGGACAAAAGTG GAGATCAAGAGGACTGTGGCCGCTCCCTCCGTCTTCATTTTTCCC CCTTCTGACGAACAGCTGAAAAGTGGCACAGCCAGCGTGGTCTG TCTGCTGAACAATTTCTACCCTCGCGAAGCCAAAGTGCAGTGGA AGGTCGATAACGCTCTGCAGAGCGGCAACAGCCAGGAGTCTGTG ACTGAACAGGACAGTAAAGATTCAACCTATAGCCTGTCAAGCAC ACTGACTCTGAGCAAGGCAGACTACGAGAAGCACAAAGTGTATG CCTGCGAAGTCACACATCAGGGGCTGTCCTCTCCTGTGACTAAG AGCTTTAACAGAGGAGAGTGT |
| 26 | 3382 | VL | DIQMTQSPSSLSASVGDRVTITCKASQDVSIGVAWYQQKPGKAPKL LIYSASYRYTGVPSRFSGSGSGTDFTLTISSLQPEDFATYYCQQYYIY PATFGQGTKVEIK |
| 27 | 3382 | L1 | QDVSIG |
| 28 | 3382 | L3 | QQYYIYPAT |
| 29 | 3382 | L2 | SAS |
| 30 | 5065 | Full | EVQLVESGGGLVQPGGSLRLSCAASGFNIKDTYIHWVRQAPGKGLE WVARIYPTNGYTRYADSVKGRFTISADTSKNTAYLQMNSLRAEDT AVYYCSRWGGDGFYAMDYWGQGTLVTVSSASTKGPSVFPLAPSSK STSGGTAALGCLVKDYFPEPVTVSWNSGALTSGVHTFPAVLQSSGL YSLSSVVTVPSSSLGTQTYICNVNHKPSNTKVDKKVEPKSCDKTHTC PPCPAPELLGGPSVFLFPPKPKDTLMISRTPEVTCVVVDVSHEDPEVK FNWYVDGVEVHNAKTKPREEQYNSTYRVVSVLTVLHQDWLNGKE YKCKVSNKALPAPIEKTISKAKGQPREPQVYTLPPSRDELTKNQVSL TCLVKGFYPSDIAVEWESNGQPENNYKTTPPVLDSDGSFALVSKLT VDKSRWQQGNVFSCSVMHEALHNHYTQKSLSLSPG |

TABLE 7-continued

Sequence for Variants v5019, v5020, v7091, v10000, v6903, v6902 and v6717 by Clone Number

| SEQ ID NO.# | Clone Desc | Sequence (amino acid or DNA) |
|---|---|---|
| 31 | 5065 Full | GAGGTGCAGCTGGTCGAAAGCGGAGGAGGACTGGTGCAGCCAG GAGGGTCACTGCGACTGAGCTGCGCAGCTTCCGGCTTCAACATC AAGGACACCTACATTCACTGGGTCCGCCAGGCTCCTGGAAAAGG CCTGGAGTGGGTGGCACGAATCTATCCAACTAATGGATACACCC GGTATGCCGACTCCGTGAAGGGCCGGTTCACCATTTCTGCAGAT ACAAGTAAAAACACTGCCTACCTGCAGATGAACAGCCTGCGAGC CGAAGATACAGCCGTGTACTATTGCAGCCGATGGGGAGGCGACG GCTTCTACGCTATGGATTATTGGGGCAGGGAACCCTGGTCACA GTGAGCTCCGCATCAACAAAGGGGCCTAGCGTGTTTCCACTGGC CCCCTCTAGTAAATCCACCTCTGGGGAACAGCAGCCCTGGGAT GTGAGGTGACCGACTACTTCCCAGAGCCCGTCACTGTGAGCTGG AACTCCGGCGCCCTGACATCTGGGGTCCATACTTTTCCTGCTGTG CTGCAGTCAAGCGGCCTGTACAGCCTGTCCTCTGTGGTCACTGTG CCAAGTTCAAGCCTGGGGACTCAGACCTATATCTGCAACGTGAA TCACAAGCCATCCAATACCAAAGTCGACAAGAAAGTGGAACCCA AGTCTTGTGATAAAACACATACTTGCCCCCCTTGTCCTGCACCAG AGCTGCTGGGAGGACCAAGCGTGTTCCTGTTTCCACCCAAGCCT AAAGACACCCTGATGATTAGTAGGACTCCAGAAGTCACCTGCGT GGTCGTGGACGTGAGCCACGAGGACCCCGAAGTCAAGTTCAACT GGTACGTGGATGGCGTCGAGGTGCATAATGCCAAGACAAAACCC AGGGAGGAACAGTACAACTCCACTTATCGCGTCGTGTCTGTCCT GACCGTGCTGCACCAGGACTGGCTGAACGGCAAGGAGTATAAGT GCAAAGTGAGCAATAAGGCTCTGCCCGCACCTATCGAGAAAACA ATTTCCAAGGCTAAAGGGCAGCCTAGAGAACCACAGGTGTACGT GTACCCTCCATCTAGGGACGAGCTGACCAAGAACCAGGTCAGTC TGACATGTCTGGTGAAAGGGTTCTATCCCAGCGATATCGCAGTG GAGTGGGAATCCAATGGACAGCCTGAGAACAATTACAAGACCAC ACCCCCTGTGCTGGACTCTGATGGAAGTTTCGCCCTGGTGAGTAA GCTGACCGTCGATAAATCACGGTGGCAGCAGGGCAACGTGTTCA GCTGTTCAGTGATGCACGAAGCACTGCACAACCACTACACCCAG AAAAGCCTGTCCCTGTCCCCCGGC |
| 32 | 5065 VH | EVQLVESGGGLVQPGGSLRLSCAASGFNIKDTYIHWVRQAPGKGLE WVARIYPTNGYTRYADSVKGRFTISADTSKNTAYLQMNSLRAEDT AVYYCSRWGGDGFYAMDYWGQGTLVTVSS |
| 33 | 5065,H1 720, 719 | GFNIKDTY |
| 34 | 5065,H3 720, 719 | SRWGGDGFYAMDY |
| 35 | 5065,H2 720, 719 | IYPTNGYT |
| 36 | 6586 Full | EVQLVESGGGLVQPGGSLRLSCAASGFTFADYTMDWVRQAPGKGL EWVGDVNPNSGGSIYNQRFKGRFTFSVDRSKNTLYLQMNSLRAED TAVYYCARNLGPSFYFDYWGQGTLVTVSSASTKGPSVFPLAPSSKS TSGGTAALGCLVKDYFPEPVTVSWNSGALTSGVHTFPAVLQSSGLY SLSSVVTVPSSSLGTQTYICNVNHKPSNTKVDKKVEPKSCDKTHTCP PCPAPELLGGPSVFLFPPKPKDTLMISRTPEVTCVVVDVSHEDPEVKF NVVYVDGVEVHNAKTKPREEQYNSTYRVVSVLTVLHQDWLNGKEY KCKVSNKALPAPIEKTISKAKGQPREPQVYVYPPSRDELTKNQVSLT CLVKGFYPSDIAVEWESNGQPENNYKTTPPVLDSDGSFALVSKLTV DKSRWQQGNVFSCSVMHEALHNHYTQKSLSLSPG |
| 37 | 6586 Full | GAGGTGCAGCTGGTGGAATCAGGAGGGGGCCTGGTGCAGCCCG GAGGGTCTCTGCGACTGTCATGTGCCGCTTCTGGGTTCACTTTCG CAGACTACACAATGGATTGGGTGCGACAGGCCCCCGGAAAGGG ACTGGAGTGGGTGGCGATGTCAACCCTAATTCTGGCGGGAGTA TCTACAACCAGCGGTTCAAGGGGAGATTCACTTTTTCAGTGGAC AGAAGCAAAAACACCCTGTATCTGCAGATGAACAGCCTGAGGGC CGAAGATACCGCTGTCTACTATTGCGCTCGCAATCTGGGCCCCAG TTTCTACTTTGACTATTGGGGCAGGGAACCCTGGTGACAGTCAG CTCCGCTAGCACTAAGGGGCCTTCCGTGTTTCCACTGGCTCCCTC TAGTAAATCCACCTCTGGAGGCACAGCTGCACTGGGATGTCTGG TGAAGGATTACTTCCCTGAACCAGTCACAGTGAGTTGGAACTCA GGGGCTCTGACAAGTGGAGTCCATACTTTTCCCGCAGTGCTGCA GTCAAGCGGACTGTACTCCCTGTCCTCTGTGGTCACCGTGCCTAG TTCAAGCCTGGGCACCCAGACATATATCTGCAACGTGAATCACA |

TABLE 7-continued

Sequence for Variants v5019, v5020, v7091, v10000, v6903, v6902 and v6717 by Clone Number

| SEQ ID NO.# | Clone | Desc | Sequence (amino acid or DNA) |
|---|---|---|---|
| | | | AGCCATCAAATACAAAAGTCGACAAGAAAGTGGAGCCCAAGAG
CTGTGATAAAACTCATACCTGCCCACCTTGTCCGGCGCCAGAACT
GCTGGGAGGACCAAGCGTGTTCCTGTTTCCACCCAAGCCTAAAG
ACACCCTGATGATTTCCCGGACTCCTGAGGTCACCTGCGTGGTCG
TGGACGTGTCTCACGAGGACCCCGAAGTCAAGTTCAACTGGTAC
GTGGATGGCGTCGAAGTGCATAATGCCAAGACCAAACCCCGGGA
GGAACAGTACAACTCTACCTATAGAGTCGTGAGTGTCCTGACAG
TGCTGCACCAGGACTGGCTGAATGGGAAGGAGTATAAGTGTAAA
GTGAGCAACAAAGCCCTGCCCGCCCCAATCGAAAAAACAATCTC
TAAAGCAAAAGGACAGCCTCGCGAACCACAGGTCTACGTCTACC
CCCCATCAAGAGATGAACTGACAAAAAATCAGGTCTCTCTGACA
TGCCTGGTCAAAGGATTCTACCCTTCCGACATCGCCGTGGAGTGG
GAAAGTAACGGCCAGCCCGAGAACAATTACAAGACCACACCCCC
TGTCCTGGACTCTGATGGGAGTTTCGCTCTGGTGTCAAAGCTGAC
CGTCGATAAAAGCCGGTGGCAGCAGGGCAATGTGTTTAGCTGCT
CCGTCATGCACGAAGCCCTGCACAATCACTACACAGAAGTCC
CTGAGCCTGAGCCCTGGC |
| 38 | 6586 | VH | EVQLVESGGGLVQPGGSLRLSCAASGFTFADYTMDWVRQAPGKGL
EWVGDVNPNSGGSIYNQRFKGRFTFSVDRSKNTLYLQMNSLRAED
TAVYYCARNLGPSFYFDYWGQGTLVTVSS |
| 39 | 6586 | H1 | GFTFADYT |
| 40 | 6586 | H3 | ARNLGPSFYFDY |
| 41 | 6586 | H2 | VNPNSGGS |
| 42 | 3904 | Full | YPYDVPDYATGSDIQMTQSPSSLSASVGDRVTITCKASQDVSIGVA
WYQQKPGKAPKLLIYSASYRYTGVPSRFSGSGSGTDFTLTISSLQPE
DFATYYCQQYYIYPYTFGQGTKVEIKRTVAAPSVFIFPPSDEELKSGT
ASVVCLLNNFYPREAKVQWKVDNALQSGNSEESVTEQDSKDSTYS
LSSTLELSKADYEKHKVYACEVTHQGLSSPVTKSFNRGEC |
| 43 | 3904 | Full | TATCCCTACGATGTGCCTGACTACGCTACTGGCTCCGATATCCAG
ATGACCCAGTCTCCAAGCTCCCTGAGTGCATCAGTGGGGACCG
AGTCACCATCACATGCAAGGCTTCCCAGGATGTGTCTATTGGAGT
CGCATGGTACCAGCAGAAGCCAGGCAAAGCACCCAAGCTGCTGA
TCTACAGCGCCTCCTACCGGTATACTGGGGTGCCTTCCAGATTCT
CTGGCAGTGGGTCAGGAACCGACTTTACTCTGACCATCTCTAGTC
TGCAGCCCGAGGATTTCGCCACCTACTATTGCCAGCAGTACTATA
TCTACCCTTATACCTTTGGCCAGGGGACAAAAGTGGAGATCAAG
AGGACAGTGGCCGCTCCAAGTGTCTTCATTTTTCCCCCTTCCGAC
GAAGAGCTGAAAAGTGGAACTGCTTCAGTGGTCTGTCTGCTGAA
CAATTTCTACCCCCGCGAAGCCAAAGTGCAGTGGAAGGTCGATA
ACGCTCTGCAGAGCGGCAATTCCGAGGAGTCTGTGACAGAACAG
GACAGTAAAGATTCAACTTATAGCCTGTCAAGCACACTGGAGCT
GTCTAAGGCAGACTACGAGAAGCACAAAGTGTATGCCTGCGAAG
TCACCCATCAGGGGCTGTCCTCTCCCGTGACAAAGAGCTTTAACA
GAGGAGAGTGT |
| 44 | 3904 | VL | DIQMTQSPSSLSASVGDRVTITCKASQDVSIGVAWYQQKPGKAPKL
LIYSASYRYTGVPSRFSGSGSGTDFTLTISSLQPEDFATYYCQQYYIY
PYTFGQGTKVEIK |
| 45 | 719 | Full | DIQMTQSPSSLSASVGDRVTITCRASQDVNTAVAWYQQKPGKAPKL
LIYSASFLYSGVPSRFSGSRSGTDFTLTISSLQPEDFATYYCQQHYTTP
PTFGQGTKVEIKGGSGGGSGGGSGGGSGGGSGEVQLVESGGGLVQP
GGSLRLSCAASGFNIKDTYIHWVRQAPGKGLEWVARIYPTNGYTRY
ADSVKGRFTISADTSKNTAYLQMNSLRAEDTAVYYCSRWGGDGFY
AMDYWGQGTLVTVSSAAEPKSSDKTHTCPPCPAPELLGGPSVFLFP
PKPKDTLMISRTPEVTCVVVDVSHEDPEVKFNVVYVDGVEVHNAKT
KPREEQYNSTYRVVSVLTVLHQDWLNGKEYKCKVSNKALPAPIEK
TISKAKGQPREPQVYTYPPSRDELTKNQVSLTCLVKGFYPSDIAVEW
ESNGQPENNYKTTPPVLDEDGSFALVSKLTVDKSRWQQGNVFSCSV
MHEALHNHYTQKSLSLSPGK |
| 46 | 719 | Full | GACATCCAGATGACCCAGTCTCCATCCTCCCTGTCTGCATCTGTA
GGAGACAGAGTCACCATCACTTGCCGGGCAAGTCAGGACGTTAA
CACCGCTGTAGCTTGGTATCAGCAGAAACCAGGGAAAGCCCTA
AGCTCCTGATCTATTCTGCATCCTTTTTGTACAGTGGGGTCCCAT
CAAGGTTCAGTGGCAGTCGATCTGGGACAGATTTCACTCTCACC
ATCAGCAGTCTGCAACCTGAAGATTTTGCAACTTACTACTGTCAA |

TABLE 7-continued

Sequence for Variants v5019, v5020, v7091, v10000, v6903, v6902 and v6717 by Clone Number

| SEQ ID NO.# | Clone | Desc | Sequence (amino acid or DNA) |
|---|---|---|---|
| | | | CAGCATTACACTACCCCACCCACTTTCGGCCAAGGGACCAAAGT
GGAGATCAAAGGTGGTTCTGGTGGTGGTTCTGGTGGTGGTTCTG
GTGGTGGTTCTGGTGGTGGTTCTGGTGAAGTGCAGCTGGTGGAG
TCTGGGGGAGGCTTGGTACAGCCTGGCGGGTCCCTGAGACTCTC
CTGTGCAGCCTCTGGATTCAACATTAAAGATACTTATATCCACTG
GGTCCGGCAAGCTCCAGGGAAGGGCCTGGAGTGGGTCGCACGTA
TTTATCCCACAAATGGTTACACACGTATGCGGACTCTGTGAAG
GGCCGATTCACCATCTCCGCAGACACTTCCAAGAACACCGCGTA
TCTGCAAATGAACAGTCTGAGAGCTGAGGACACGGCCGTTTATT
ACTGTTCAAGATGGGGCGGAGACGGTTTCTACGCTATGGACTAC
TGGGGCCAAGGGACCCTGGTCACCGTCTCCTCAGCCGCCGAGCC
CAAGAGCAGCGATAAGACCCACACCTGCCCTCCCTGTCCAGCTC
CAGAACTGCTGGGAGGACCTAGCGTGTTCCTGTTTCCCCCTAAGC
CAAAAGACACTCTGATGATTTCCAGGACTCCCGAGGTGACCTGC
GTGGTGGTGGACGTGTCTCACGAGGACCCCGAAGTGAAGTTCAA
CTGGTACGTGGATGGCGTGGAAGTGCATAATGCTAAGACAAAAC
CAAGAGAGGAACAGTACAACTCCACTTATCGCGTCGTGAGCGTG
CTGACCGTGCTGCACCAGGACTGGCTGAACGGGAAGGAGTATAA
GTGCAAAGTCAGTAATAAGGCCCTGCCTGCTCCAATCGAAAAA
CCATCTCTAAGGCCAAAGGCCAGCCAAGGGAGCCCCAGGTGTAC
ACATACCCACCCAGCAGAGACGAACTGACCAAGAACCAGGTGTC
CCTGACATGTCTGGTGAAAGGCTTCTATCCTAGTGATATTGCTGT
GGAGTGGGAATCAAATGGACAGCCAGAGAACAATTACAAGACC
ACACCTCCAGTGCTGGACGAGGATGGCAGCTTCGCCCTGGTGTC
CAAGCTGACAGTGGATAAATCTCGATGGCAGCAGGGGAACGTGT
TTAGTTGTTCAGTGATGCATGAAGCCCTGCACAATCATTACACTC
AGAAGAGCCTGTCCCTGTCTCCCGGCAAA |
| 47 | 719 | VL | DIQMTQSPSSLSASVGDRVTITCRASQDVNTAVAWYQQKPGKAPKL
LIYSASFLYSGVPSRFSGSRSGTDFTLTISSLQPEDFATYYCQQHYTTP
PTFGQGTKVEIK |
| 48 | 719 | VH | EVQLVESGGGLVQPGGSLRLSCAASGFNIKDTYIHWVRQAPGKGLE
WVARIYPTNGYTRYADSVKGRFTISADTSKNTAYLQMNSLRAEDT
AVYYCSRWGGDGFYAMDYWGQGTLVTVSS |
| 49 | 720 | Full | DIQMTQSPSSLSASVGDRVTITCRASQDVNTAVAWYQQKPGKAPKL
LIYSASFLYSGVPSRFSGSRSGTDFTLTISSLQPEDFATYYCQQHYTTP
PTFGQGTKVEIKGSGSGGSGGGSGGGSGGGSGEVQLVESGGGLVQP
GGSLRLSCAASGFNIKDTYIHWVRQAPGKGLEWVARIYPTNGYTRY
ADSVKGRFTISADTSKNTAYLQMNSLRAEDTAVYYCSRWGGDGFY
AMDYWGQGTLVTVSSAAEPKSSDKTHTCPPCPAPELLGGPSVFLFP
PKPKDTLMISRTPEVTCVVVDVSHEDPEVKFNVVYVDGVEVHNAKT
KPREEQYNSTYRVVSVLTVLHQDWLNGKEYKCKVSNKALPAPIEK
TISKAKGQPREPQVYTLPPSRDELTKNQVSLICLVKGFYPSDIAVEW
ESNGQPENRYMTWPPVLDSDGSFFLYSKLTVDKSRWQQGNVFSCS
VMHEALHNHYTQKSLSLSPGK |
| 50 | 720 | Full | GACATCCAGATGACCCAGTCTCCATCCTCCCTGTCTGCATCTGTA
GGAGACAGAGTCACCATCACTTGCCGGGCAAGTCAGGACGTTAA
CACCGCTGTAGCTTGGTATCAGCAGAAACCAGGGAAAGCCCCTA
AGCTCCTGATCTATTCTGCATCCTTTTTGTACAGTGGGGTCCCAT
CAAGGTTCAGTGGCAGTCGATCTGGGACAGATTTCACTCTCACC
ATCAGCAGTCTGCAACCTGAAGATTTTGCAACTTACTACTGTCAA
CAGCATTACACTACCCCACCCACTTTCGGCCAAGGGACCAAAGT
GGAGATCAAAGGTGGTTCTGGTGGTGGTTCTGGTGGTGGTTCTG
GTGGTGGTTCTGGTGGTGGTTCTGGTGAAGTGCAGCTGGTGGAG
TCTGGGGGAGGCTTGGTACAGCCTGGCGGGTCCCTGAGACTCTC
CTGTGCAGCCTCTGGATTCAACATTAAAGATACTTATATCCACTG
GGTCCGGCAAGCTCCAGGGAAGGGCCTGGAGTGGGTCGCACGTA
TTTATCCCACAAATGGTTACACACGTATGCGGACTCTGTGAAG
GGCCGATTCACCATCTCCGCAGACACTTCCAAGAACACCGCGTA
TCTGCAAATGAACAGTCTGAGAGCTGAGGACACGGCCGTTTATT
ACTGTTCAAGATGGGGCGGAGACGGTTTCTACGCTATGGACTAC
TGGGGCCAAGGGACCCTGGTCACCGTCTCCTCAGCCGCCGAGCC
CAAGAGCAGCGATAAGACCCACACCTGCCCTCCCTGTCCAGCTC
CAGAACTGCTGGGAGGACCTAGCGTGTTCCTGTTTCCCCCTAAGC
CAAAAGACACTCTGATGATTTCCAGGACTCCCGAGGTGACCTGC
GTGGTGGTGGACGTGTCTCACGAGGACCCCGAAGTGAAGTTCAA
CTGGTACGTGGATGGCGTGGAAGTGCATAATGCTAAGACAAAAC
CAAGAGAGGAACAGTACAACTCCACTTATCGCGTCGTGAGCGTG
CTGACCGTGCTGCACCAGGACTGGCTGAACGGGAAGGAGTATAA
GTGCAAAGTCAGTAATAAGGCCCTGCCTGCTCCAATCGAAAAA |

TABLE 7-continued

Sequence for Variants v5019, v5020, v7091, v10000, v6903, v6902 and v6717 by Clone Number

| SEQ ID NO.# | Clone # | Desc | Sequence (amino acid or DNA) |
|---|---|---|---|
| | | | CCATCTCTAAGGCCAAAGGCCAGCCAAGGGAGCCCCAGGTGTAC ACACTGCCACCCAGCAGAGACGAACTGACCAAGAACCAGGTGTC CCTGATCTGTCTGGTGAAAGGCTTCTATCCTAGTGATATTGCTGT GGAGTGGGAATCAAATGGACAGCCAGAGAACAGATACATGACC TGGCCTCCAGTGCTGGACAGCGATGGCAGCTTCTTCCTGTATTC AAGCTGACAGTGGATAAATCTCGATGGCAGCAGGGGAACGTGTT TAGTTGTTCAGTGATGCATGAAGCCCTGCACAATCATTACACTCA GAAGAGCCTGTCCCTGTCTCCCGGCAAA |
| 51 | 720 | VL | DIQMTQSPSSLSASVGDRVTITCRASQDVNTAVAWYQQKPGKAPKL LIYSASFLYSGVPSRFSGSRSGTDFTLTISSLQPEDFATYYCQQHYTTP PTFGQGTKVEIK |
| 52 | 720 | VH | EVQLVESGGGLVQPGGSLRLSCAASGFNIKDTYIHWVRQAPGKGLE WVARIYPTNGYTRYADSVKGRFTISADTSKNTAYLQMNSLRAEDT AVYYCSRWGGDGFYAMDYWGQGTLVTVSS |
| 53 | 3041 | Full | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSSASTKGPSVFPLAPSSKS TSGGTAALGCLVKDYFPEPVTVSWNSGALTSGVHTFPAVLQSSGLY SLSSVVTVPSSSLGTQTYICNVNHKPSNTKVDKKVEPKSCDKTHTCP PCPAPELLGGPSVFLFPPKPKDTLMISRTPEVTCVVVDVSHEDPEVKF NVVYVDGVEVHNAKTKPREEQYNSTYRVVSVLTVLHQDWLNGKEY KCKVSNKALPAPIEKTISKAKGQPREPQVYVLPPSRDELTKNQVSLL CLVKGFYPSDIAVEWESNGQPENNYLTWPPVLDSDGSFFLYSKLTV DKSRWQQGNVFSCSVMHEALHNHYTQKSLSLSPG |
| 54 | 3041 | Full | GAAGTGCAGCTGGTCGAATCTGGAGGAGGACTGGTGCAGCCAGG AGGGTCCCTGCGCCTGTCTTGCGCCGCTAGTGGCTTCACTTTTAC CGACTACACCATGGATTGGGTGCGACAGGCACCTGGAAAGGGCC TGGAGTGGGTCGCCGATGTGAACCCAAATAGCGGAGGCTCCATC TACAACCAGCGGTTCAAGGGCCGGTTCACCCTGTCAGTGGACCG GAGCAAAAACACCCTGTATCTGCAGATGAATAGCCTGCGAGCCG AAGATACTGCTGTGTACTATTGCGCCCGGAATCTGGGGCCCTCCT TCTACTTTGACTATTGGGGCAGGGAACTCTGGTCACCGTGAGCT CCGCCTCCACCAAGGGACCTTCTGTGTTCCCACTGGCTCCCTCTA GTAAATCCACATCTGGGGGAACTGCAGCCCTGGGCTGTCTGGTG AAGGACTACTTCCCAGAGCCCGTCACAGTGTCTTGGAACAGTGG CGCTCTGACTTCTGGGGTCCACACCTTTCCTGCAGTGCTGCAGTC AAGCGGGCTGTACAGCCTGTCCTCTGTGGTCACCGTGCCAAGTTC AAGCCTGGGAACACAGACTTATATCTGCAACGTGAATCACAAGC CATCCAATACAAAAGTCGACAAGAAAGTGGAACCCAAGTCTTGT GATAAAACCCATACATGCCCCCCTTGTCCTGCACCAGAGCTGCTG GGAGGACCAAGCGTGTTCCTGTTTCCACCCAAGCCTAAAGATAC ACTGATGATTAGTAGGACCCCAGAAGTCACATGCGTGGTCGTGG ACGTGAGCCACGAGGACCCCGAAGTCAAGTTTAACTGGTACGTG GACGGCGTCGAGGTGCATAATGCCAAGACTAAACCCAGGGAGG AACAGTACAACAGTACCTATCGCGTCGTGTCAGTCCTGACAGTG CTGCATCAGGATTGGCTGAACGGGAAAGAGTATAAGTGCAAAGT GAGCAATAAGGCTCTGCCCCGCACCTATCGAGAAAACAATTTCCA AGGCAAAAGGACAGCCTAGAGAACCACAGGTGTACGTGCTGCCT CCATCAAGGGATGAGCTGACAAAGAACCAGGTCAGCCTGCTGTG TCTGGTGAAAGGATTCTATCCCTCTGACATTGCTGTGGAGTGGGA AAGTAATGGCCAGCCTGAGAACAATTACCTGACCTGGCCCCCTG TGCTGGACTCAGATGGCAGCTTCTTTCTGTATAGCAAGCTGACCG TCGACAAATCCCGGTGGCAGCAGGGGAATGTGTTTAGTTGTTCA GTCATGCACGAGGCACTGCACAACCATTACACCCAGAAGTCACT GTCACTGTCACCAGGG |
| 55 | 3041 | VH | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSS |
| 56 | 3057 | Full | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSSASTKGPSVFPLAPSSKS TSGGTAALGCLVKDYFPEPVTVSWNSGALTSGVHTFPAVLQSSGLY SLSSVVTVPSSSLGTQTYICNVNHKPSNTKVDKKVEPKSCDKTHTCP PCPAPELLGGPSVFLFPPKPKDTLMISRTPEVTCVVVDVSHEDPEVKF |

TABLE 7-continued

Sequence for Variants v5019, v5020, v7091, v10000, v6903, v6902 and v6717 by Clone Number

| SEQ ID NO.# | Clone | Desc | Sequence (amino acid or DNA) |
|---|---|---|---|
| | | | NVVYVDGVEVHNAKTKPREEQYNSTYRVVSVLTVLHQDWLNGKEY KCKVSNKALPAPIEKTISKAKGQPREPQVYVYPPSRDELTKNQVSLT CLVKGFYPSDIAVEWESNGQPENNYKTTPPVLDSDGSFALVSKLTV DKSRWQQGNVFSCSVMHEALHNHYTQKSLSLSPG |
| 57 | 3057 | Full | GAAGTGCAGCTGGTCGAATCTGGAGGAGGACTGGTGCAGCCAGG AGGGTCCCTGCGCCTGTCTTGCGCCGCTAGTGGCTTCACTTTTAC CGACTACACCATGGATTGGGTGCGACAGGCACCTGGAAAGGGCC TGGAGTGGGTCGCCGATGTGAACCCAAATAGCGGAGGCTCCATC TACAACCAGCGGTTCAAGGGCCGGTTCACCCTGTCAGTGGACCG GAGCAAAAACACCCTGTATCTGCAGATGAATAGCCTGCGAGCCG AAGATACTGCTGTGTACTATTGCGCCCGGAATCTGGGGCCCTCCT TCTACTTTGACTATTGGGGCAGGGAACTCTGGTCACCGTGAGCT CCGCCTCCACCAAGGGACCTTCTGTGTTCCCACTGGCTCCCTCTA GTAAATCCACATCTGGGGGAACTGCAGCCCTGGGCTGTCTGGTG AAGGACTACTTCCCAGAGCCCGTCACAGTGTCTTGGAACAGTGG CGCTCTGACTTCTGGGGTCCACACCTTTCCTGCAGTGCTGCAGTC AAGCGGGCTGTACAGCCTGTCCTCTGTGGTCACCGTGCCAAGTTC AAGCCTGGGAACACAGACTTATATCTGCAACGTGAATCACAAGC CATCCAATACAAAAGTCGACAAGAAAGTGGAACCCAAGTCTTGT GATAAAACCCATACATGCCCCCCTTGTCCTGCACCAGAGCTGCTG GGAGGACCAAGCGTGTTCCTGTTTCCACCCAAGCCTAAAGATAC ACTGATGATTAGTAGGACCCCAGAAGTCACATGCGTGGTCGTGG ACGTGAGCCACGAGGACCCCGAAGTCAAGTTTAACTGGTACGTG GACGGCGTCGAGGTGCATAATGCCAAGACTAAACCCAGGGAGG AACAGTACAACAGTACCTATCGCGTCGTGTCCGTACTGACAGTG CTGCATCAGGATTGGCTGAACGGGAAAGAGTATAAGTGCAAAGT GAGCAATAAGGCTCTGCCCGCACCTATCGAGAAAACAATTTCCA AGGCAAAAGGACAGCCTAGAGAACCACAGGTGTACGTGTATCCT CCATCAAGGGATGAGCTGACAAAGAACCAGGTCAGCCTGACTTG TCTGGTGAAAGGATTCTATCCCTCTGACATTGCTGTGGAGTGGGA AAGTAATGGCCAGCCTGAGAACAATTACAAGACCACACCCCCTG TGCTGGACTCAGATGGCAGCTTCGCGCTGGTGAGCAAGCTGACC GTCGACAAATCCCGGTGGCAGCAGGGGAATGTGTTTAGTTGTTC AGTCATGCACGAGGCACTGCACAACCATTACACCCAGAAGTCAC TGTCACTGTCACCAGGG |
| 58 | 3057 | VH | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSS |
| 59 | 3317 | Full | DIQMTQSPSSLSASVGDRVTITCKASQDVSIGVAWYQQKPGKAPKL LIYSASYRYTGVPSRFSGSGSGTDFTLTISSLQPEDFATYYCQQYYIY PYTFGQGTKVEIKGGGSGGGGSGGGGSEVQLVESGGGLVQPGGS LRLSCAASGFTFTDYTMDWVRQAPGKGLEWVADVNPNSGGSIYNQ RFKGRFTLSVDRSKNTLYLQMNSLRAEDTAVYYCARNLGPSFYFDY WGQGTLVTVSSAAEPKSSDKTHTCPPCPAPELLGGPSVFLFPPKPKD TLMISRTPEVTCVVVDVSHEDPEVKFNVVYVDGVEVHNAKTKPREE QYNSTYRVVSVLTVLHQDWLNGKEYKCKVSNKALPAPIEKTISKAK GQPREPQVYVYPPSRDELTKNQVSLTCLVKGFYPSDIAVEWESNGQ PENNYKTTPPVLDSDGSFALVSKLTVDKSRWQQGNVFSCSVMHEA LHNHYTQKSLSLSPGK |
| 60 | 3317 | Full | GACATTCAGATGACCCAGAGCCCTAGCTCCCTGAGTGCCTCAGT CGGGGACAGGGTGACTATCACCTGCAAGGCTTCACAGGATGTCA GCATTGGCGTGGCATGGTACCAGCAGAAGCCAGGGAAAGCACCC AAGCTGCTGATCTATAGCGCCTCCTACAGGTATACAGGCGTGCC ATCCCGCTTCTCTGGCAGTGGGTCAGGAACTGACTTTACACTGAC TATTTCTAGTCTGCAGCCCGAAGATTTCGCCACATACTATTGCCA GCAGTACTATATCTACCCTTATACTTTTGGCCAGGGGACCAAAGT GGAGATTAAGGGCGGAGGAGGCTCCGGAGGAGGAGGGTCTGGA GGAGGAGGAAGTGAGGTCCAGCTGGTGGAATCTGGAGGAGGAC TGGTGCAGCCAGGAGGGTCCCTGAGGCTGTCTTGTGCCGCTAGT GGCTTCACCTTTACAGACTACACAATGGATTGGGTGCGCCAGGC ACCAGGAAAGGGACTGGAATGGGTCGCTGATGTGAACCCTAATA GCGGAGGCTCCATCTACAACCAGCGGTTCAAAGGACGGTTCACC CTGTCAGTGGACCGGAGCAAGAACACCCTGTATCTGCAGATGAA CAGCCTGAGAGCCGAGGATACTGCTGTGTACTATTGCGCCAGGA ATCTGGGCCCAAGCTTCTACTTTGACTATTGGGGCAGGGAACA CTGGTCACTGTGTCAAGCGCAGCCGAACCCAAATCCTCTGATAA GACTCACACCTGCCCACCTTGTCCAGCTCCAGAGCTGCTGGGAG GACCTAGCGTGTTCCTGTTTCACCCAAGCCAAAAGACACTCTGA TGATTTCTAGAACCCCTGAAGTGACATGTGTGGTCGTGGACGTCA |

TABLE 7-continued

Sequence for Variants v5019, v5020, v7091, v10000, v6903, v6902 and v6717 by Clone Number

| SEQ ID NO.# | Clone | Desc | Sequence (amino acid or DNA) |
|---|---|---|---|
| | | | GTCACGAGGACCCCGAAGTCAAATTCAACTGGTACGTGGATGGC GTCGAGGTGCATAATGCCAAGACCAAACCCCGAGAGGAACAGT ACAACTCAACCTATCGGGTCGTGAGCGTCCTGACAGTGCTGCAT CAGGACTGGCTGAACGGCAAGGAGTATAAGTGCAAAGTGAGCA ACAAGGCTCTGCCTGCACCAATCGAGAAGACCATTTCCAAGGCT AAAGGGCAGCCCCGCGAACCTCAGGTCTACGTGTATCCTCCAAG CCGAGATGAGCTGACAAAAAACCAGGTCTCCCTGACTTGTCTGG TGAAGGGATTTTACCCAAGTGACATCGCAGTGGAGTGGGAATCA AATGGCCAGCCCGAAAACAATTATAAGACCACACCCCCTGTGCT GGACTCTGATGGGAGTTTCGCACTGGTCTCCAAACTGACCGTGG ACAAGTCTCGGTGGCAGCAGGGAAACGTCTTTAGCTGTTCCGTG ATGCACGAGGCCCTGCACAATCATTACACACAGAAATCTCTGAG TCTGTCACCTGGCAAG |
| 61 | 3317 | VL | DIQMTQSPSSLSASVGDRVTITCKASQDVSIGVAWYQQKPGKAPKL LIYSASYRYTGVPSRFSGSGSGTDFTLTISSLQPEDFATYYCQQYYIY PYTFGQGTKVEIK |
| 62 | 3317 | VH | EVQLVESGGGLVQPGGSLRLSCAASGFTFTDYTMDWVRQAPGKGL EWVADVNPNSGGSIYNQRFKGRFTLSVDRSKNTLYLQMNSLRAED TAVYYCARNLGPSFYFDYWGQGTLVTVSS |
| 63 | 5244 | Full | DIQMTQSPSSLSASVGDRVTITCRASQDVNTAVAWYQQKPGKAPKL LIYSASFLYSGVPSRFSGSRSGTDFTLTISSLQPEDFATYYCQQHYTTP PTFGQGTKVEIKGGSGGGSGGGSGGGSGGGSGEVQLVESGGGLVQP GGSLRLSCAASGFNIKDTYIHWVRQAPGKGLEWVARIYPTNGYTRY ADSVKGRFTISADTSKNTAYLQMNSLRAEDTAVYYCSRWGGDGFY AMDYWGQGTLVTVSSAAEPKSSDKTHTCPPCPAPELLGGPSVFLFP PKPKDTLMISRTPEVTCVVVDVSHEDPEVKFNVVYVDGVEVHNAKT KPREEQYNSTYRVVSVLTVLHQDWLNGKEYKCKVSNKALPAPIEK TISKAKGQPREPQVYVLPPSRDELTKNQVSLLCLVKGFYPSDIAVEW ESNGQPENNYLTWPPVLDSDGSFFLYSKLTVDKSRWQQGNVFSCSV MHEALHNHYTQKSLSLSPG |
| 64 | 5244 | Full | GACATTCAGATGACACAGAGCCCCAGCTCCCTGAGTGCTTCAGT CGGCGACAGGGTGACTATCACCTGCCGCGCATCCCAGGATGTCA ACACCGCTGTGGCATGGTACCAGCAGAAGCCTGGAAAAGCCCCA AAGCTGCTGATCTACAGCGCTTCCTTCCTGTATTCTGGCGTGCCA AGTCGGTTTTCTGGAAGTAGATCAGGCACTGACTTCACACTGACT ATCTCTAGTCTGCAGCCCGAAGATTTTGCCACCTACTATTGCCAG CAGCACTATACCACCCCCTACATTCGGACAGGGCACTAAAGT GGAGATTAAGGGCGGGTCAGGCGGAGGGAGCGGAGGAGGGTCC GGAGGAGGGTCTGGAGGAGGGAGTGGAGAGGTCCAGCTGGTGG AATCTGGAGGAGGACTGGTGCAGCCTGGAGGCTCACTGCGACTG AGCTGTGCCGCTTCCGGCTTTAACATCAAAGACACATACATTCAT TGGGTCAGGCAGGCACCAGGGAAGGGACTGGAATGGGTGGCCC GCATCTATCCCACAAATGGGTACACTCGATATGCCGACAGCGTG AAAGGACGGTTTACCATTTCTGCTGATACCAGTAAGAACACAGC ATACCTGCAGATGAACAGCCTGCGCGCAGAGGATACAGCCGTGT ACTATTGCAGTCGATGGGGGGGAGACGGCTTCTACGCCATGGAT TATTGGGGCCAGGGGACTCTGGTCACCGTGTCAAGCGCAGCCGA ACCTAAATCCTCTGACAAGACCCACACATGCCCACCCTGTCCTGC TCCAGAGCTGCTGGGAGGACCATCCGTGTTCCTGTTTCCTCCAAA GCCTAAAGATACACTGATGATTAGCCGCACTCCCGAAGTCACCT GTGTGGTCGTGGACGTGTCCCACGAGGACCCCGAAGTCAAGTTC AACTGGTACGTGGACGGCGTCGAGGTGCATAATGCCAAGACTAA ACCAAGAGAGGAACAGTACAATTCAACCTATAGGGTCGTGAGCG TCCTGACAGTGCTGCATCAGGATTGGCTGAACGGCAAGGAGTAT AAGTGCAAAGTGTCTAACAAGGCCCTGCCCGCTCCTATCGAGAA GACTATTAGCAAGGCAAAAGGGCAGCCACGGGAACCCCAGGTCT ACGTGCTGCCCCCTAGCAGAGACGAGCTGACCAAAAACCAGGTC TCCCTGCTGTGTCTGGTGAAGGGCTTTTATCCTAGTGATATCGCT GTGGAGTGGGAATCAAATGGGCAGCCAGAAAACAATTACCTGAC ATGGCCACCCGTGCTGGACAGCGATGGGTCCTTCTTTCTGTATTC CAAACTGACTGTGGACAAGTCTAGATGGCAGCAGGGAAACGTCT TCAGCTGTTCCGTGATGCACGAGGCCCTGCACAATCATTACACCC AGAAGTCTCTGAGTCTGTCACCCGGC |
| 65 | 5244 | VL | DIQMTQSPSSLSASVGDRVTITCRASQDVNTAVAWYQQKPGKAPKL LIYSASFLYSGVPSRFSGSRSGTDFTLTISSLQPEDFATYYCQQHYTTP PTFGQGTKVEIK |

TABLE 7-continued

Sequence for Variants v5019, v5020, v7091, v10000, v6903, v6902 and v6717 by Clone Number

| SEQ ID NO.# | Clone Desc | Sequence (amino acid or DNA) |
|---|---|---|
| 66 | 5244 VH | EVQLVESGGGLVQPGGSLRLSCAASGFNIKDTYIHWVRQAPGKGLE WVARIYPTNGYTRYADSVKGRFTISADTSKNTAYLQMNSLRAEDT AVYYCSRWGGDGFYAMDYWGQGTLVTVSS |
| 67 | 5244,L1 5034, 719, 720 | QDVNTA |
| 68 | 5244,L2 5034, 719, 720 | SAS |
| 69 | 5244,L3 5034, 719, 720 | QQHYTTPPT |
| 70 | 5244 H1 | GFNIKDTY |
| 71 | 5244 H2 | IYPTNGYT |
| 72 | 5244 H3 | SRWGGDGFYAMDY |

Examples

Below are examples of specific embodiments for making and using the bispecific anti-HER2 antigen-binding construct and ADCs described herein. The examples are offered for illustrative purposes only, and are not intended to limit the scope of the disclosure in any way. Efforts have been made to ensure accuracy with respect to numbers used (e.g., amounts, temperatures, etc.), but some experimental error and deviation should, of course, be allowed for.

The constructs and methods described herein can be prepared and carried out employing, unless otherwise indicated, conventional methods of protein chemistry, biochemistry, recombinant DNA techniques and pharmacology, within the skill of the art. Such techniques are explained fully in the literature. See, e.g., T.E. Creighton, *Proteins: Structures and Molecular Properties* (W. H. Freeman and Company, 1993); A. L. Lehninger, *Biochemistry* (Worth Publishers, Inc., current addition); Sambrook, et al., *Molecular Cloning: A Laboratory Manual* (2nd Edition, 1989); *Methods In Enzymology* (S. Colowick and N. Kaplan eds., Academic Press, Inc.); *Remington's Pharmaceutical Sciences*, 18th Edition (Easton, Pennsylvania: Mack Publishing Company, 1990); Carey and Sundberg *Advanced Organic Chemistry* 3rd Ed. (Plenum Press) Vols A and B (1992).

Example 1: Description and Preparation of Variant 10000 (v10000)

v10000 is a humanized bispecific antibody that recognizes 2 non-overlapping epitopes of the ECD of the human HER2 antigen. The IgG1-like Fc region of v 10000 contains complementary mutations in each CH3 domain that impart preferential pairing to generate a heterodimeric molecule and correspondingly disfavor formation of homodimers. FIG. 1 depicts a representation of the format of v10000 where heavy chain A and light chain A' form the ECD2 binding portion of the antibody and heavy chain B comprises the scFv that forms the ECD4 binding portion of the antibody. Variant 10000 comprises a heavy chain H1 (corresponding to heavy chain A in FIG. 1) comprising the sequence set forth in SEQ ID NO: 36, a heavy chain H2 (corresponding to heavy chain B in FIG. 1) comprising the sequence set forth in SEQ ID NO:63, and a light chain L1 (corresponding to light chain A') comprising the sequence set forth in SEQ ID NO:24. Methods of preparing v10000 are described in detail in International Patent Publication No. WO 2015/077891.

v10000 was manufactured according to the relevant regulatory requirements for human trials and formulated at 15 mg/mL in biocompatible aqueous buffer, for IV infusion at ambient temperature. v10000 was supplied in a vial containing 300 mg v10000 in 20 mL buffer. Vials of v10000 were shipped frozen and stored at −20° C. (+/−5° C.) until ready for use. Vials were thawed at ambient temperature prior to use. Thawed solutions in vials were stored for up to 24 hours at ambient temperatures or up to 72 hours at refrigerated conditions (2° C. to 8° C.) and used before the labeled expiration date.

Example 2: Phase I Clinical Trial of v10000 in Patients with Locally Advanced (Unresectable) and/or Metastatic HER2-Expressing Cancers This is an ongoing first-in-human study to investigate the safety, tolerability, pharmacokinetics (PK), and preliminary anti-tumor activity of v10000 monotherapy in patients with locally advanced (unresectable) and/or metastatic human epidermal growth factor receptor 2 (HER2)-expressing cancers.

Part 1 of the study was a 3+3 dose escalation which identified 20 mg/kg Q2W single agent as the recommended dose (RD). Part 2 is ongoing and is evaluating the v10000 RD in additional patients, including patients with HER2- high BTC. Eligible patients in Parts 1 and 2 must have had progression of disease after all therapies known to confer clinical benefit. Tumor responses were assessed by investigator review per RECIST v1.1 Q8W.

Objectives

The primary objective of Part 1 of the clinical trial was to determine the MTD (maximum tolerated dose), OBD (optimal biologic dose), or RD of v10000 monotherapy. The secondary objectives of Part 1 of the clinical trial were to (1) characterize the safety and tolerability of v10000; (2) characterize the serum PK profile of v10000; and (3) explore the potential anti-tumor effects of v10000 in eligible patients with HER2-expressing cancers.

The primary objective of Part 2 of the trial was to characterize the safety and tolerability of v10000 monotherapy in specific tumor types. The secondary objectives of Part 2 of the clinical trial were to (1) characterize the serum PK profile of v10000 monotherapy and (2) explore the potential anti-tumor effects of v10000 at the MTD, OBD, or RD in eligible patients with selected HER2-expressing locally advanced (unresectable) and/or metastatic cancers.

Patients

Male or female patients ≥18 years of age with an ECOG (Eastern Cooperative Oncology Group) performance status of 0 or 1 and a life expectancy of at least 3 months in the opinion of the clinical investigator were included in the trial.

In Part 1, Cohorts 1-3 included patients with any locally advanced (unresectable) and/or metastatic HER2-expressing (HER2 1+, 2+, or 3+ by IHC) cancer (including but not limited to breast, gastric, ovarian, colorectal and non-small cell lung) that had progressed after receipt of all therapies known to confer clinical benefit. Cohorts 4-6 included patients with HER2 IHC 2+/FISH-breast cancer or gastroesophageal adenocarcinoma (GEA); patients with HER2 IHC 3+ or HER2 IHC 2+/FISH+ breast cancer or GEA. Cohorts 4-6 also included patients with any other HER2 IHC 3+ or FISH+ cancer, where the cancer was HER2-overexpressing (3+ by IHC) or HER2-2+ and FISH+ breast cancer must have progressed after prior treatment with trastuzumab, pertuzumab, and T-DM1; where the cancer was HER2-overexpressing (3+ by IHC) or HER2-2+ and FISH+ GEA must have progressed after prior treatment with trastuzumab; where colorectal cancer patients were KRAS wild-type; or where patients with NSCLC were ALK wild-type, EGFR wild-type and ROS1 fusion negative as determined by standard methods. Cohort 7 was enrolled at selected sites and included patients with HER2 IHC 3+, HER2 IHC 2+/FISH+, or HER2 IHC 2+/FISH-breast cancer.

In Part 2, cohort expansion using v10000 administered at the MTD, OBD, or RD from Part 1 of the study included locally advanced (unresectable) and/or metastatic cancer that has progressed after receipt of all therapies known to confer clinical benefit (unless ineligible to receive a specific therapy) as follows:

Cohort 1: HER2 IHC 2+/FISH-breast cancer
Cohort 2: HER2 IHC 3+ or HER2 IHC 2+/FISH+ breast cancer
Cohort 3: HER2 IHC 2+/FISH-GEA
Cohort 4: HER2 IHC 3+ or HER2 IHC 2+/FISH+ GEA
Cohort 5: Any other HER2 IHC 3+ or IHC 2+/FISH+ cancer, including the following:
Cohort 5a: HER2 IHC 3+ or IHC 2+/FISH+GI (gastrointestinal) cancers other than GEA where patients with colorectal cancer were KRAS wild-type
Cohort 5b: Any other HER2 IHC 3+ or IHC 2+/FISH+ solid tumor types that are not breast or GI cancers, where patients with NSCLC must have ALK wild-type, EGFR wild-type, and ROS1 fusion negative as determined by standard methods. Patients with ovarian cancers must be KRAS wild type.

Additional criteria for patients in Parts 1 and 2 included: (1) HER2 IHC 3+ or IHC 2+/FISH+ breast cancer must have progressed after prior treatment with trastuzumab, pertuzumab, and T-DM1; (2) HER2 IHC 3+ or IHC 2+/FISH+ GEA must have progressed after prior treatment with trastuzumab; (3) Patients with colorectal cancer must be Kirsten rat sarcoma (KRAS) wild-type; and (4) Patients with NSCLC must have anaplastic lymphoma kinase (ALK) wild-type, EGFR wild-type, and receptor tyrosine kinase (ROS1) fusion negative, as determined by standard methods.

Patients were excluded from the study if 1 or more of the following criteria were applicable:

1. Treatment with experimental therapies within 4 weeks before first v10000 dosing
2. Treatment with other cancer therapy not otherwise specified within 4 weeks before v10000 dosing
3. Treatment with anthracyclines within 90 days before first v10000 dosing or total lifetime dose exceeding 300 mg/m² adriamycin or equivalent
4. Treatment with trastuzumab, pertuzumab, lapatinib, or T-DM1 within 3 weeks before first v10000 dosing
5. Untreated brain metastases (patients with treated brain metastases who are off steroids and are stable for at least 1 month at the time of Screening are eligible). All breast cancer patients should undergo screening prior to starting treatment. Those patients found to have untreated brain metastases may be rescreened following appropriate therapy.
6. Clinically assessed leptomeningeal disease (LMD). If LMD has been reported radiographically on baseline MRI but is not suspected clinically by the investigator, the patient is eligible if he or she is free of neurological symptoms of LMD as documented by the investigator
7. Major surgery or radiotherapy within 3 weeks before first v10000 dosing
8. Pregnant or breast-feeding women
9. History of life-threatening hypersensitivity to monoclonal antibodies or to recombinant proteins or excipients in drug formulation
10. Any other cancer within 3 years before first v10000 dosing with the exception of contralateral breast cancer, adequately treated cervical carcinoma in situ, or adequately treated basal or squamous cell carcinoma of the skin, or any other cancer that has undergone curative treatment, with approval from the sponsor medical monitor.
11. Acute or chronic uncontrolled renal disease, pancreatitis or liver disease (with exception of patients with Gilbert's Syndrome, asymptomatic gall stones, liver metastases, or stable chronic liver disease per investigator assessment)
12. Peripheral neuropathy: >Grade 2 NCI-CTCAE version 4.03, 14 Jul. 2010
13. Clinically significant interstitial lung disease
14. History of noncompliance to medical regimens
15. Unwilling to or unable to comply with the protocol
16. Known active hepatitis B or C or known infection with human immunodeficiency virus (HIV)
17. Use of corticosteroids administered at doses equivalent to >15 mg per day of prednisone within 2 weeks of first v10000 dosing unless otherwise approved by the study medical monitor.
18. QTc Fridericia (QTcF)>450 ms.

19. Having any toxicity related to prior cancer therapies that has not resolved to ≤Grade 1, with the following exceptions: alopecia; neuropathy (which must have resolved to ≤Grade 2); and congestive heart failure (CHF), which must have been≤Grade 1 in severity at the time of occurrence, and must have resolved completely.
20. Having clinically significant cardiac disease such as ventricular arrhythmia requiring therapy, uncontrolled hypertension, or any history of symptomatic CHF.
21. Having known myocardial infarction or unstable angina within 6 months before first v10000 dosing.

Treatment v10000 as a single agent (monotherapy) was administered as an intravenous (IV) in Parts 1 and 2. v10000 was administered by IV infusion in 0.9% normal saline over 120 to 150 minutes. If for a particular patient the first 2 doses administered were well tolerated, the infusion duration for that patient may have been decreased to 90 minutes. If the next 2 doses are well tolerated, the infusion duration may be decreased to 60 minutes. The infusion rate did not exceed 250 mL of 0.9% normal saline/hour. (Example: If a dose of v10000 is diluted into 250 mL bag of saline, the infusion should be administered over at least 60 minutes. If a dose of v10000 was diluted into 500 mL bag, the infusion should be administered over at least 120 minutes.) The study drug dosage was calculated based on patient weight on Cycle 1 Day 1. Dose was recalculated only if there is a change in weight by 10% from the assessment at Cycle 1 Day 1.

In Part 1, dose levels for dose-escalation were 5, 10, and 15 mg/kg given once weekly (QW). Biweekly (Q2W) dosing was also evaluated. Dose levels for Q2W dosing were 20, 25, or 30 mg/kg. Q2W dosing may have used an initial loading dose (not exceeding 20, 25, or 30 mg/kg) followed by administration of v10000 at a lower dose level as recommended by the SMC. Additionally, dosing with 30 mg/kg every 3 weeks (Q3W) was studied.

The dose level for Part 2 was the MTD, OBD, or an RD as determined in Part 1. The MTD is defined as the highest dose level at which no more than 1 of 6 patients experienced DLT during the first 4 weeks of treatment. The OBD is defined as the dose of v10000 that results in a serum concentration of v10000 at trough (7 days postdose) that is at least 10-fold above the maximum binding capacity of v10000 on a cell line representing the HER2-3+ tumor histology. An RD is any other dosage that does not exceed the MTD. Based on the results of Part 1, the RD of 20 mg/kg Q2W was used to treat the majority of patients in Part 2. Some patients were treated with 10 mg/kg weekly.

Patients participated for a minimum of 2 cycles of 3 or 4 weeks each depending upon the part, cohort, or TG in which the patient was enrolled. Treatment may have been continued for additional cycles as long as there was no evidence of clinical progression, unacceptable toxicity, or evidence of progressive disease as defined by RECIST version 1.1. Clinical progression defined as worsening or re-emergence of pre-existing symptoms relating to underlying cancers, or emergence of new symptoms that cannot be attributed to study drug toxicities or alternative causes. Patients who in the opinion of the clinical investigator demonstrated ongoing clinical benefit despite radiologic progression may have continued to receive treatment following discussion with and approval from the sponsor's medical monitor. For Part 3, patients may have continued to receive treatment with v10000 if chemotherapy was discontinued due to toxicity unrelated to is v10000. Patients who discontinued treatment with v10000 for any reason were withdrawn from the study.

Efficacy Assessments

Measures of anti-tumor activity were evaluated based on response assessments made according to using the new international criteria proposed by the revised Response Evaluation Criteria in Solid Tumors (RECIST) guideline (version 1.1) [Eur J Ca 45:228-247, Changes in the largest diameter (unidimensional measurement) of the tumor lesions and the shortest diameter in the case of malignant lymph nodes are used in the RECIST version 1.1 criteria. Clinical response of CR, PR, SD, or progressive disease (PD) were determined at each assessment by the investigator. PD included progressive disease per RECIST version 1.1 and clinical disease progression per investigator. Clinical progression is defined as worsening or re-emergence of pre-existing symptoms relating to underlying cancers, or emergence of new symptoms that cannot be attributed to study drug toxicities or alternative causes.

Objective response rate (ORR) is defined as the percentage of patients who have at least 1 overall tumor response of either CR or PR before any evidence of progression, as defined by RECIST version 1.1. A patient is said to have achieved disease control if they have a tumor response of CR, PR, or SD according to RECIST version 1.1 criteria. Disease control rate will be assessed every 8 weeks after the start of v10000 therapy. PFS time is defined as the time from the first dose of v10000 to the date of documented disease progression per RECIST version 1.1, clinical progression, or death from any cause. Patients who are alive and have not progressed at the time of the analysis will be censored at the time of their last tumor assessment that was a CR, PR, or SD.

Tumor responses were evaluated based on CT and/or MRI scans (using the same methodology for each scan of the same patient) of the chest, abdomen, and pelvis plus additional areas of known or suspected tumor involvement (e.g., brain, extremities).

Objective responses and tumor progression were evaluated locally. Scans were collected for all subjects for centralized review performed at the discretion of the sponsor. The local evaluations were used for all treatment-related decisions.

For some patients, tumor volume may be calculated centrally.

Adverse Effects

An AE (Adverse Effect) is defined as any untoward medical occurrence in a clinical study patient administered a medicinal product which does not necessarily have a causal relationship with this treatment. An AE can therefore be any unfavorable and unintended sign (including an abnormal laboratory finding), symptom, or disease temporally associated with the use of a medicinal (investigational) product, whether or not it is related to the medicinal (investigational) product. This includes an exacerbation of pre-existing conditions or events, intercurrent illnesses, drug interaction or the significant worsening of the indication under investigation that is not recorded elsewhere in the CRF under specific efficacy assessments. Safety evaluations were made on the basis of the NCI-CTCAE version 4.03, 14 Jul. 2010.

Early Results:

As of June 2018, in one patient with gall bladder cancer, treatment with v10000 resulted in an approximate 40% decrease in the sum of longest diameters (SLD) in target lesions. This patient later exhibited an approximately 50% decrease in target lesions as measured by SOD (sum of the diameters).

As of November 2018, in one patient with CCA, an approximately 40% decrease in target lesions was observed after treatment with v10000 as measured by SOD.

Interim Results:

As of 22 Apr. 2019, 89 patients across all indications had been enrolled and treated with single agent v10000 in Parts 1 and 2 of v10000 (23 in Part 1 and 66 in Part 2) (Table C). Tumor types evaluated included breast (n=42), gastroesophageal (n=20), colorectal (n=11), biliary tract (n=6), and other cancers (n=10). Among patients with BTC, the median number of prior systemic regimens received was 4 (range 1-8), including trastuzumab in one patient.

In Parts 1 and 2 of the study, the majority of AEs have been Grade 1 or 2 in severity (Table D). v10000-related Grade 3 AEs have included fatigue (n=3, including one event reported as an SAE), diarrhea (n=2), arthralgia (n=1), and hypophosphatemia (n=1).

Figure 2:
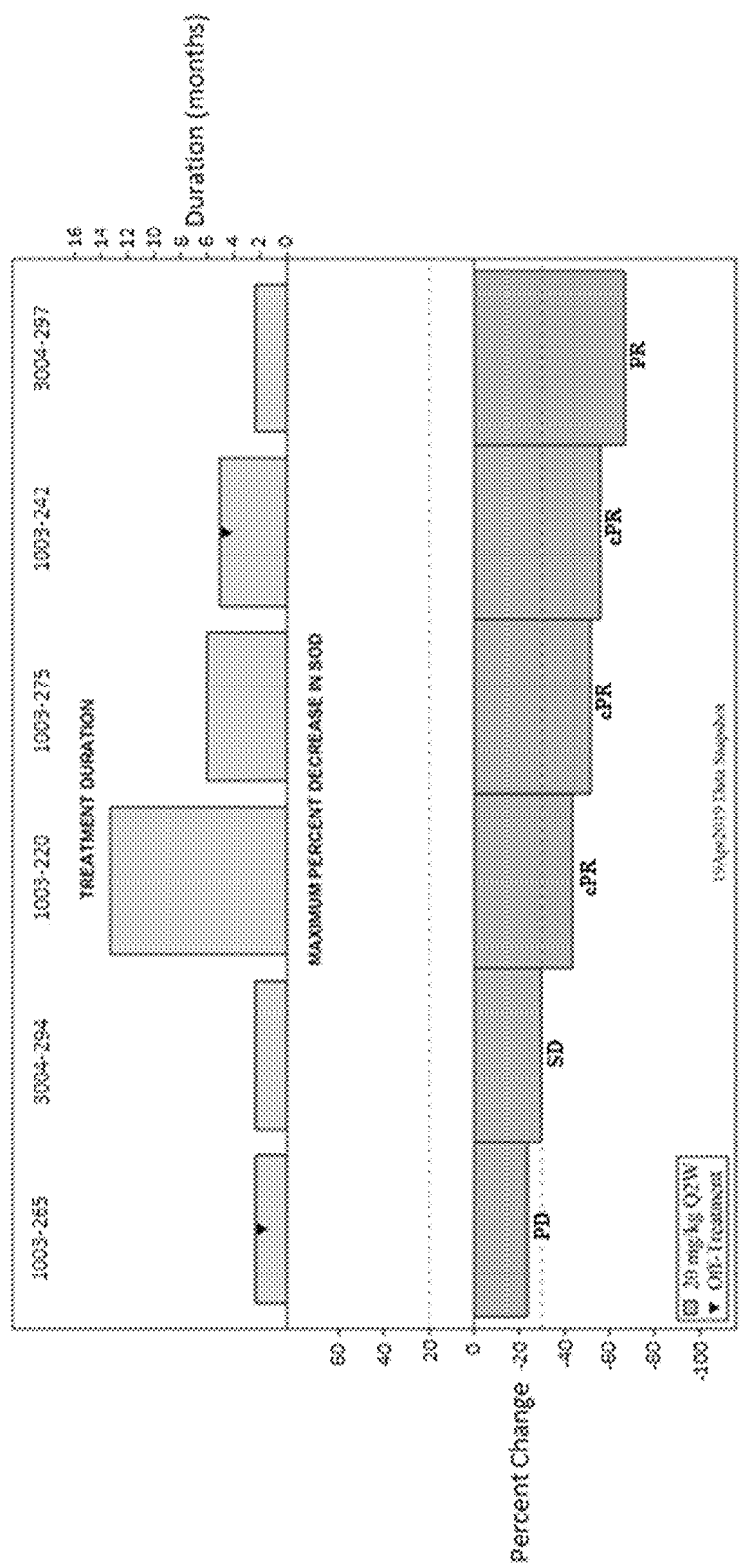
FIG. 2 depicts treatment duration and maximum decrease in Sum of Diameters (SOD) in subjects having BTC and treated with v10000.

Preliminary efficacy data for patients with BTC are presented in Table E, Table F, and FIG. 2.

TABLE C

Key Demographic and Baseline Characteristics by Cancer Type in Parts 1 and 2

| Characteristic | | BTC (n = 6) | All Cancers (n = 89) |
|---|---|---|---|
| Age | Median (range) | 64.5 (47-74) | 60 (27-81) |
| Sex | Female, n (%) | 3 (50) | 58 (65) |
| | Male, n (%) | 3 (50) | 31 (35) |
| Race | White, n (%) | 2 (33) | 63 (71) |
| | Asian | 3 (50) | 14 (16) |
| | Other | 1 (17) | 12 (13) |

TABLE D

Summary of v10000-Related Adverse Events by Cancer Type in Parts 1 and 2

| | v10000 Related AEs | BTC (%) (n = 6) | All Cancers (%) (n = 89) |
|---|---|---|---|
| Any | | 5 (83) | 70 (79) |
| Most Common | Diarrhea | 3 (50) | 39 (44) |
| (>20%) | Infusion-related reaction | 2 (33) | 28 (31) |

TABLE E

Summary of Best Response in Measurable Disease Analysis Set in Parts 1 and 2

| Cancer Type | DCR (PR + SD)$^a$ | | ORR$^a$ | | PFS (months)$^b$ | | |
|---|---|---|---|---|---|---|---|
| | n/N (%) | 95% CI | n/N (%) | 95% CI | Censored n/N (%) | Median | 95% CI |
| BTC | 5/6 (83.3) | 35.9, 99.6 | 4/6 (66.7) | 22.3, 95.7 | 4/6 | NE | 1.8, NE |
| All Cancers | 48/67 (71.7) | 59.3, 82.0 | 22/67 (32.8) | 21.8, 45.4 | 32/89 | 3.7 | 2.2, 5.2 |

$^a$Measurable disease analysis set—all patients in the safety analysis set with measurable disease per RECIST 1.1;
$^b$Safety analysis set—all patients who received at least one dose of study treatment.
CI = confidence interval,
DCR = disease control rate,
NE = not evaluable,
ORR = overall response rate,
PFS = progression-free survival,
PR = partial response,
SD = stable disease

TABLE F

Prior Regimens and Disease Response for Patients with BTC

| Patient # (Dx)$^a$ | N Prior Systemic Regimens/Prior HER2 | Best v10000 Response | Duration of Response (mos) | Time on Study (mos) | Status on Study |
|---|---|---|---|---|---|
| 1003-220 (GBC) | 8/6$^b$ | cPR | 11.0$^c$ | 13.3 | Active |
| 1003-242 (CC) | 1/0 | cPR | 3.2$^c$ | 5.1 | Off, PD |
| 1003-265 (GBC) | 1/0 | PD | NA | 2.3 | Off, PD |
| 1003-275 (GBC) | 3/0 | cPR | 3.5$^c$ | 6.0 | Active |
| 3004-294 (CC) | 4/0 | SD | NA | 2.3 | Active |
| 3004-297 (CC) | 7/0 | PR | NE$^c$ | 2.3 | Active |

$^a$All BTC patients were HER2+ (3+ or FISH+);
$^b$Patient received trastuzumab concurrently with 6 of their 8 systemic regimens;
$^c$Final DOR pending additional disease assessment.
NA = not applicable
NE = not evaluable, pending follow up disease assessment
GBC = gall bladder cancer;
CC = cholangiocarcinoma These data indicate that v10000 demonstrated a disease control rate in patients with HER2 3+ or FISH+ BTC of 83.3%, and an ORR of 66.7%.

Example 3: Preparation of Linker-Toxin 001

Linker-Toxin 001 was prepared as described below. Linker-Toxin 001 may also be prepared as described in International Patent Application Publication No. WO 2016/041082.

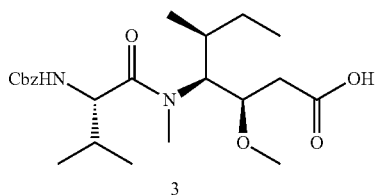

3

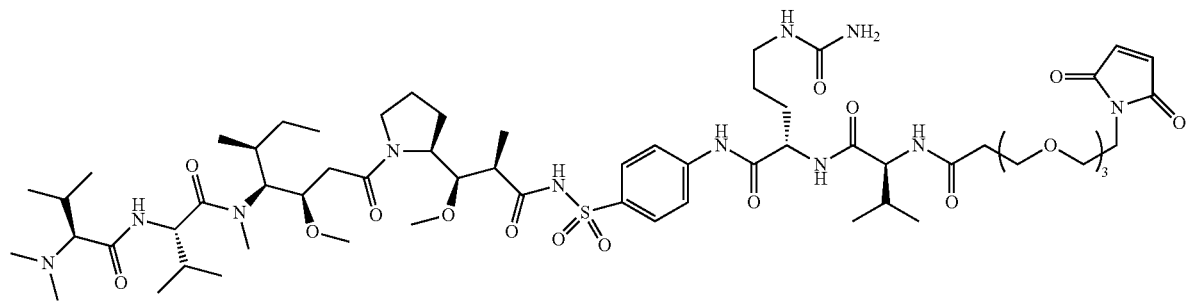

Linker-Toxin 001

A. Ethyl (2R,3R)-3-methoxy-2-methyl-3-((S)-pyrrolidin-2-yl)propanoate (Compound 1)

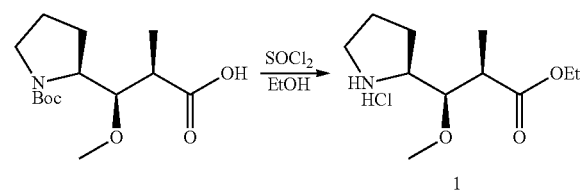

1

To a stirred solution of (2R,3R)-3-((S)-1-(tert-butoxycarbonyl)pyrrolidin-2-yl)-3-methoxy-2-methylpropanoic acid (Boc-Dap-OH, 4.31 g, 15.0 mmol) in absolute ethanol (27.0 mL) at 0° C. was added thionyl chloride (3.0 mL) in a dropwise fashion. The resulting solution was allowed to warm to room temperature and progress was monitored by HPLC-MS. After 18h, no remaining starting material was detected and the solution was concentrated to dryness under reduced pressure. The resulting oil was suspended in toluene (10 mL) and concentrated under reduced pressure two times, then suspended in diethyl ether (5 mL) and concentrated under reduced pressure two times to afford a white solid foam (3.78 g, quant yield %). MS m/z obs. =216.5 (M+1).

B. (3R,4S,5S)-4-((S)-2-(((benzyloxy) carbonyl) amino)-N,3-dimethylbutanamido)-3-methoxy-5-methylheptanoic acid (Compound 3)

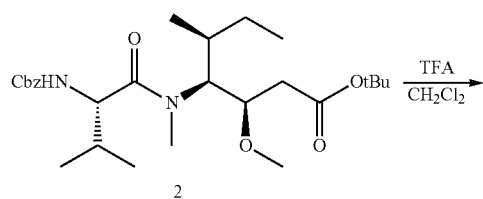

2

Compound 2 was prepared as described in International Patent Application Publication No. WO 2016/041082.

To a stirred solution of Compound 2 (6.965 g, 14.14 mmol) in dichloromethane (20 mL) was added trifluoroacetic acid (5.0 mL). The reaction was monitored for completion by HPLC-MS and after 40h no starting material remained. The reaction was concentrated under reduced pressure, co-evaporated with toluene (2×10 mL) and dichloromethane (2×10 mL) to obtain a foamy white solid (6.2 g, quant yield with residual TFA). This material was dissolved in 200 mL of hot 1:3 EtOAc: hexanes and allowed to cool to room temperature. During cooling, a precipitate formed as well as some small crystals. 5 mL EtOAc was added and the suspension was heated once again to fully dissolve the precipitate. More crystals formed on cooling to room temperature and the flask was placed at −30° C. overnight. The following morning the mother liquor was decanted and the crystals rinsed with 2×50 mL hexanes and dried under high vacuum. Recovered 5.67 g of crystalline product. MS m/z obs. =405.7 (M+1).

C. Ethyl (2R,3R)-3-((S)-1-((3R,4S,5S)-4-((S)-2-(((benzyloxy) carbonyl)amino)-N,3-dimethylbutanamido)-3-methoxy-5-methylheptanoyl)pyrrolidin-2-yl)-3-methoxy-2-methylpropanoate (Compound 4)

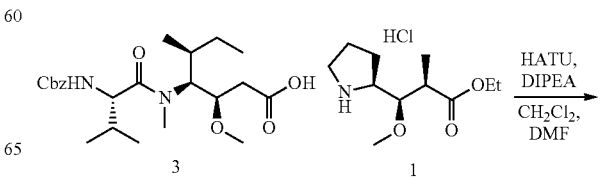

3  1

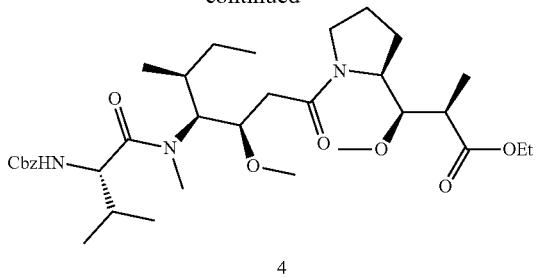

4

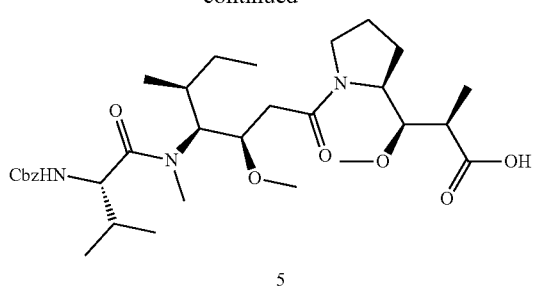

5

To a stirred solution of Compound 3 (6.711 g, 15.37 mmol, 1.025 equiv) in a mixture of dichloromethane (5.0 mL) and N,N-dimethylformamide (5.0 mL) at room temperature was added HATU (5.732 g, 15.07 mmol, 1.005 equiv) and N,N-diisopropylethylamine (7.84 mL, 3 equiv). After stirring for 30 minutes at room temperature, a solution of Compound 1 (3.776 g, 15.00 mmol, 1.0 equiv) in a mixture of dichloromethane (1.0 mL) and N,N-dimethylformamide (1.0 mL) was added dropwise, rinsed in residual Compound 1 with an additional 3 mL of 1:1 dichloromethane: N,N-dimethylformamide. The reaction was monitored by HPLC-MS and no remaining Compound 1 was observed after 15 minutes. The reaction was concentrated under reduced pressure, diluted with ethyl acetate (~125 mL) and the organic phase was extracted with 1 M HCl (2×50 mL), 1×dH$_2$O (1×50 mL), saturated NaHCO$_3$ (3×50 mL), brine (25 mL). Acidic and basic aqueous layers were both washed with 25 mL EtOAc. All organics were then pooled and dried over MgSO$_4$, filtered and concentrated to give a red oil. The residue was dissolved in a minimal amount of dichloromethane (~10 mL), loaded on to a Biotage® SNAP Ultra 360 g silica gel column (Isolera™ Flash System; Biotage AB, Sweden) for purification (20-100% EtOAc in hexanes over 10 column volumes). Fractions containing pure product were pooled to recover 7.9 g of foamy white solid. Impure fractions were subjected to a second purification on a Biotage® SNAP Ultra 100 g silica gel column and pooled with pure product to recover a white foam solid (8.390 g, 88.3%). MS m/z obs. =634.7 (M+1).

D. (2R,3R)-3-((S)-1-((3R,4S,5S)-4-((S)-2-(((benzyloxy) carbonyl)amino)-N,3-dimethyl butanamido)-3-methoxy-5-methylheptanoyl)pyrrolidin-2-yl)-3-methoxy-2-methylpropanoic acid (Compound 5)

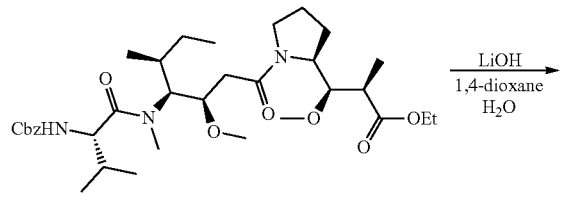

4

To a stirred solution of Compound 4 (8.390 g, 13.24 mmol) in 1,4-dioxane (158 mL) was added dH$_2$O (39.7 ml) and lithium hydroxide monohydrate (1 M in H$_2$O, 39.7 mL, 3 equiv). The reaction was stirred at 4° C. and monitored by HPLC-MS for consumption of starting material, which took 3 days until only trace Compound 4 remained. During the course of the reaction, a new product, corresponding to loss of methanol (B-elimination, <2%) formed in small percentages in addition to the desired material. The reaction was acidified with the addition of 1 M aqueous HCl (50 mL) and concentrated under reduced pressure to remove the dioxane. The remaining reaction mixture was extracted with ethyl acetate (4×50 mL) and the organic phase was pooled, washed with brine (15 mL+2 mL 2 M HCl), dried over MgSO$_4$, filtered and concentrated under reduced pressure to yield a light coloured oil. The oil was re-dissolved in diethyl ether (~50 mL) and concentrated under reduced pressure (3×) to facilitate the removal of residual dioxane, affording the title product as a stiff oil (7.81 g 97% yield with some residual dioxane and Compound 4). MS m/z obs. =606.7 (M+1).

E. Benzyl ((S)-1-(((3R,4S,5S)-3-methoxy-1-((S)-2-((1R,2R)-1-methoxy-2-methyl-3-oxo-3-((4-(2,2,2-trifluoroacetamido)phenyl)sulfonamido)propyl)pyrrolidin-1-yl)-5-methyl-1-oxoheptan-4-yl)(methyl) amino)-3-methyl-1-oxobutan-2-yl)carbamate (Compound 7)

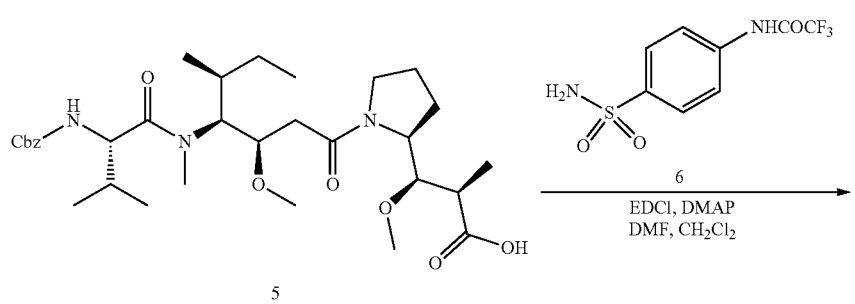

5

-continued

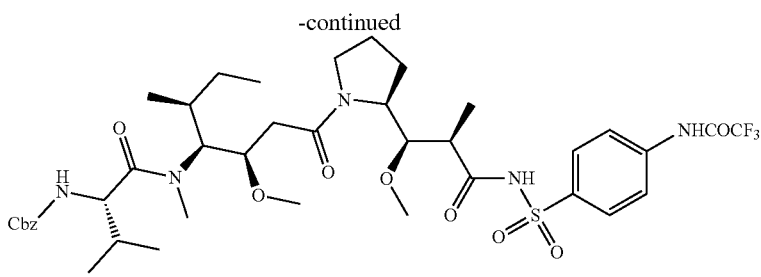

7

Compound 6 was prepared as described in International Patent Application Publication No. WO 2016/041082).

To a stirred solution of Compound 5 (7.12 g, 11.754 mmol) in dichloromethane (20 mL) was added 2,2,2-trifluoro-N-(4-sulfamoylphenyl)acetamide (Compound 6, 4.095 g, 1.3 equiv, dissolved in 3 mL DMF), N,N-dimethylpyridine (1.867 g, 1.3 equiv) and N,N-dimethylformamide (1.5 mL) to generate a light yellow suspension. Further addition of 5 mL of DMF did not clarify solution. N-(3-Dimethylaminopropyl)-N'-ethylcarbodiimide hydrochloride (EDCI) (2.817 g, 1.25 equiv) was added in a single portion and the reaction was monitored by HPLC-MS. After 48 hr, reaction was no longer progressing and an additional 400 mg of EDCI was added. After 18 hr, no remaining starting material was observed and the reaction was concentrated under reduced pressure to give a yellow oil. The oil was dissolved in ethyl acetate (~150 mL) and 1 M HCl (20 mL), and the organic phase was washed with cold 2 M HCl (2×10 mL), saturated NaHCO$_3$ (1×10 mL), brine (20 mL+5 mL 2 M HCl). Acidic and basic aqueous fractions were extracted with EtOAc (1×20 mL), all organic fractions were pooled, dried over MgSO$_4$ and concentrated under reduced pressure to yield an oily crude solid (13 g). The residue was dissolved in dichloromethane (~10 mL), loaded on to a Biotage® SNAP Ultra 360 g silica gel column and purified under a 10-100% EtOAc (2% AcOH) in hexanes gradient over 12 column volumes with a 3-column volume plateau at 50% EtOAc. Fractions containing the pure product were pooled, concentrated under reduced pressure, dissolved and concentrated from toluene (2×10 mL) and diethyl ether (2×10 mL) to afford the desired product, 7.1 g of white foam solid. Impure fractions were subjected to repeat purification under shallower gradient conditions using a Biotage® SNAP Ultra 100 g silica gel column on an Isolera™ instrument. All pure fractions were pooled to recover pure product as a white foam solid (8.60 g, 86%). MS m/z obs. =856.7 (M+1).

F. (S)-2-amino-N-((3R,4S,5S)-3-methoxy-1-((S)-2-((1R,2R)-1-methoxy-2-methyl-3-oxo-3-((4-(2,2,2-trifluoroacetamido)phenyl)sulfonamido)propyl)pyrrolidin-1-yl)-5-methyl-1-oxoheptan-4-yl)-N,3-dimethylbutanamide (Compound 7a)

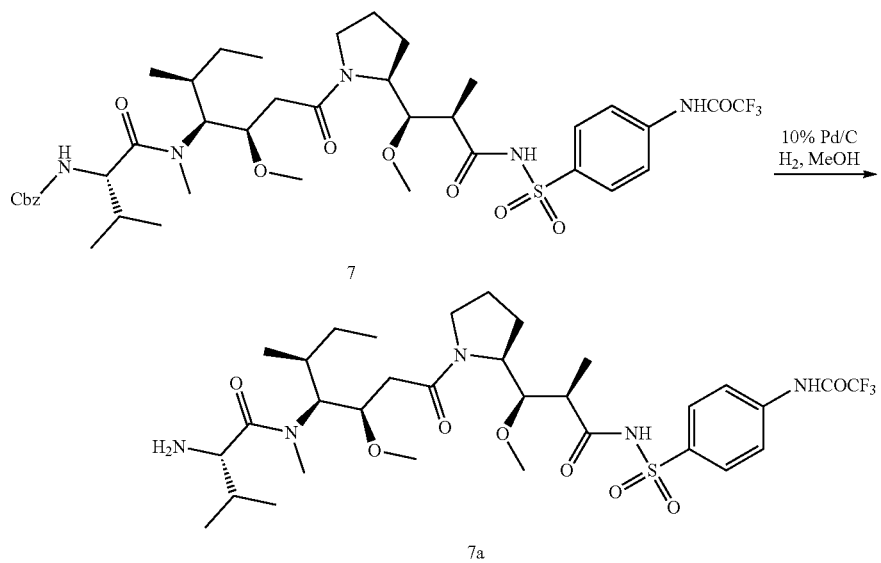

Compound 7 (3.71 g, 4.33 mmol) was dissolved in 10% N,N-dimethylformamide in ethyl acetate (30 mL) in a round bottom flask containing a magnetic stirrer and fitted with a 3-way gas line adapter. The vessel was twice evacuated under reduced pressure and charged with nitrogen gas. 10% palladium on carbon (0.461 g, 0.1 equiv) was added in a single portion, the 3-way adapter was fitted to the flask, a hydrogen balloon was fitted to the adapter and the vessel twice evacuated under reduced pressure and charged with hydrogen. The reaction was allowed to stir for 2 days, over which time the hydrogen balloon was occasionally recharged. After approximately 48h, HPLC-MS analysis indicated that no starting material remained. The reaction was diluted with methanol (20 mL) and filtered through a plug of celite. The celite was washed with methanol (2×50 mL). All filtrates were pooled and concentrated under reduced pressure and the resulting oil dissolved and concentrated from dichloromethane. After drying under reduced pressure, the title compound was isolated as a colourless powder (3.10 g, 99%). MS m/z obs. =722.6 (M+1).

G. (S)-2-((S)-2-(dimethylamino)-3-methylbutanamido)-N-((3R,4S,5S)-3-methoxy-1-((S)-2-((1R,2R)-1-methoxy-2-methyl-3-oxo-3-((4-(2,2,2-trifluoroacetamido)phenyl)sulfonamido) propyl)pyrrolidin-1-yl)-5-methyl-1-oxoheptan-4-yl)-N,3-dimethylbutanamide (Compound 8)

(1×20 mL), NaHCO₃ (sat., 2×20 mL). Aqueous layers were pooled and extracted with EtOAc (3×50 mL). Organic layers were pooled and washed with brine (1×20 mL), dried over sodium sulfate, filtered and concentrated to give a DMF-laden oil which was concentrated via rotary evaporator to remove residual DMF, yielding 7g of crude straw coloured oil. The oil was dissolved in a minimal amount of 10% methanol in dichloromethane (~11 mL) and loaded onto a Biotage® SNAP Ultra 360 g silica gel column for purification (2-20% MeOH in CH₂Cl₂ over 15 column volumes, product eluting around 10-13%). The fractions containing the desired product were pooled and concentrated under reduced pressure to afford the title compound as a colourless foam. Impure fractions were combined, evaporated and subjected to repeat purification on a Biotage® SNAP Ultra

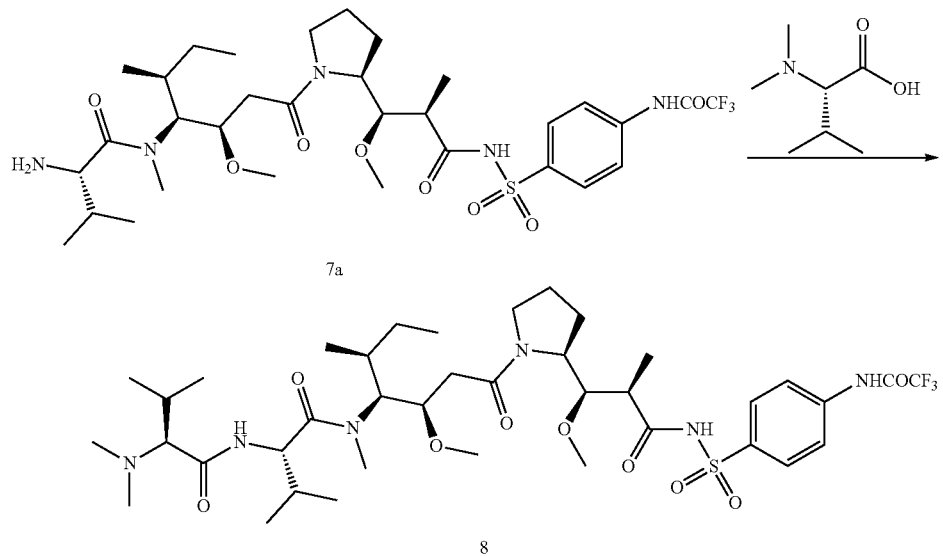

To a stirred solution of N,N-(L)-dimethylvaline (1.696 g, 9.35 mmol) in N,N-dimethylformamide (10 mL) was added HATU (3.216 g, 8.46 mmol) and di-isopropylethylamine (3.10 mL, 17.8 mmol). A clear yellow solution resulted after 5 minutes. Stirring was continued for an additional 10 minutes, then Compound 7a (3.213 g, 4.45 mmol) was added in a single portion. After an additional 1h of stirring, HPLC-MS indicated that trace amounts of Compound 7a remained and the reaction was for 16 h. The reaction was then concentrated under reduced pressure, diluted with ethyl acetate (120 mL) and 40 mL 1:1 NaHCO₃ (sat.): 5% LiCl and transferred to a separating funnel. The aqueous layer was removed and the organic phase was washed with LiCl 100 g silica gel column on an Isolera™ instrument and combined with the pure product from the first column to yield a colourless foam solid (3.78 g). MS m/z obs. =850.6 (M+1).

H. (S)—N-((3R,4S,5R)-1-((S)-2-((1R,2R)-3-((4-aminophenyl)sulfonamido)-1-methoxy-2-methyl-3-oxopropyl)pyrrolidin-1-yl)-3-methoxy-5-methyl-1-oxoheptan-4-yl)-2-((S)-2-(dimethylamino)-3-methylbutanamido)-N,3-dimethylbutanamide (Compound 9)

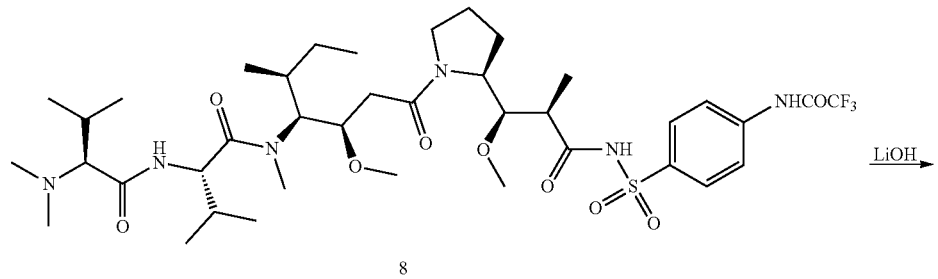

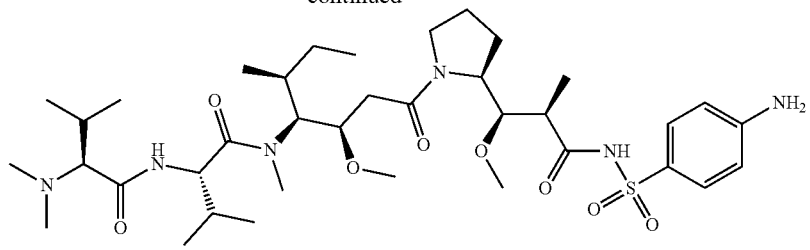

9

To a stirred solution of Compound 8 (0.980 g, 1.154 mmol) in 1,4-dioxanes (15 mL) was added water (3.5 mL) and 1 M lithium hydroxide monohydrate (3 equiv., 3.46 mL). The resulting light suspension was allowed to stir at 4° C. and was monitored by HPLC-MS for consumption of the starting material. When the conversion was complete (~5 days), the reaction was neutralized with 3.46 mL of 1 M HCl and concentrated under reduced pressure to remove dioxane. The resulting aqueous phase was diluted with 60 mL EtOAc and 5 mL brine, then extracted with ethyl acetate (2×30 mL). The organic fractions were pooled, dried over $Na_2SO_4$, filtered and evaporated to yield the title compound as a tan solid (0.930 g). $R_f$=0.5 (8% MeOH in $CH_2Cl_2$). MS m/z obs. =753.7 (M+1).

I. 2,3,5,6-tetrafluorophenyl 3-(2-(2-(2-(2,5-dioxo-2,5-dihydro-1H-pyrrol-1-yl)ethoxy)ethoxy)ethoxy)propanoate (Compound 15)

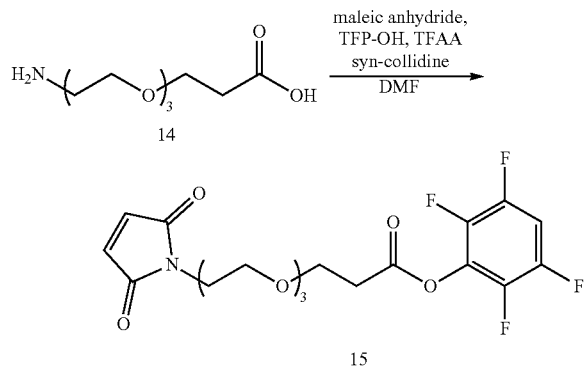

In a dried 50 ml conical flask, 3-(2-(2-(2-aminoethoxy)ethoxy)ethoxy)propanoic acid (Compound 14, 1.000 g, 4.52 mmol) and maleic anhydride (0.443 g, 4.52 mmol) were dissolved in anhydrous N,N-dimethylformamide (5 mL). The reaction was stirred at room temperature for 6 hr under $N_2$, at which point it was cooled to 0° C. and syn-collidine (1.263 mL, 2.1 eq) was added dropwise. In a separate dried 50 mL conical flask, tetrafluorophenol (3.002 g, 4 eq) was dissolved in anhydrous N,N-dimethylformamide (10 mL). The flask was cooled to 0° C. in an ice bath and trifluoroacetic anhydride (2.548 mL, 4 eq) was added dropwise. This flask was stirred for 15 minutes, at which point syn-collidine (2.407 mL, 4 eq) was added dropwise. The flask was allowed to stir for another 15 minutes, and then the contents were added to the first flask dropwise, via syringe. The reaction was allowed to warm to room temperature and stirring was continued under $N_2$. The reaction was monitored by HPLC-MS for the consumption of starting materials. After 6 days, the reaction was complete with the total consumption of Compound 14, leaving only Compound 15 and a small amount (~5%) of the bis-TFP maleic amide intermediate. The reaction was transferred to a separating funnel, diluted with diethyl ether (75 ml) and washed with 5% LiCl (1×20 mL), 1 M HCl (2×20 mL), sat. $NaHCO_3$ (5×20 mL) and brine (1×20 mL). The organic layer was dried over $Na_2SO_4$, filtered and evaporated to give brown crude oil with residual DMF. Crude oil was dissolved in 8 mL of 1:1 DMF:$H_2O$+0.1% TFA, loaded onto a 60 g Biotage® SNAP Ultra C18 column (Biotage AB, Uppsala, Sweden) and purified under a linear 30-100% gradient of ACN/$H_2O$+0.1% TFA over 8 column volumes. Pure fractions were pooled and diluted with brine (20 mL), then extracted 3×50 mL $Et_2O$. Pooled organics were dried over $MgSO_4$, filtered and evaporated to recover a light-yellow oil (1.34 g, 66% yield).

J. Tert-butyl ((S)-1-(((S)-1-((4-(N-((2R,3R)-3-((S)-1-((3R,4S,5S)-4-((S)-2-((S)-2-(dimethylamino)-3-methylbutanamido)-N,3-dimethylbutanamido)-3-methoxy-5-methylheptanoyl)pyrrolidin-2-yl)-3-methoxy-2-methylpropanoyl)sulfamoyl)phenyl)amino)-1-oxo-5-ureidopentan-2-yl)amino)-3-methyl-1-oxobutan-2-yl)carbamate (Compound 12)

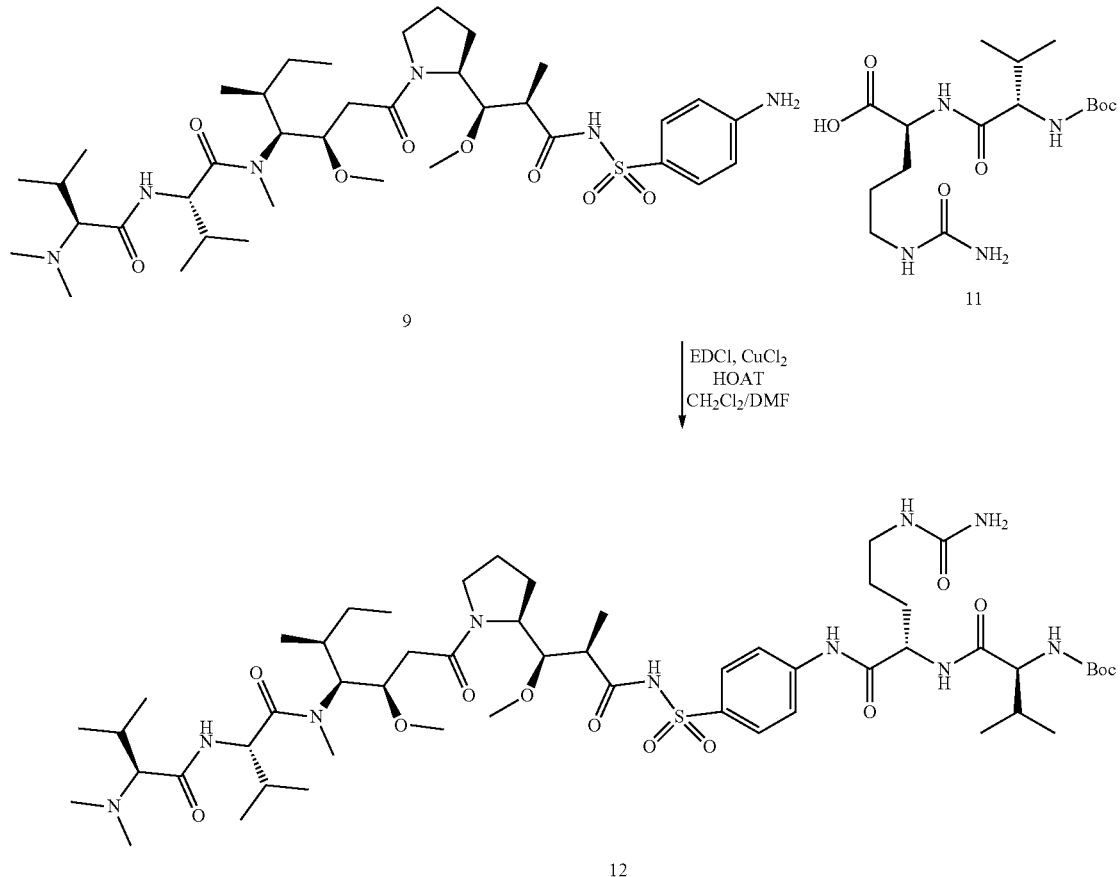 [SMILES: CC[C@H](C)[C@@H]([C@@H](CC(=O)N1CCC[C@H]1[C@H](OC)[C@@H](C)C(=O)NS(=O)(=O)c1ccc(N)cc1)OC)N(C)C(=O)[C@@H](NC(=O)[C@H](C(C)C)N(C)C)C(C)C ; CC(C)[C@H](NC(=O)OC(C)(C)C)C(=O)N[C@@H](CCCNC(N)=O)C(=O)O ; CC[C@H](C)[C@@H]([C@@H](CC(=O)N1CCC[C@H]1[C@H](OC)[C@@H](C)C(=O)NS(=O)(=O)c1ccc(NC(=O)[C@H](CCCNC(N)=O)NC(=O)[C@@H](NC(=O)OC(C)(C)C)C(C)C)cc1)OC)N(C)C(=O)[C@@H](NC(=O)[C@H](C(C)C)N(C)C)C(C)C]

Compound 11 was prepared as described in International Patent Application Publication No. WO 2016/041082.

To an empty 25 mL pear shaped flask, was added Compound 11 (1.342 g, 3.58 mmol, 3.0 equiv), 1-ethyl-3-(3-dimethylaminopropyl)carbodiimide hydrochloride (0.664 g, 3.46 mmol, 2.9 equiv) and 7-hydroxy-azabenzotriazole (HOAT) (0.472 g, 3.46 mmol, 2.9 equiv). These solids were dissolved in a mixture of N,N-dimethylformamide (0.5 mL) and dichloromethane (4.5 mL) with stirring at room temperature over 30 minutes. Separately, Compound 9 (0.900 g, 1.20 mmol) was dissolved in a mixture of N,N-dimethylformamide (0.2 mL) and dichloromethane (1.8 mL) and added to the pear shaped flask, rinsing with dichloromethane (1.0 mL). Stirring rate was increased to 1000 rpm, producing a vortex. Within 2 minutes of adding Compound 9, copper (II) chloride (0.514 g, 3.83 mmol, 3.2 equiv) was added in one portion directly into the center of the vortex through a narrow powder funnel. The initially light-yellow solution turned to a dark-brown suspension which changed over 10 minutes to a dark-green suspension. The reaction was monitored for completion by HPLC-MS and no change to reaction progress was observed between the samples taken at 30 minutes and 1h (~95% complete). The reaction was allowed to stir overnight at room temperature, then 2-(2-aminoethylamino) ethanol (0.483 mL, 4.781 mmol, 4 equiv), EtOAc (10 mL) and $dH_2O$ (5 mL) were added to the stirred suspension, which underwent a colour change to deep blue. The suspension was stirred vigorously for 4 hr as the suspended solids gradually dissolved into the biphasic mixture. This mixture was transferred to a separating funnel and diluted with EtOAc (100 mL) and brine (10 mL), and the aqueous layer was extracted 10% IpOH/EtOAc (4×50 mL). The organic layers were pooled and washed with brine (10 mL), dried over $Na_2SO_4$, and evaporated to yield a faintly blue crude solid. This crude solid was dissolved in a mixture of methanol (0.5 mL) and dichloromethane (6 mL) and purified on a Biotage® SNAP Ultra 100 g silica gel column (2-20% MeOH in $CH_2Cl_2$ over 10 column volumes, followed by an 8-column volume plateau at 20% MeOH). The product eluted as a broad peak after 1-2 column volumes at ~20% MeOH in $CH_2Cl_2$. Fractions containing the desired material were pooled and concentrated under reduced pressure to give the title compound as a white solid (1.105 g, 83%). MS m/z obs. =555.9 ((M+2)/2), 1109.8 (M+1).

K. (S)-2-((S)-2-amino-3-methylbutanamido)-N-(4-(N-((2R,3R)-3-((S)-1-((3R,4S,5R)-4-((S)-2-((S)-2-(dimethylamino)-3-methylbutanamido)-N,3-dimethylbutanamido)-3-methoxy-5-methylheptanoyl)pyrrolidin-2-yl)-3-methoxy-2-methylpropanoyl)sulfamoyl)phenyl)-5-ureidopentanamide (Compound 13)

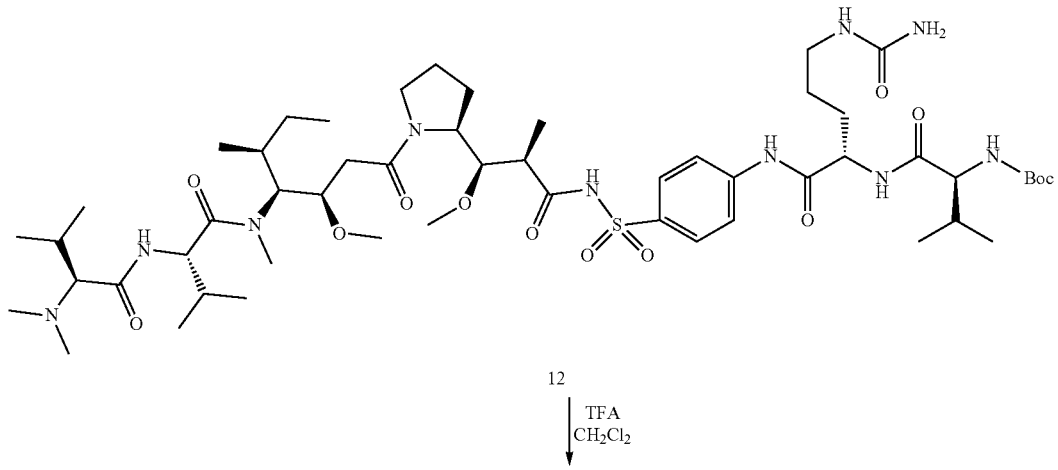

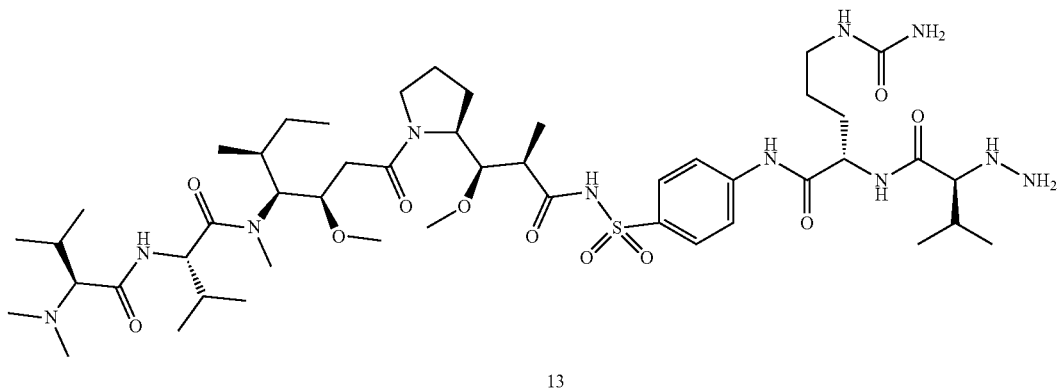

To a solution of Compound 12 (0.926 g, 0.834 mmol) was added a mixture of dichloromethane (10 mL) and trifluoroacetic acid (2.0 mL). The reaction was monitored by HPLC-MS for consumption of starting material (~45 minutes). The reaction was co-evaporated with acetonitrile (2×10 mL) and dichloromethane (2×10 mL) under reduced pressure to remove excess trifluoroacetic acid. The resulting residue was dissolved in a minimal amount of dichloromethane and methanol (3:1, v/v, ~2 mL), and added to a stirred solution of diethyl ether (200 mL) and hexanes (100 mL) dropwise via pipette, producing a suspension of light white solids. The solids were filtered and dried under vacuum to afford the title compound in the form of a white powder, as the trifluoroacetate salt (1.04 g, quantitative yield with some residual solvents). MS m/z obs. =505.8 ((M+2)/2).

L. (S)—N-(4-(N-((2R,3R)-3-((S)-1-((3R,4S,5R)-4-((S)-2-((S)-2-(dimethylamino)-3-methylbutanamido)-N,3-dimethylbutanamido)-3-methoxy-5-methylheptanoyl)pyrrolidin-2-yl)-3-methoxy-2-methylpropanoyl)sulfamoyl)phenyl)-2-((S)-1-(2,5-dioxo-2,5-dihydro-1H-pyrrol-1-yl)-14-isopropyl-12-oxo-3,6,9-trioxa-13-azapentadecanamido)-5-ureidopentanamide (Linker-Toxin 001)

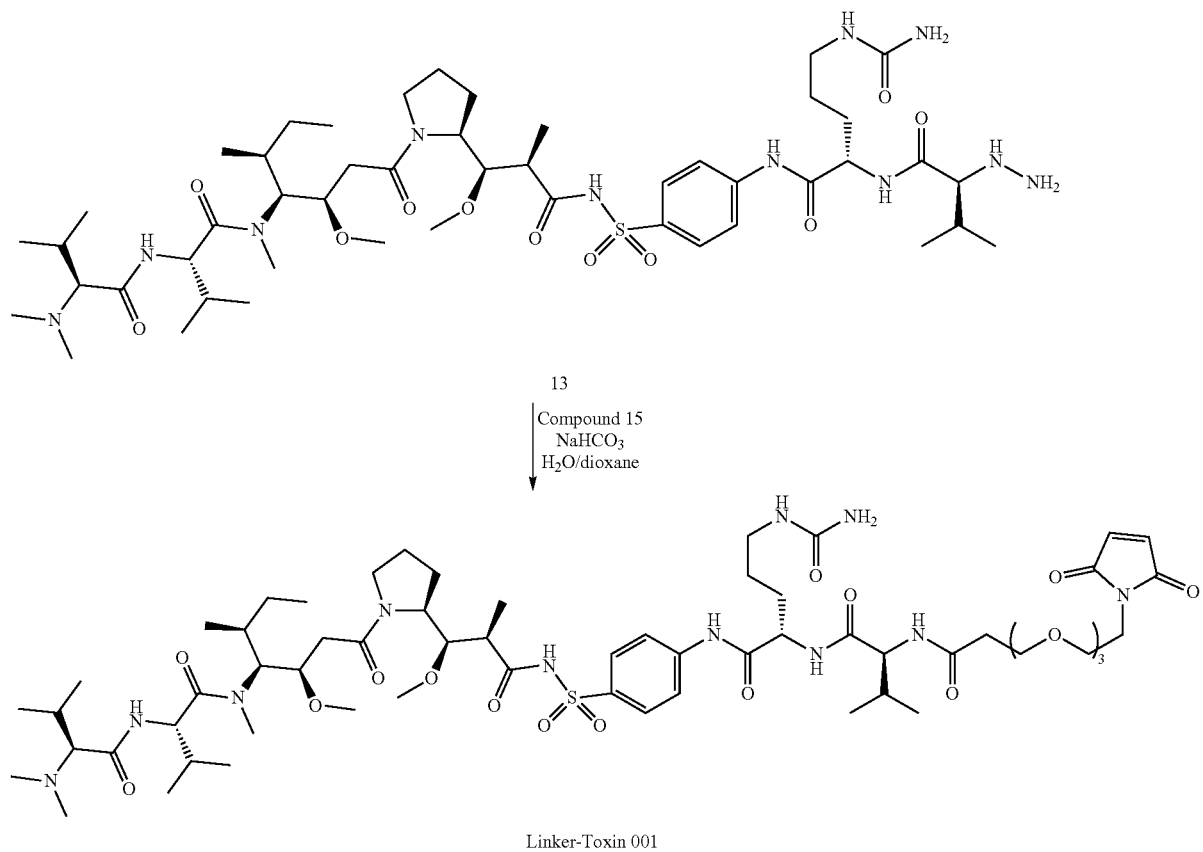

To a stirred solution of Compound 13 (0.722 g, 0.584 mmol) in N,N-dimethylformamide (4 mL) was added Compound 15 (0.314 g, 1.2 equiv) and diisopropylethylamine (0.305 mL, 3.0 equiv). HPLC-MS analysis at 2h indicated no remaining starting material. The reaction was acidified with TFA (300 μL) and then diluted with di$H_2O$+0.1% TFA (9 mL). The resultant solution was loaded onto a 120 g Biotage® SNAP Ultra C18 column (Biotage, Uppsala, Sweden) and purified under an ACN/$H_2O$+0.1% TFA gradient: 20-60% ACN over 10 column volumes, 60-100% ACN over 5 column volumes. Product eluted near 40% ACN. Pure fractions as identified by LCMS were pooled and lyophilized. A white powder solid was recovered from the lyophilizer. The lyophilization was repeated at higher concentration (approx. 50 mg/mL in 2:1 $H_2O$/ACN) into a vial to produce a denser, less flocculant lyophilized solid (754.2 mg, 91%). MS m/z obs. =647.4 ((M+2)/2), 1292.8 (M+1).

Example 4: Preparation of v10000 conjugated to Linker-Toxin 001

A solution (138.9 mL) of the antibody v10000 (2.0 g) in 10 mM sodium acetate, 9% (w/v) sucrose, pH 4.5 was pH-adjusted by addition of 200 mM $Na_2HPO_4$, pH 8.9 (15.4 mL). After addition of a DTPA solution (44 mL in PBS, pH 7.4, final concentration 1.0 mM), reduction of the interchain disulfides was initiated by addition of an aqueous 10 mM TCEP solution (1.68 mL, 1.05 eq.). After 90 minutes at 37° C., the reaction was cooled on ice before addition of an excess of Linker-Toxin 001 (4.81 mL; 6 eq) from a 20 mM DMSO stock solution. The conjugation reaction was quenched after 90 minutes by addition of an excess of a 20 mM N-acetyl cysteine solution (4.81 mL; 6 eq.).

The quenched antibody drug conjugate (ADC) solution was purified with 9-15 diavolumes of 10 mM sodium acetate, 9% (w/v) sucrose, pH 4.5 on a Millipore Labscale™ Tangential Flow Filtration instrument using a Pellicon® XL Ultrafiltration Module (Ultracel® 30 kDa 0.005m$^2$; Millipore Sigma). The eluted ADC was sterile filtered (0.22 μm). ADCs produced on small scale were purified over 40 KDa MWCO Zeba™ columns (ThermoFisher Scientific, Waltham, MA) preconditioned with either PBS or 10 mM sodium acetate, 9% (w/v) sucrose, pH 4.5.

Following purification, the concentration of the ADC was determined by a BCA assay with reference to a standard curve generated from v10000. Alternatively, concentrations were estimated by measurement of absorption at 280 nm (8=195065 M-1 cm-1).

Samples of the ADCs were assessed by non-reducing and reducing SDS-PAGE. No extraneous bands were observed.

Antibody and ADC were analyzed by hydrophobic interaction chromatography (HIC) to estimate the drug-to-antibody ratio (DAR). Chromatography was on a Proteomix® HIC Ethyl column (7.8×50 mm, 5 µm) (Sepax Technologies Inc., Newark, DE) employing a gradient of 80% MPA/20% MPB to 35% MPA/65% MPB over a period of 13.5 minutes at a flow rate of 1 mL/min (MPA=1.5 M $(NH_4)_2SO_4$, 25 mM $NaxPO_4$, and MPB=75% 25 mM $NaxPO_4$, 25% isopropanol).

The average drug to antibody ratio (DAR) of an ADC can vary depending on the number of disulphide bonds liberated during the reduction of the antibody. A single conjugation reaction that yields an ADC with a particular average DAR comprises a mixture of species. For v10000 conjugated to Linker-Toxin 001, a mixture of four species was generated: unconjugated antibody, ADC with a DAR of 2, ADC with a DAR of 4 and ADC with a DAR of 6.

The results of the HIC indicated that the ADC comprising v10000 conjugated to Linker-Toxin 001 had an average DAR of 2.07. The individual contributions of the DAR0, DAR2, DAR4 and DAR6 species to the average DAR of the purified ADC were assessed by the integration of the HPLC-HIC chromatogram. Each peak in the HIC chromatogram was isolated by preparative chromatography and the identity of the peak was verified by LC-MS. The % content of individual DAR species for each variant (as determined by HIC) is shown in Table G.

TABLE G

DAR Distribution for ADC Comprising v10000 and Linker-Toxin 001

| DAR | Area % |
| --- | --- |
| 0 | 23 |
| 2 | 56 |
| 4 | 17 |
| 6 | 4 |

The invention claimed is:

1. A method of treating a subject with HER2-positive biliary tract cancer (BTC), comprising administering an effective amount of a bispecific anti-HER2 antigen-binding construct comprising a heavy chain H1 comprising the amino acid sequence set forth in SEQ ID NO:36, a heavy chain H2 comprising the amino acid sequence set forth in SEQ ID NO:63, and a light chain L1 comprising the amino acid sequence set forth in SEQ ID NO:24 to the subject.

2. The method according to claim 1, wherein the BTC is unresectable or metastatic.

3. The method according to claim 1, wherein the BTC is HER2 3+, HER2 2+, or HER2 1+ as measured by immunohistochemistry (IHC), wherein according to HER2 protein staining as measured by IHC:
   i) HER2 1+ has an incomplete and faint/barely perceptible membrane staining in more than 10% of the tumor cells;
   ii) HER2 2+ has a weak to moderate complete membrane staining in more than 10% of tumor cells; and
   iii) HER2 3+ has a more than moderate complete membrane staining to strong complete membrane staining in more than 10% of tumor cells.

4. The method according to claim 3, wherein the BTC is HER2 3+, HER2 2+, or HER2 1+ as measured by immunohistochemistry (IHC), with HER2 gene amplification as measured by the levels of HER2-encoding nucleic acid in the tumor cells.

5. The method according to claim 3, wherein the BTC is HER2 3+, HER2 2+, or HER2 1+ as measured by immunohistochemistry (IHC), without HER2 gene amplification as measured by the levels of HER2-encoding nucleic acid in the tumor cells.

6. The method according to claim 1, wherein the BTC is gall bladder cancer, ampullary carcinoma, cholangiocarcinoma (CCA), or cystic duct adenocarcinoma.

7. The method according to claim 6, wherein the BTC is cholangiocarcinoma (CCA).

8. The method according to claim 7, wherein the CCA is intrahepatic CCA.

9. The method according to claim 7, wherein the CCA is extrahepatic CCA.

10. The method according to claim 1, wherein the bispecific anti-HER2 antigen-binding construct is administered to the subject at 10 mg/kg per week.

11. The method according to claim 1, wherein the bispecific anti-HER2 antigen-binding construct is administered to the subject at 20 mg/kg once every two weeks.

12. The method according to claim 1, wherein the bispecific anti-HER2 antigen-binding construct is administered to the subject at 30 mg/kg once every three weeks.

13. The method according to claim 1, wherein administering the bispecific anti-HER2 antigen-binding construct to the subject results in a complete response (CR), partial response (PR) or stable disease (SD) in the subject.

14. The method according to claim 1, wherein the disease control rate in a group of subjects treated with the bispecific anti-HER2 antigen-binding construct is greater than 60%, 70%, or 80%.

15. The method according to claim 1, wherein the overall response rate in a group of subjects treated with the bispecific anti-HER2 antigen-binding construct is greater than 50%, 60%, 70%, or 80%.

16. The method according to claim 1, wherein the bispecific anti-HER2 antigen-binding construct is administered following at least one, two, or three first-line therapies.

17. The method according to claim 16, wherein the bispecific anti-HER2 antigen-binding construct is administered following a first-line therapy comprising systemic chemotherapy, fluoropyrimidine-based chemoradiation, radiotherapy without additional chemotherapy, antibody therapy, or combinations thereof.

18. The method according to claim 17, wherein the systemic chemotherapy comprises gemcitabine alone or in combination with a platinum-based chemotherapeutic agent.

19. The method according to claim 18, wherein the platinum-based chemotherapeutic agent comprises cisplatin or oxaliplatin.

20. The method according to claim 17, wherein the antibody therapy comprises an anti-PD1 antibody or an anti-PD-L1 antibody.

21. The method according to claim 1, wherein the bispecific anti-HER2 antigen-binding construct is administered as a first-line monotherapy.

22. The method according to claim 1, wherein the bispecific anti-HER2 antigen-binding construct is administered as an adjuvant therapy or a neoadjuvant therapy.

23. The method according to claim 1, wherein the bispecific anti-HER2 antigen-binding construct is administered in conjunction with one or more chemotherapeutic agents.

24. The method according to claim 23, wherein the one or more chemotherapeutic agents comprises gemcitabine, cisplatin, or combination thereof.

25. The method of claim 1, wherein the BTC is resectable or partially resectable.

26. The method of claim 1, wherein the BTC is metastatic or locally advanced.

* * * * *

SEQUENCE LISTING

```
<160> NUMBER OF SEQ ID NOS: 72

<210> SEQ ID NO 1
<211> LENGTH: 607
<212> TYPE: PRT
<213> ORGANISM: Artificial Sequence
<220> FEATURE:
<223> OTHER INFORMATION: HER2

<400> SEQUENCE: 1

Thr Gln Val Cys Thr Gly Thr Asp Met Lys Leu Arg Leu Pro Ala Ser
1               5                   10                  15

Pro Glu Thr His Leu Asp Met Leu Arg His Leu Tyr Gln Gly Cys Gln
            20                  25                  30

Val Val Gln Gly Asn Leu Glu Leu Thr Tyr Leu Pro Thr Asn Ala Ser
        35                  40                  45

Leu Ser Phe Leu Gln Asp Ile Gln Glu Val Gln Gly Tyr Val Leu Ile
    50                  55                  60

Ala His Asn Gln Val Arg Gln Val Pro Leu Gln Arg Leu Arg Ile Val
65                  70                  75                  80

Arg Gly Thr Gln Leu Phe Glu Asp Asn Tyr Ala Leu Ala Val Leu Asp
                85                  90                  95

Asn Gly Asp Pro Leu Asn Asn Thr Thr Pro Val Thr Gly Ala Ser Pro
            100                 105                 110

Gly Gly Leu Arg Glu Leu Gln Leu Arg Ser Leu Thr Glu Ile Leu Lys
        115                 120                 125

Gly Gly Val Leu Ile Gln Arg Asn Pro Gln Leu Cys Tyr Gln Asp Thr
    130                 135                 140

Ile Leu Trp Lys Asp Ile Phe His Lys Asn Asn Gln Leu Ala Leu Thr
145                 150                 155                 160

Leu Ile Asp Thr Asn Arg Ser Arg Ala Cys His Pro Cys Ser Pro Met
                165                 170                 175

Cys Lys Gly Ser Arg Cys Trp Gly Glu Ser Ser Glu Asp Cys Gln Ser
            180                 185                 190

Leu Thr Arg Thr Val Cys Ala Gly Gly Cys Ala Arg Cys Lys Gly Pro
        195                 200                 205
```

```
Leu Pro Thr Asp Cys Cys His Glu Gln Cys Ala Ala Gly Cys Thr Gly
    210                 215                 220

Pro Lys His Ser Asp Cys Leu Ala Cys Leu His Phe Asn His Ser Gly
225                 230                 235                 240

Ile Cys Glu Leu His Cys Pro Ala Leu Val Thr Tyr Asn Thr Asp Thr
                245                 250                 255

Phe Glu Ser Met Pro Asn Pro Glu Gly Arg Tyr Thr Phe Gly Ala Ser
            260                 265                 270

Cys Val Thr Ala Cys Pro Tyr Asn Tyr Leu Ser Thr Asp Val Gly Ser
        275                 280                 285

Cys Thr Leu Val Cys Pro Leu His Asn Gln Glu Val Thr Ala Glu Asp
    290                 295                 300

Gly Thr Gln Arg Cys Glu Lys Cys Ser Lys Pro Cys Ala Arg Val Cys
305                 310                 315                 320

Tyr Gly Leu Gly Met Glu His Leu Arg Glu Val Arg Ala Val Thr Ser
                325                 330                 335

Ala Asn Ile Gln Glu Phe Ala Gly Cys Lys Lys Ile Phe Gly Ser Leu
            340                 345                 350

Ala Phe Leu Pro Glu Ser Phe Asp Gly Asp Pro Ala Ser Asn Thr Ala
        355                 360                 365

Pro Leu Gln Pro Glu Gln Leu Gln Val Phe Glu Thr Leu Glu Glu Ile
    370                 375                 380

Thr Gly Tyr Leu Tyr Ile Ser Ala Trp Pro Asp Ser Leu Pro Asp Leu
385                 390                 395                 400

Ser Val Phe Gln Asn Leu Gln Val Ile Arg Gly Arg Ile Leu His Asn
                405                 410                 415

Gly Ala Tyr Ser Leu Thr Leu Gln Gly Leu Gly Ile Ser Trp Leu Gly
            420                 425                 430

Leu Arg Ser Leu Arg Glu Leu Gly Ser Gly Leu Ala Leu Ile His His
        435                 440                 445

Asn Thr His Leu Cys Phe Val His Thr Val Pro Trp Asp Gln Leu Phe
    450                 455                 460

Arg Asn Pro His Gln Ala Leu Leu His Thr Ala Asn Arg Pro Glu Asp
465                 470                 475                 480

Glu Cys Val Gly Glu Gly Leu Ala Cys His Gln Leu Cys Ala Arg Gly
                485                 490                 495

His Cys Trp Gly Pro Gly Pro Thr Gln Cys Val Asn Cys Ser Gln Phe
            500                 505                 510

Leu Arg Gly Gln Glu Cys Val Glu Glu Cys Arg Val Leu Gln Gly Leu
        515                 520                 525

Pro Arg Glu Tyr Val Asn Ala Arg His Cys Leu Pro Cys His Pro Glu
    530                 535                 540

Cys Gln Pro Gln Asn Gly Ser Val Thr Cys Phe Gly Pro Glu Ala Asp
545                 550                 555                 560

Gln Cys Val Ala Cys Ala His Tyr Lys Asp Pro Pro Phe Cys Val Ala
                565                 570                 575

Arg Cys Pro Ser Gly Val Lys Pro Asp Leu Ser Tyr Met Pro Ile Trp
            580                 585                 590

Lys Phe Pro Asp Glu Glu Gly Ala Cys Gln Pro Cys Pro Ile Asn
        595                 600                 605

<210> SEQ ID NO 2
<211> LENGTH: 217
<212> TYPE: PRT
```

```
<213> ORGANISM: Artificial Sequence
<220> FEATURE:
<223> OTHER INFORMATION: Human IgG1 Fc

<400> SEQUENCE: 2

Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr
        35                  40                  45

Val Asp Gly Val Glu Val His Asn Ala Lys Thr Lys Pro Arg Glu Glu
    50                  55                  60

Gln Tyr Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Ala Lys Gly Gln
            100                 105                 110

Pro Arg Glu Pro Gln Val Tyr Thr Leu Pro Pro Ser Arg Asp Glu Leu
        115                 120                 125

Thr Lys Asn Gln Val Ser Leu Thr Cys Leu Val Lys Gly Phe Tyr Pro
    130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Lys Leu Thr Val Asp Lys Ser Arg Trp Gln Gln Gly Asn Val
            180                 185                 190

Phe Ser Cys Ser Val Met His Glu Ala Leu His Asn His Tyr Thr Gln
        195                 200                 205

Lys Ser Leu Ser Leu Ser Pro Gly Lys
    210                 215

<210> SEQ ID NO 3
<211> LENGTH: 448
<212> TYPE: PRT
<213> ORGANISM: Artificial Sequence
<220> FEATURE:
<223> OTHER INFORMATION: H2 clone 3468 Full

<400> SEQUENCE: 3

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
        35                  40                  45

Ala Asp Val Asn Pro Asn Ser Gly Gly Ser Ile Tyr Asn Gln Arg Phe
    50                  55                  60

Lys Gly Arg Phe Thr Leu Ser Val Asp Arg Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Gly Pro Ser Phe Tyr Phe Asp Tyr Trp Gly Gln Gly
            100                 105                 110
```

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
130                 135                 140

Gly Cys Leu Val Lys Gly Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Lys Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys Asp Lys
210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Val
            340                 345                 350

Leu Pro Pro Ser Arg Asp Glu Leu Thr Lys Asn Gln Val Ser Leu Leu
        355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Leu Thr Trp Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

<210> SEQ ID NO 4
<211> LENGTH: 1344
<212> TYPE: DNA
<213> ORGANISM: Artificial Sequence
<220> FEATURE:
<223> OTHER INFORMATION: H2 clone 3468 Full

<400> SEQUENCE: 4
gaagtgcagc tggtcgaatc tggaggagga ctggtgcagc caggagggtc cctgcgcctg     60
tcttgcgccg ctagtggctt cactttacc gactacacca tggattgggt gcgacaggca    120
cctggaaagg gcctggagtg ggtcgccgat gtgaacccaa atagcggagg ctccatctac    180

```
aaccagcggt tcaagggccg gttcaccctg tcagtggacc ggagcaaaaa cacccctgtat    240 ctgcagatga atagcctgcg agccgaagat actgctgtgt actattgcgc ccggaatctg    300
gggccctcct tctactttga ctattggggg cagggaactc tggtcaccgt gagctccgcc    360
tccaccaagg gaccttctgt gttcccactg gctccctcta gtaaatccac atctggggga    420
actgcagccc tgggctgtct ggtgaagggc tacttcccag agcccgtcac agtgtcttgg    480
aacagtggcg ctctgacttc tggggtccac acctttcctg cagtgctgaa gtcaagcggg    540
ctgtacagcc tgtcctctgt ggtcaccgtg ccaagttcaa gcctgggaac acagacttat    600
atctgcaacg tgaatcacaa gccatccaat acaaaagtcg acaagaaagt ggaacccaag    660
tcttgtgata aacccatac atgccccct tgtcctgcac cagagctgct gggaggacca     720
agcgtgttcc tgtttccacc caagcctaaa gatacactga tgattagtag gaccccagaa    780
gtcacatgcg tggtcgtgga cgtgagccac gaggaccccg aagtcaagtt taactggtac    840
gtggacggcg tcgaggtgca taatgccaag actaaaccca gggaggaaca gtacaacagt    900
acctatcgcg tcgtgtcagt cctgacagtg ctgcatcagg attggctgaa cgggaaagag    960
tataagtgca aagtgagcaa taaggctctg cccgcaccta tcgagaaaac aatttccaag   1020 gcaaaggac agcctagaga accacaggtg tacgtgctgc ctccatcaag ggatgagctg    1080
acaaagaacc aggtcagcct gctgtgtctg gtgaaaggat tctatccctc tgacattgct   1140
gtggagtggg aaagtaatgg ccagcctgag aacaattacc tgacctggcc ccctgtgctg   1200
gactcagatg gcagcttctt tctgtatagc aagctgaccg tcgacaaatc ccggtggcag   1260
caggggaatg tgtttagttg ttcagtcatg cacgaggcac tgcacaacca ttacacccag   1320
aagtcactgt cactgtcacc aggg                                          1344
```

<210> SEQ ID NO 5
<211> LENGTH: 119
<212> TYPE: PRT
<213> ORGANISM: Artificial Sequence
<220> FEATURE:
<223> OTHER INFORMATION: H2 clone 3468 VH

<400> SEQUENCE: 5

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
        35                  40                  45

Ala Asp Val Asn Pro Asn Ser Gly Gly Ser Ile Tyr Asn Gln Arg Phe
    50                  55                  60

Lys Gly Arg Phe Thr Leu Ser Val Asp Arg Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Gly Pro Ser Phe Tyr Phe Asp Tyr Trp Gly Gln Gly
            100                 105                 110

Thr Leu Val Thr Val Ser Ser
        115
```

<210> SEQ ID NO 6
<211> LENGTH: 8
<212> TYPE: PRT
<213> ORGANISM: Artificial Sequence

```
<220> FEATURE:
<223> OTHER INFORMATION: H1 clone 3057,3317 CDRH1, H2 clone 3468,3041
      CDRH1

<400> SEQUENCE: 6

Gly Phe Thr Phe Thr Asp Tyr Thr
1               5

<210> SEQ ID NO 7
<211> LENGTH: 12
<212> TYPE: PRT
<213> ORGANISM: Artificial Sequence
<220> FEATURE:
<223> OTHER INFORMATION: H1 clone 3057,3317 CDRH3, H2 clone 3468,3041
      CDRH3

<400> SEQUENCE: 7

Ala Arg Asn Leu Gly Pro Ser Phe Tyr Phe Asp Tyr
1               5                   10

<210> SEQ ID NO 8
<211> LENGTH: 8
<212> TYPE: PRT
<213> ORGANISM: Artificial Sequence
<220> FEATURE:
<223> OTHER INFORMATION: H1 clone 3057,3317 CDRH2, H2 clone 3468,3041
      CDRH2

<400> SEQUENCE: 8

Val Asn Pro Asn Ser Gly Gly Ser
1               5

<210> SEQ ID NO 9
<211> LENGTH: 214
<212> TYPE: PRT
<213> ORGANISM: Artificial Sequence
<220> FEATURE:
<223> OTHER INFORMATION: L2 clone 1811 Full

<400> SEQUENCE: 9

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ile Tyr Pro Tyr
                85                  90                  95

Thr Phe Gly Gln Gly Thr Lys Val Glu Ile Lys Arg Thr Val Ala Ala
                100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175
```

-continued

```
Ser Thr Leu Thr Leu Ser Lys Ala Asp Tyr Glu Lys His Lys Val Tyr
        180                 185                 190

Ala Cys Glu Val Thr His Gln Gly Leu Ser Ser Pro Val Thr Lys Ser
            195                 200                 205

Phe Asn Arg Gly Glu Cys
    210

<210> SEQ ID NO 10
<211> LENGTH: 642
<212> TYPE: DNA
<213> ORGANISM: Artificial Sequence
<220> FEATURE:
<223> OTHER INFORMATION: L2 clone 1811 Full

<400> SEQUENCE: 10
gatattcaga tgacccagtc cccaagctcc ctgagtgcct cagtgggcga ccgagtcacc      60
atcacatgca aggcttccca ggatgtgtct attggagtcg catggtacca gcagaagcca     120
ggcaaagcac ccaagctgct gatctatagc gcctcctacc ggtataccgg cgtgccctct     180
agattctctg gcagtgggtc aggaacagac tttactctga ccatctctag tctgcagcct     240
gaggatttcg ctacctacta ttgccagcag tactatatct acccatatac ctttggccag     300
gggacaaaag tggagatcaa gaggactgtg gccgctccct ccgtcttcat tttccccct      360 tctgacgaac agctgaaaag tggcacagcc agcgtggtct gtctgctgaa caatttctac     420
cctcgcgaag ccaaagtgca gtggaaggtc gataacgctc tgcagagcgg caacagccag     480
gagtctgtga ctaacagga cagtaaagat tcaacctata gcctgtcaag cacactgact      540
ctgagcaagg cagactacga gaagcacaaa gtgtatgcct gcgaagtcac acatcagggg     600
ctgtcctctc ctgtgactaa gagctttaac agaggagagt gt                       642

<210> SEQ ID NO 11
<211> LENGTH: 107
<212> TYPE: PRT
<213> ORGANISM: Artificial Sequence
<220> FEATURE:
<223> OTHER INFORMATION: L2 clone 1811 VL

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Tyr Pro Tyr
                85                  90                  95

Thr Phe Gly Gln Gly Thr Lys Val Glu Ile Lys
            100                 105

<210> SEQ ID NO 12
<211> LENGTH: 6
<212> TYPE: PRT
<213> ORGANISM: Artificial sequence
<220> FEATURE:
```

```
<223> OTHER INFORMATION: L2 clones 1811, 3904 CDRL1 and H1 clone 3317
      CDRL1

<400> SEQUENCE: 12

Gln Asp Val Ser Ile Gly
1               5

<210> SEQ ID NO 13
<211> LENGTH: 9
<212> TYPE: PRT
<213> ORGANISM: Artificial Sequence
<220> FEATURE:
<223> OTHER INFORMATION: L3 clones 1811, 3904 CDRL3 and H1 clone 3317
      CDRL3

<400> SEQUENCE: 13

Gln Gln Tyr Tyr Ile Tyr Pro Tyr Thr
1               5

<210> SEQ ID NO 14
<211> LENGTH: 3
<212> TYPE: PRT
<213> ORGANISM: Artificial Sequence
<220> FEATURE:
<223> OTHER INFORMATION: L2 clones 1811, 3904 CDRL2 and H1 clone 3317
      CDRL2

<400> SEQUENCE: 14

Ser Ala Ser
1

<210> SEQ ID NO 15
<211> LENGTH: 222
<212> TYPE: PRT
<213> ORGANISM: Artificial Sequence
<220> FEATURE:
<223> OTHER INFORMATION: L1 clone 5034 Full

<400> SEQUENCE: 15

Asp Tyr Lys Asp Asp Asp Lys Asp Ile Gln Met Thr Gln Ser Pro
1               5                   10                  15

Ser Ser Leu Ser Ala Ser Val Gly Asp Arg Val Thr Ile Thr Cys Arg
                20                  25                  30

Ala Ser Gln Asp Val Asn Thr Ala Val Ala Trp Tyr Gln Gln Lys Pro
            35                  40                  45

Gly Lys Ala Pro Lys Leu Leu Ile Tyr Ser Ala Ser Phe Leu Tyr Ser
        50                  55                  60

Gly Val Pro Ser Arg Phe Ser Gly Ser Arg Ser Gly Thr Asp Phe Thr
65                  70                  75                  80

Leu Thr Ile Ser Ser Leu Gln Pro Glu Asp Phe Ala Thr Tyr Tyr Cys
                85                  90                  95

Gln Gln His Tyr Thr Thr Pro Pro Thr Phe Gly Gln Gly Thr Lys Val
            100                 105                 110

Glu Ile Lys Arg Thr Val Ala Ala Pro Ser Val Phe Ile Phe Pro Pro
        115                 120                 125

Ser Asp Glu Arg Leu Lys Ser Gly Thr Ala Ser Val Val Cys Leu Leu
    130                 135                 140

Asn Asn Phe Tyr Pro Arg Glu Ala Lys Val Gln Trp Lys Val Asp Asn
145                 150                 155                 160

Ala Leu Gln Ser Gly Asn Ser Gln Glu Ser Val Thr Glu Gln Asp Ser
                165                 170                 175
```

```
Lys Asp Ser Thr Tyr Ser Leu Ser Ser Thr Leu Thr Leu Ser Lys Ala
            180                 185                 190

Asp Tyr Glu Lys His Lys Val Tyr Ala Cys Glu Val Thr His Gln Gly
        195                 200                 205

Leu Ser Ser Pro Val Thr Lys Ser Phe Asn Arg Gly Glu Cys
    210                 215                 220

<210> SEQ ID NO 16
<211> LENGTH: 666
<212> TYPE: DNA
<213> ORGANISM: Artificial Sequence
<220> FEATURE:
<223> OTHER INFORMATION: L1 clone 5034 Full

<400> SEQUENCE: 16
gactacaaag acgacgatga caaagatatc cagatgaccc agtcccctag ctccctgtcc    60
gcttctgtgg gcgatagggt cactattacc tgccgcgcat ctcaggacgt gaacaccgca   120
gtcgcctggt accagcagaa gcctgggaaa gctccaaagc tgctgatcta cagtgcatca   180
ttcctgtatt caggagtgcc cagccggttt agcggcagca gatctggcac cgatttcaca   240
ctgactattt ctagtctgca gcctgaggac tttgccacat actattgcca gcagcactat   300
accacacccc ctactttcgg ccaggggacc aaagtggaga tcaagcgaac tgtggccgct   360
ccaagtgtct tcattttccc acccagcgat gaaagactga gtccggcac agcttctgtg   420 gtctgtctgc tgaacaattt ttaccccaga gaggccaaag tgcagtggaa ggtcgacaac   480
gctctgcaga gtggcaacag ccaggagagc gtgacagaac aggattccaa agactctact   540
tatagtctgt caagcaccct gacactgagc aaggcagact acgaaaagca taagtgtat   600 gcctgtgagg tcacacatca ggggctgtca tcaccagtca ccaaatcatt caatcggggg   660
gagtgc                                                             666

<210> SEQ ID NO 17
<211> LENGTH: 107
<212> TYPE: PRT
<213> ORGANISM: Artificial Sequence
<220> FEATURE:
<223> OTHER INFORMATION: L1 clone 5034 VL

<400> SEQUENCE: 17

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys
            100                 105

<210> SEQ ID NO 18
<211> LENGTH: 222
<212> TYPE: PRT
<213> ORGANISM: Artificial Sequence
```

<220> FEATURE:
<223> OTHER INFORMATION: L1 cone 5037 Full

<400> SEQUENCE: 18

Asp Tyr Lys Asp Asp Asp Lys Asp Ile Gln Met Thr Gln Ser Pro
1               5                   10                  15

Ser Ser Leu Ser Ala Ser Val Gly Asp Arg Val Thr Ile Thr Cys Arg
            20                  25                  30

Ala Ser Gln Asp Val Asn Thr Ala Val Ala Trp Tyr Gln Gln Lys Pro
        35                  40                  45

Gly Lys Ala Pro Lys Leu Leu Ile Tyr Ser Ala Ser Phe Leu Tyr Ser
    50                  55                  60

Gly Val Pro Ser Arg Phe Ser Gly Ser Arg Ser Gly Thr Asp Phe Thr
65                  70                  75                  80

Leu Thr Ile Ser Ser Leu Gln Pro Glu Asp Phe Ala Thr Tyr Tyr Cys
                85                  90                  95

Gln Gln His Tyr Thr Thr Pro Pro Thr Phe Gly Gln Gly Thr Lys Val
            100                 105                 110

Glu Ile Lys Arg Thr Val Ala Ala Pro Ser Val Phe Ile Phe Pro Pro
        115                 120                 125

Ser Asp Glu Arg Leu Lys Ser Gly Thr Ala Ser Val Val Cys Leu Leu
    130                 135                 140

Asn Asn Phe Tyr Pro Arg Glu Ala Lys Val Gln Trp Lys Val Asp Asn
145                 150                 155                 160

Ala Leu Gln Ser Gly Asn Ser Lys Glu Ser Val Thr Glu Gln Asp Ser
                165                 170                 175

Lys Asp Ser Thr Tyr Ser Leu Ser Ser Arg Leu Thr Leu Ser Lys Ala
            180                 185                 190

Asp Tyr Glu Lys His Lys Val Tyr Ala Cys Glu Val Thr His Gln Gly
        195                 200                 205

Leu Ser Ser Pro Val Thr Lys Ser Phe Asn Arg Gly Glu Cys
    210                 215                 220

<210> SEQ ID NO 19
<211> LENGTH: 666
<212> TYPE: DNA
<213> ORGANISM: Artificial Sequence
<220> FEATURE:
<223> OTHER INFORMATION: L1 clone 5037 Full

<400> SEQUENCE: 19
gactacaaag acgacgatga caaagatatc cagatgaccc agtcccctag ctccctgtcc    60
gcttctgtgg gcgatagggt cactattacc tgccgcgcat ctcaggacgt gaacaccgca   120
gtcgcctggt accagcagaa gcctgggaaa gctccaaagc tgctgatcta cagtgcatca   180
ttcctgtatt caggagtgcc cagccggttt agcggcagca gatctggcac cgatttcaca   240
ctgactattt ctagtctgca gcctgaggac tttgccacat actattgcca gcagcactat   300
accacacccc ctactttcgg ccaggggacc aaagtggaga tcaagcgaac tgtggccgct   360
ccaagtgtct tcatttttcc acccagcgat gaaagactga agtccggcac agcttctgtg   420
gtctgtctgc tgaacaattt ttaccccaga gaggccaaag tgcagtggaa ggtcgacaac   480
gctctgcaga gtggcaacag caaggagagc gtgacagaac aggattccaa agactctact   540
tatagtctgt caagcagact gacactgagc aaggcagact acgaaaagca taaagtgtat   600
gcctgtgagg tcacacatca ggggctgtca tcaccagtca ccaaatcatt caatcggggg   660

-continued

```
gagtgc                                                              666
```

<210> SEQ ID NO 20
<211> LENGTH: 107
<212> TYPE: PRT
<213> ORGANISM: Artificial Sequence
<220> FEATURE:
<223> OTHER INFORMATION: L1 clone 5037 VL

<400> SEQUENCE: 20

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys
            100                 105

<210> SEQ ID NO 21
<211> LENGTH: 6
<212> TYPE: PRT
<213> ORGANISM: Artificial Sequence
<220> FEATURE:
<223> OTHER INFORMATION: L1 clone 5037 CDRL1

<400> SEQUENCE: 21

Gln Asp Val Asn Thr Ala
1               5

<210> SEQ ID NO 22
<211> LENGTH: 9
<212> TYPE: PRT
<213> ORGANISM: Artificial Sequence
<220> FEATURE:
<223> OTHER INFORMATION: L1 clone 5037 CDRL3

<400> SEQUENCE: 22

Gln Gln His Tyr Thr Thr Pro Pro Thr
1               5

<210> SEQ ID NO 23
<211> LENGTH: 3
<212> TYPE: PRT
<213> ORGANISM: Artificial Sequence
<220> FEATURE:
<223> OTHER INFORMATION: L1 clone 5037 CDRL2

<400> SEQUENCE: 23

Ser Ala Ser
1

<210> SEQ ID NO 24
<211> LENGTH: 214
<212> TYPE: PRT
<213> ORGANISM: Artificial Sequence
<220> FEATURE:
<223> OTHER INFORMATION: L1 clone 3382 Full

<400> SEQUENCE: 24

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Tyr Pro Ala
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
210

<210> SEQ ID NO 25
<211> LENGTH: 642
<212> TYPE: DNA
<213> ORGANISM: Artificial Sequence
<220> FEATURE:
<223> OTHER INFORMATION: L1 clone 3382 Full

<400> SEQUENCE: 25
gatattcaga tgacccagtc cccaagctcc ctgagtgcct cagtgggcga ccgagtcacc      60
atcacatgca aggcttccca ggatgtgtct attggagtcg catggtacca gcagaagcca     120
ggcaaagcac ccaagctgct gatctatagc gcctcctacc ggtataccgg cgtgccctct     180
agattctctg gcagtgggtc aggaacagac tttactctga ccatctctag tctgcagcct     240
gaggatttcg ctacctacta ttgccagcag tactatatct acccagccac ctttggccag     300
gggacaaaag tggagatcaa gaggactgtg gccgctccct ccgtcttcat tttccccct     360
tctgacgaac agctgaaaag tggcacagcc agcgtggtct gtctgctgaa caatttctac     420
cctcgcgaag ccaaagtgca gtggaaggtc gataacgctc tgcagagcgg caacagccag     480
gagtctgtga ctgaacagga cagtaaagat tcaacctata gcctgtcaag cacactgact     540
ctgagcaagg cagactacga gaagcacaaa gtgtatgcct gcgaagtcac acatcagggg     600
ctgtcctctc ctgtgactaa gagctttaac agaggagagt gt                        642

<210> SEQ ID NO 26

```
<211> LENGTH: 107
<212> TYPE: PRT
<213> ORGANISM: Artificial Sequence
<220> FEATURE:
<223> OTHER INFORMATION: L1 clone 3382 VL

<400> SEQUENCE: 26

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Tyr Pro Ala
                85                  90                  95

Thr Phe Gly Gln Gly Thr Lys Val Glu Ile Lys
            100                 105

<210> SEQ ID NO 27
<211> LENGTH: 6
<212> TYPE: PRT
<213> ORGANISM: Artificial Sequence
<220> FEATURE:
<223> OTHER INFORMATION: L1 clone 3382 CDRL1

<400> SEQUENCE: 27

Gln Asp Val Ser Ile Gly
1               5

<210> SEQ ID NO 28
<211> LENGTH: 9
<212> TYPE: PRT
<213> ORGANISM: Artificial Sequence
<220> FEATURE:
<223> OTHER INFORMATION: L1 clone 3382 CDRL3

<400> SEQUENCE: 28

Gln Gln Tyr Tyr Ile Tyr Pro Ala Thr
1               5

<210> SEQ ID NO 29
<211> LENGTH: 3
<212> TYPE: PRT
<213> ORGANISM: Artificial Sequence
<220> FEATURE:
<223> OTHER INFORMATION: L1 clone 3382 CDRL2

<400> SEQUENCE: 29

Ser Ala Ser
1

<210> SEQ ID NO 30
<211> LENGTH: 449
<212> TYPE: PRT
<213> ORGANISM: Artificial Sequence
<220> FEATURE:
<223> OTHER INFORMATION: H1 clone 5065 Full

<400> SEQUENCE: 30

Glu Val Gln Leu Val Glu Ser Gly Gly Gly Leu Val Gln Pro Gly Gly
```

-continued

```
1               5                   10                  15
Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
            35                  40                  45

Ala Arg Ile Tyr Pro Thr Asn Gly Tyr Thr Arg Tyr Ala Asp Ser Val
50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
            85                  90                  95

Ser Arg Trp Gly Gly Asp Gly Phe Tyr Ala Met Asp Tyr Trp Gly Gln
            100                 105                 110

Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
            130                 135                 140

Leu Gly Cys Glu Val Thr Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Lys Ser Cys Asp
210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
            275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Val Tyr Pro Pro Ser Arg Asp Glu Leu Thr Lys Asn Gln Val Ser Leu
            355                 360                 365

Thr Cys Leu Val Lys Gly Phe Tyr Pro Ser Asp Ile Ala Val Glu Trp
            370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Ala Leu Val Ser Lys Leu Thr Val Asp
                405                 410                 415

Lys Ser Arg Trp Gln Gln Gly Asn Val Phe Ser Cys Ser Val Met His
            420                 425                 430
```

Glu Ala Leu His Asn His Tyr Thr Gln Lys Ser Leu Ser Leu Ser Pro
        435                 440                 445

Gly

<210> SEQ ID NO 31
<211> LENGTH: 1347
<212> TYPE: DNA
<213> ORGANISM: Artificial Sequence
<220> FEATURE:
<223> OTHER INFORMATION: H1 clone 5065 Full

<400> SEQUENCE: 31

| | | | | | |
|---|---|---|---|---|---|
| gaggtgcagc | tggtcgaaag | cggaggagga | ctggtgcagc | caggagggtc | actgcgactg | 60 |
| agctgcgcag | cttccggctt | caacatcaag | gacacctaca | ttcactgggt | ccgccaggct | 120 |
| cctggaaaag | gcctggagtg | ggtggcacga | atctatccaa | ctaatggata | cacccggtat | 180 |
| gccgactccg | tgaagggccg | gttcaccatt | tctgcagata | caagtaaaaa | cactgcctac | 240 |
| ctgcagatga | acagcctgcg | agccgaagat | acagccgtgt | actattgcag | ccgatgggga | 300 |
| ggcgacggct | tctacgctat | ggattattgg | gggcagggaa | ccctggtcac | agtgagctcc | 360 |
| gcatcaacaa | aggggcctag | cgtgtttcca | ctggcccct | ctagtaaatc | cacctctggg | 420 |
| ggaacagcag | ccctgggatg | tgaggtgacc | gactacttcc | cagagcccgt | cactgtgagc | 480 |
| tggaactccg | gcgccctgac | atctggggtc | catactttc | ctgctgtgct | gcagtcaagc | 540 |
| ggcctgtaca | gcctgtcctc | tgtggtcact | gtgccaagtt | caagcctggg | gactcagacc | 600 |
| tatatctgca | acgtgaatca | caagccatcc | aataccaaag | tcgacaagaa | agtggaaccc | 660 |
| aagtcttgtg | ataaaacaca | tacttgcccc | ccttgtcctg | caccagagct | gctgggagga | 720 |
| ccaagcgtgt | tcctgtttcc | acccaagcct | aaagacaccc | tgatgattag | taggactcca | 780 |
| gaagtcacct | gcgtggtcgt | ggacgtgagc | cacgaggacc | ccgaagtcaa | gttcaactgg | 840 |
| tacgtggatg | gcgtcgaggt | gcataatgcc | aagacaaaac | ccagggagga | acagtacaac | 900 |
| tccacttatc | gcgtcgtgtc | tgtcctgacc | gtgctgcacc | aggactggct | gaacggcaag | 960 |
| gagtataagt | gcaaagtgag | caataaggct | ctgcccgcac | ctatcgagaa | acaatttcc | 1020 |
| aaggctaaag | ggcagcctag | agaaccacag | gtgtacgtgt | accctccatc | tagggacgag | 1080 |
| ctgaccaaga | accaggtcag | tctgacatgt | ctggtgaaag | ggttctatcc | cagcgatatc | 1140 |
| gcagtggagt | gggaatccaa | tggacagcct | gagaacaatt | acaagaccac | accccctgtg | 1200 |
| ctggactctg | atggaagttt | cgccctggtg | agtaagctga | ccgtcgataa | atcacggtgg | 1260 |
| cagcagggca | acgtgttcag | ctgttcagtg | atgcacgaag | cactgcacaa | ccactacacc | 1320 |
| cagaaaagcc | tgtccctgtc | ccccggc | | | | 1347 |

<210> SEQ ID NO 32
<211> LENGTH: 120
<212> TYPE: PRT
<213> ORGANISM: Artificial Sequence
<220> FEATURE:
<223> OTHER INFORMATION: H1 clone 5065 VH

<400> SEQUENCE: 32

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val

```
                35                  40                  45
Ala Arg Ile Tyr Pro Thr Asn Gly Tyr Thr Tyr Ala Asp Ser Val
            50                  55                  60
Lys Gly Arg Phe Thr Ile Ser Ala Asp Thr Ser Lys Asn Thr Ala Tyr
 65                  70                  75                  80
Leu Gln Met Asn Ser Leu Arg Ala Glu Asp Thr Ala Val Tyr Tyr Cys
                85                  90                  95
Ser Arg Trp Gly Gly Asp Gly Phe Tyr Ala Met Asp Tyr Trp Gly Gln
            100                 105                 110
Gly Thr Leu Val Thr Val Ser Ser
        115                 120

<210> SEQ ID NO 33
<211> LENGTH: 8
<212> TYPE: PRT
<213> ORGANISM: Artificial Sequence
<220> FEATURE:
<223> OTHER INFORMATION: H1 clones 5065, 719 CDRH1 and H2 clone 720
      CDRH1

<400> SEQUENCE: 33

Gly Phe Asn Ile Lys Asp Thr Tyr
 1               5

<210> SEQ ID NO 34
<211> LENGTH: 13
<212> TYPE: PRT
<213> ORGANISM: Artificial Sequence
<220> FEATURE:
<223> OTHER INFORMATION: H1 clones 5065, 719 CDRH3 and H2 clone 720
      CDRH3

<400> SEQUENCE: 34

Ser Arg Trp Gly Gly Asp Gly Phe Tyr Ala Met Asp Tyr
 1               5                  10

<210> SEQ ID NO 35
<211> LENGTH: 8
<212> TYPE: PRT
<213> ORGANISM: Artificial Sequence
<220> FEATURE:
<223> OTHER INFORMATION: H1 clones 5065, 719 CDRH2 and H2 clone 720
      CDRH2

<400> SEQUENCE: 35

Ile Tyr Pro Thr Asn Gly Tyr Thr
 1               5

<210> SEQ ID NO 36
<211> LENGTH: 448
<212> TYPE: PRT
<213> ORGANISM: Artificial Sequence
<220> FEATURE:
<223> OTHER INFORMATION: H1 clone 6586 Full

<400> SEQUENCE: 36

Glu Val Gln Leu Val Glu Ser Gly Gly Gly Leu Val Gln Pro Gly Gly
 1               5                  10                  15
Ser Leu Arg Leu Ser Cys Ala Ala Ser Gly Phe Thr Phe Ala Asp Tyr
                20                  25                  30
Thr Met Asp Trp Val Arg Gln Ala Pro Gly Lys Gly Leu Glu Trp Val
            35                  40                  45
Gly Asp Val Asn Pro Asn Ser Gly Gly Ser Ile Tyr Asn Gln Arg Phe
```

```
            50                  55                  60
Lys Gly Arg Phe Thr Phe Ser Val Asp Arg Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asn Leu Gly Pro Ser Phe Tyr Phe Asp Tyr Trp Gly Gln Gly
                100                 105                 110

Thr Leu Val Thr Val Ser Ser Ala Ser Thr Lys Gly Pro Ser Val Phe
                115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
    195                 200                 205

Ser Asn Thr Lys Val Asp Lys Lys Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
                275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Val
                340                 345                 350

Tyr Pro Pro Ser Arg Asp Glu Leu Thr Lys Asn Gln Val Ser Leu Thr
                355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Ala Leu Val Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
                435                 440                 445

<210> SEQ ID NO 37
<211> LENGTH: 1344
<212> TYPE: DNA
<213> ORGANISM: Artificial Sequence
```

<220> FEATURE:
<223> OTHER INFORMATION: H1 clone 6586 Full

<400> SEQUENCE: 37

```
gaggtgcagc tggtggaatc aggagggggc ctggtgcagc ccggagggtc tctgcgactg      60
tcatgtgccg cttctgggtt cactttcgca gactacacaa tggattgggt gcgacaggcc     120
cccggaaagg gactggagtg ggtgggcgat gtcaaccccta attctggcgg gagtatctac    180
aaccagcggt tcaaggggag attcactttt tcagtggaca gaagcaaaaa caccctgtat    240
ctgcagatga acagcctgag ggccgaagat accgctgtct actattgcgc tcgcaatctg    300
ggccccagtt tctactttga ctattggggg cagggaaccc tggtgacagt cagctccgct    360
agcactaagg ggccttccgt gtttccactg gctccctcta gtaaatccac ctctggaggc    420
acagctgcac tgggatgtct ggtgaaggat tacttccctg aaccagtcac agtgagttgg    480
aactcagggg ctctgacaag tggagtccat acttttcccg cagtgctgca gtcaagcgga    540
ctgtactccc tgtcctctgt ggtcaccgtg cctagttcaa gcctgggcac ccagacatat    600
atctgcaacg tgaatcacaa gccatcaaat acaaagtcg acaagaaagt ggagcccaag    660
agctgtgata aaactcatac ctgcccacct tgtccggcgc cagaactgct gggaggacca    720
agcgtgttcc tgtttccacc caagcctaaa gacaccctga tgatttcccg gactcctgag    780
gtcacctgcg tggtcgtgga cgtgtctcac gaggaccccg aagtcaagtt caactggtac    840
gtggatggcg tcgaagtgca taatgccaag accaaacccc gggaggaaca gtacaactct    900
acctatagag tcgtgagtgt cctgacagtg ctgcaccagg actggctgaa tgggaaggag    960
tataagtgta agtgagcaa caaagccctg cccgccccaa tcgaaaaaac aatctctaaa   1020
gcaaaaggac agcctcgcga accacaggtc tacgtctacc ccccatcaag agatgaactg   1080
acaaaaaatc aggtctctct gacatgcctg gtcaaaggat tctacccttc cgacatcgcc   1140
gtggagtggg aaagtaacgg ccagcccgag aacaattaca agaccacacc ccctgtcctg   1200
gactctgatg ggagtttcgc tctggtgtca aagctgaccg tcgataaaag ccggtggcag   1260
cagggcaatg tgtttagctg ctccgtcatg cacgaagccc tgcacaatca ctacacacag   1320
aagtccctga gcctgagccc tggc                                          1344
```

<210> SEQ ID NO 38
<211> LENGTH: 119
<212> TYPE: PRT
<213> ORGANISM: Artificial Sequence
<220> FEATURE:
<223> OTHER INFORMATION: H1 clone 6586 VH

<400> SEQUENCE: 38

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ala Asp Tyr
            20                  25                  30

Thr Met Asp Trp Val Arg Gln Ala Pro Gly Lys Gly Leu Glu Trp Val
        35                  40                  45

Gly Asp Val Asn Pro Asn Ser Gly Gly Ser Ile Tyr Asn Gln Arg Phe
    50                  55                  60

Lys Gly Arg Phe Thr Phe Ser Val Asp Arg Ser Lys Asn Thr Leu Tyr
65                  70                  75                  80

Leu Gln Met Asn Ser Leu Arg Ala Glu Asp Thr Ala Val Tyr Tyr Cys
                85                  90                  95
```

```
Ala Arg Asn Leu Gly Pro Ser Phe Tyr Phe Asp Tyr Trp Gly Gln Gly
            100                 105                 110

Thr Leu Val Thr Val Ser Ser
        115

<210> SEQ ID NO 39
<211> LENGTH: 8
<212> TYPE: PRT
<213> ORGANISM: Artificial Sequence
<220> FEATURE:
<223> OTHER INFORMATION: H1 clone 6586 CDRH1

<400> SEQUENCE: 39

Gly Phe Thr Phe Ala Asp Tyr Thr
1               5

<210> SEQ ID NO 40
<211> LENGTH: 12
<212> TYPE: PRT
<213> ORGANISM: Artificial Sequence
<220> FEATURE:
<223> OTHER INFORMATION: H1 clone 6586 CDRH3

<400> SEQUENCE: 40

Ala Arg Asn Leu Gly Pro Ser Phe Tyr Phe Asp Tyr
1               5                   10

<210> SEQ ID NO 41
<211> LENGTH: 8
<212> TYPE: PRT
<213> ORGANISM: Artificial Sequence
<220> FEATURE:
<223> OTHER INFORMATION: H1 clone 6586 CDRH2

<400> SEQUENCE: 41

Val Asn Pro Asn Ser Gly Gly Ser
1               5

<210> SEQ ID NO 42
<211> LENGTH: 226
<212> TYPE: PRT
<213> ORGANISM: Artificial Sequence
<220> FEATURE:
<223> OTHER INFORMATION: L2 clone 3904 Full

<400> SEQUENCE: 42

Tyr Pro Tyr Asp Val Pro Asp Tyr Ala Thr Gly Ser Asp Ile Gln Met
1               5                   10                  15

Thr Gln Ser Pro Ser Ser Leu Ser Ala Ser Val Gly Asp Arg Val Thr
            20                  25                  30

Ile Thr Cys Lys Ala Ser Gln Asp Val Ser Ile Gly Val Ala Trp Tyr
        35                  40                  45

Gln Gln Lys Pro Gly Lys Ala Pro Lys Leu Leu Ile Tyr Ser Ala Ser
    50                  55                  60

Tyr Arg Tyr Thr Gly Val Pro Ser Arg Phe Ser Gly Ser Gly Ser Gly
65                  70                  75                  80

Thr Asp Phe Thr Leu Thr Ile Ser Ser Leu Gln Pro Glu Asp Phe Ala
                85                  90                  95

Thr Tyr Tyr Cys Gln Gln Tyr Tyr Ile Tyr Pro Tyr Thr Phe Gly Gln
            100                 105                 110

Gly Thr Lys Val Glu Ile Lys Arg Thr Val Ala Ala Pro Ser Val Phe
        115                 120                 125
```

Ile Phe Pro Pro Ser Asp Glu Glu Leu Lys Ser Gly Thr Ala Ser Val
130                 135                 140

Val Cys Leu Leu Asn Asn Phe Tyr Pro Arg Glu Ala Lys Val Gln Trp
145                 150                 155                 160

Lys Val Asp Asn Ala Leu Gln Ser Gly Asn Ser Glu Glu Ser Val Thr
            165                 170                 175

Glu Gln Asp Ser Lys Asp Ser Thr Tyr Ser Leu Ser Ser Thr Leu Glu
            180                 185                 190

Leu Ser Lys Ala Asp Tyr Glu Lys His Lys Val Tyr Ala Cys Glu Val
            195                 200                 205

Thr His Gln Gly Leu Ser Ser Pro Val Thr Lys Ser Phe Asn Arg Gly
210                 215                 220

Glu Cys
225

<210> SEQ ID NO 43
<211> LENGTH: 678
<212> TYPE: DNA
<213> ORGANISM: Artificial Sequence
<220> FEATURE:
<223> OTHER INFORMATION: L2 clone 3904 Full

<400> SEQUENCE: 43
tatccctacg atgtgcctga ctacgctact ggctccgata tccagatgac ccagtctcca     60
agctccctga gtgcatcagt gggggaccga gtcaccatca catgcaaggc ttcccaggat    120
gtgtctattg gagtcgcatg gtaccagcag aagccaggca agcacccaa gctgctgatc     180
tacagcgcct cctaccggta tactggggtg ccttccagat tctctggcag tgggtcagga    240
accgacttta ctctgaccat ctctagtctg cagcccgagg atttcgccac ctactattgc    300
cagcagtact atatctaccc ttatacctt ggccagggga caaaagtgga gatcaagagg     360
acagtggccg ctccaagtgt cttcattttt ccccccttccg acgaagagct gaaaagtgga    420
actgcttcag tggtctgtct gctgaacaat ttctacccc gcgaagccaa agtgcagtgg    480
aaggtcgata cgctctgca gagcggcaat tccgaggagt ctgtgacaga acaggacagt    540
aaagattcaa cttatagcct gtcaagcaca ctggagctgt ctaaggcaga ctacgagaag    600
cacaaagtgt atgcctgcga agtcaccccat caggggctgt cctctcccgt gacaaagagc    660
tttaacagag gagagtgt                                                   678

<210> SEQ ID NO 44
<211> LENGTH: 107
<212> TYPE: PRT
<213> ORGANISM: Artificial Sequence
<220> FEATURE:
<223> OTHER INFORMATION: L2 clone 3904 VL

<400> SEQUENCE: 44

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Pro Tyr
                    85                  90                  95

Thr Phe Gly Gln Gly Thr Lys Val Glu Ile Lys
                    100                 105

<210> SEQ ID NO 45
<211> LENGTH: 481
<212> TYPE: PRT
<213> ORGANISM: Artificial Sequence
<220> FEATURE:
<223> OTHER INFORMATION: H1 clone 719 Full

<400> SEQUENCE: 45

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
                20                  25                  30

Val Ala Trp Tyr Gln Gln Lys Pro Gly Lys Ala Pro Lys Leu Leu Ile
            35                  40                  45

Tyr Ser Ala Ser Phe Leu Tyr Ser Gly Val Pro Ser Arg Phe Ser Gly
        50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Gly Gly Ser Gly Gly
                100                 105                 110

Gly Ser Gly Gly Gly Ser Gly Gly Ser Gly Gly Ser Gly Glu
            115                 120                 125

Val Gln Leu Val Glu Ser Gly Gly Leu Val Gln Pro Gly Gly Ser
        130                 135                 140

Leu Arg Leu Ser Cys Ala Ala Ser Gly Phe Asn Ile Lys Asp Thr Tyr
145                 150                 155                 160

Ile His Trp Val Arg Gln Ala Pro Gly Lys Gly Leu Glu Trp Val Ala
                165                 170                 175

Arg Ile Tyr Pro Thr Asn Gly Tyr Thr Arg Tyr Ala Asp Ser Val Lys
            180                 185                 190

Gly Arg Phe Thr Ile Ser Ala Asp Thr Ser Lys Asn Thr Ala Tyr Leu
        195                 200                 205

Gln Met Asn Ser Leu Arg Ala Glu Asp Thr Ala Val Tyr Tyr Cys Ser
    210                 215                 220

Arg Trp Gly Gly Asp Gly Phe Tyr Ala Met Asp Tyr Trp Gly Gln Gly
225                 230                 235                 240

Thr Leu Val Thr Val Ser Ser Ala Ala Glu Pro Lys Ser Ser Asp Lys
                245                 250                 255

Thr His Thr Cys Pro Pro Cys Pro Ala Pro Glu Leu Leu Gly Gly Pro
            260                 265                 270

Ser Val Phe Leu Phe Pro Pro Lys Pro Lys Asp Thr Leu Met Ile Ser
        275                 280                 285

Arg Thr Pro Glu Val Thr Cys Val Val Val Asp Val Ser His Glu Asp
    290                 295                 300

Pro Glu Val Lys Phe Asn Trp Tyr Val Asp Gly Val Glu Val His Asn
305                 310                 315                 320

Ala Lys Thr Lys Pro Arg Glu Glu Gln Tyr Asn Ser Thr Tyr Arg Val
                325                 330                 335

```
Val Ser Val Leu Thr Val Leu His Gln Asp Trp Leu Asn Gly Lys Glu
            340                 345                 350

Tyr Lys Cys Lys Val Ser Asn Lys Ala Leu Pro Ala Pro Ile Glu Lys
            355                 360                 365

Thr Ile Ser Lys Ala Lys Gly Gln Pro Arg Glu Pro Gln Val Tyr Thr
    370                 375                 380

Tyr Pro Pro Ser Arg Asp Glu Leu Thr Lys Asn Gln Val Ser Leu Thr
385                 390                 395                 400

Cys Leu Val Lys Gly Phe Tyr Pro Ser Asp Ile Ala Val Glu Trp Glu
                405                 410                 415

Ser Asn Gly Gln Pro Glu Asn Asn Tyr Lys Thr Thr Pro Pro Val Leu
            420                 425                 430

Asp Glu Asp Gly Ser Phe Ala Leu Val Ser Lys Leu Thr Val Asp Lys
            435                 440                 445

Ser Arg Trp Gln Gln Gly Asn Val Phe Ser Cys Ser Val Met His Glu
    450                 455                 460

Ala Leu His Asn His Tyr Thr Gln Lys Ser Leu Ser Leu Ser Pro Gly
465                 470                 475                 480

Lys
```

<210> SEQ ID NO 46
<211> LENGTH: 1443
<212> TYPE: DNA
<213> ORGANISM: Artificial Sequence
<220> FEATURE:
<223> OTHER INFORMATION: H1 clone 719 Full

<400> SEQUENCE: 46

```
gacatccaga tgacccagtc tccatcctcc ctgtctgcat ctgtaggaga cagagtcacc     60
atcacttgcc gggcaagtca ggacgttaac accgctgtag cttggtatca gcagaaacca    120
gggaaagccc ctaagctcct gatctattct gcatcctttt tgtacagtgg ggtcccatca    180
aggttcagtg gcagtcgatc tgggacagat ttcactctca ccatcagcag tctgcaacct    240
gaagattttg caacttacta ctgtcaacag cattacacta ccccacccac tttcggccaa    300
gggaccaaag tggagatcaa aggtggttct ggtggtggtt ctggtggtgg ttctggtggt    360
ggttctggtg gtggttctgg tgaagtgcag ctggtggagt ctgggggagg cttggtacag    420
cctggcgggt ccctgagact ctcctgtgca gcctctggat tcaacattaa agatacttat    480
atccactggg tccggcaagc tccagggaag gcctggagt gggtcgcacg tatttatccc    540
acaaatggtt acacacggta tgcggactct gtgaagggcc gattcaccat ctccgcagac    600
acttccaaga acaccgcgta tctgcaaatg aacagtctga gctgaggga cacggccgtt    660
tattactgtt caagatgggg cggagacggt ttctacgcta tggactactg gggccaaggg    720
accctggtca ccgtctcctc agccgccgag cccaagagca cgataagac ccacacctgc    780
cctccctgtc cagctccaga actgctggga ggacctagcg tgttcctgtt ccccctaag    840
ccaaaagaca ctctgatgat ttccaggact cccgaggtga cctgcgtggt ggtggacgtg    900
tctcacgagg accccgaagt gaagttcaac tggtacgtgg atggcgtgga agtgcataat    960
gctaagacaa accaagaga ggaacagtac aactccactt atcgcgtcgt gagcgtgctg   1020
accgtgctgc accaggactg gctgaacggg aaggagtata agtgcaaagt cagtaataag   1080
gccctgcctg ctccaatcga aaaaaccatc tctaaggcca aaggcagcc aagggagccc   1140
caggtgtaca catacccacc cagcagagac gaactgacca gaaccaggt gtccctgaca   1200
```

```
tgtctggtga aaggcttcta tcctagtgat attgctgtgg agtgggaatc aaatggacag    1260
ccagagaaca attacaagac cacacctcca gtgctggacg aggatggcag cttcgccctg    1320
gtgtccaagc tgacagtgga taaatctcga tggcagcagg ggaacgtgtt tagttgttca    1380
gtgatgcatg aagccctgca caatcattac actcagaaga gcctgtccct gtctcccggc    1440
aaa                                                                   1443
```

<210> SEQ ID NO 47
<211> LENGTH: 107
<212> TYPE: PRT
<213> ORGANISM: Artificial Sequence
<220> FEATURE:
<223> OTHER INFORMATION: H1 clone 719 VL

<400> SEQUENCE: 47

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys
            100                 105
```

<210> SEQ ID NO 48
<211> LENGTH: 120
<212> TYPE: PRT
<213> ORGANISM: Artificial Sequence
<220> FEATURE:
<223> OTHER INFORMATION: H1 clone 719 VH

<400> SEQUENCE: 48

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser
        115                 120
```

<210> SEQ ID NO 49
<211> LENGTH: 481

<212> TYPE: PRT
<213> ORGANISM: Artificial Sequence
<220> FEATURE:
<223> OTHER INFORMATION: H2 clone 720 Full

<400> SEQUENCE: 49

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Gly Gly Ser Gly Gly
            100                 105                 110

Gly Ser Gly Gly Gly Ser Gly Gly Gly Ser Gly Gly Gly Ser Gly Glu
        115                 120                 125

Val Gln Leu Val Glu Ser Gly Gly Gly Leu Val Gln Pro Gly Gly Ser
130                 135                 140

Leu Arg Leu Ser Cys Ala Ala Ser Gly Phe Asn Ile Lys Asp Thr Tyr
145                 150                 155                 160

Ile His Trp Val Arg Gln Ala Pro Gly Lys Gly Leu Glu Trp Val Ala
                165                 170                 175

Arg Ile Tyr Pro Thr Asn Gly Tyr Thr Arg Tyr Ala Asp Ser Val Lys
            180                 185                 190

Gly Arg Phe Thr Ile Ser Ala Asp Thr Ser Lys Asn Thr Ala Tyr Leu
        195                 200                 205

Gln Met Asn Ser Leu Arg Ala Glu Asp Thr Ala Val Tyr Tyr Cys Ser
210                 215                 220

Arg Trp Gly Gly Asp Gly Phe Tyr Ala Met Asp Tyr Trp Gly Gln Gly
225                 230                 235                 240

Thr Leu Val Thr Val Ser Ser Ala Ala Glu Pro Lys Ser Ser Asp Lys
                245                 250                 255

Thr His Thr Cys Pro Pro Cys Pro Ala Pro Glu Leu Leu Gly Gly Pro
            260                 265                 270

Ser Val Phe Leu Phe Pro Pro Lys Pro Lys Asp Thr Leu Met Ile Ser
        275                 280                 285

Arg Thr Pro Glu Val Thr Cys Val Val Val Asp Val Ser His Glu Asp
290                 295                 300

Pro Glu Val Lys Phe Asn Trp Tyr Val Asp Gly Val Glu Val His Asn
305                 310                 315                 320

Ala Lys Thr Lys Pro Arg Glu Glu Gln Tyr Asn Ser Thr Tyr Arg Val
                325                 330                 335

Val Ser Val Leu Thr Val Leu His Gln Asp Trp Leu Asn Gly Lys Glu
            340                 345                 350

Tyr Lys Cys Lys Val Ser Asn Lys Ala Leu Pro Ala Pro Ile Glu Lys
        355                 360                 365

Thr Ile Ser Lys Ala Lys Gly Gln Pro Arg Glu Pro Gln Val Tyr Thr
370                 375                 380

```
Leu Pro Pro Ser Arg Asp Glu Leu Thr Lys Asn Gln Val Ser Leu Ile
385                 390                 395                 400

Cys Leu Val Lys Gly Phe Tyr Pro Ser Asp Ile Ala Val Glu Trp Glu
            405                 410                 415

Ser Asn Gly Gln Pro Glu Asn Arg Tyr Met Thr Trp Pro Pro Val Leu
            420                 425                 430

Asp Ser Asp Gly Ser Phe Phe Leu Tyr Ser Lys Leu Thr Val Asp Lys
            435                 440                 445

Ser Arg Trp Gln Gln Gly Asn Val Phe Ser Cys Ser Val Met His Glu
    450                 455                 460

Ala Leu His Asn His Tyr Thr Gln Lys Ser Leu Ser Leu Ser Pro Gly
465                 470                 475                 480

Lys

<210> SEQ ID NO 50
<211> LENGTH: 1443
<212> TYPE: DNA
<213> ORGANISM: Artificial Sequence
<220> FEATURE:
<223> OTHER INFORMATION: H2 clone 720 Full

<400> SEQUENCE: 50
gacatccaga tgacccagtc tccatcctcc ctgtctgcat ctgtaggaga cagagtcacc      60
atcacttgcc gggcaagtca ggacgttaac accgctgtag cttggtatca gcagaaacca     120
gggaaagccc ctaagctcct gatctattct gcatcctttt tgtacagtgg ggtcccatca     180
aggttcagtg gcagtcgatc tgggacagat ttcactctca ccatcagcag tctgcaacct     240
gaagattttg caacttacta ctgtcaacag cattacacta ccccacccac tttcggccaa     300
gggaccaaag tggagatcaa aggtggttct ggtggtggtt ctggtggtgg ttctggtggt     360
ggttctggtg gtggttctgg tgaagtgcag ctggtggagt ctggggagg cttggtacag     420
cctggcgggt ccctgagact ctcctgtgca gcctctggat tcaacattaa agatacttat     480
atccactggg tccggcaagc tccagggaag ggcctggagt gggtcgcacg tatttatccc     540
acaaatggtt acacacggta tgcggactct gtgaagggcc gattcaccat ctccgcagac     600
acttccaaga acaccgcgta tctgcaaatg aacagtctga gctgagga cacggccgtt     660
tattactgtt caagatgggg cggagacggt ttctacgcta tggactactg gggccaaggg     720
accctggtca ccgtctcctc agccgccgag cccaagagca gcgataagac ccacacctgc     780
cctccctgtc cagctccaga actgctggga ggaccagcg tgttcctgtt tccccctaag     840
ccaaaagaca ctctgatgat ttccaggact cccgaggtga cctgcgtggt ggtggacgtg     900
tctcacgagg accccgaagt gaagttcaac tggtacgtgg atggcgtgga agtgcataat     960
gctaagacaa accaagaga ggaacagtac aactccactt atcgcgtcgt gagcgtgctg    1020
accgtgctgc accaggactg gctgaacggg aaggagtata gtgcaaagt cagtaataag    1080
gccctgcctg ctccaatcga aaaaccatc tctaaggcca aggccagcc aagggagccc    1140
caggtgtaca cactgccacc cagcagagac gaactgacca gaaccaggt gtccctgatc    1200
tgtctggtga aggcttcta tcctagtgat attgctgtgg agtgggaatc aaatggacag    1260
ccagagaaca gatacatgac ctggcctcca gtgctggaca gcgatggcag cttcttcctg    1320
tattccaagc tgacagtgga taaatctcga tggcagcagg gaacgtgtt tagttgttca    1380
gtgatgcatg aagccctgca caatcattac actcagaaga gcctgtccct gtctcccggc    1440
aaa                                                                  1443
```

```
<210> SEQ ID NO 51
<211> LENGTH: 107
<212> TYPE: PRT
<213> ORGANISM: Artificial Sequence
<220> FEATURE:
<223> OTHER INFORMATION: H2 clone 720 VL

<400> SEQUENCE: 51
```

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys
            100                 105

```
<210> SEQ ID NO 52
<211> LENGTH: 120
<212> TYPE: PRT
<213> ORGANISM: Artificial Sequence
<220> FEATURE:
<223> OTHER INFORMATION: H2 clone 720 VH

<400> SEQUENCE: 52
```

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser
        115                 120

```
<210> SEQ ID NO 53
<211> LENGTH: 448
<212> TYPE: PRT
<213> ORGANISM: Artificial Sequence
<220> FEATURE:
<223> OTHER INFORMATION: H2 clone 3041 Full

<400> SEQUENCE: 53
```

Glu Val Gln Leu Val Glu Ser Gly Gly Gly Leu Val Gln Pro Gly Gly
1               5                   10                  15

-continued

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
        35                  40                  45

Ala Asp Val Asn Pro Asn Ser Gly Ser Ile Tyr Asn Gln Arg Phe
50                      55                  60

Lys Gly Arg Phe Thr Leu Ser Val Asp Arg Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Gly Pro Ser Phe Tyr Phe Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Val
            340                 345                 350

Leu Pro Pro Ser Arg Asp Glu Leu Thr Lys Asn Gln Val Ser Leu Leu
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Leu Thr Trp Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly

-continued

<210> SEQ ID NO 54
<211> LENGTH: 1344
<212> TYPE: DNA
<213> ORGANISM: Artificial Sequence
<220> FEATURE:
<223> OTHER INFORMATION: H2 clone 3042 Full

<400> SEQUENCE: 54

```
gaagtgcagc tggtcgaatc tggaggagga ctggtgcagc caggagggtc cctgcgcctg      60
tcttgcgccg ctagtggctt cacttttacc gactacacca tggattgggt gcgacaggca     120
cctggaaagg gcctggagtg gtcgccgat gtgaacccaa atagcggagg ctccatctac     180
aaccagcggt tcaagggccg gttcaccctg tcagtggacc ggagcaaaaa cacccctgtat    240
ctgcagatga atagcctgcg agccgaagat actgctgtgt actattgcgc ccggaatctg    300
gggccctcct tctactttga ctattggggg cagggaactc tggtcaccgt gagctccgcc    360
tccaccaagg gaccttctgt gttcccactg gctccctcta gtaaatccac atctggggga    420
actgcagccc tgggctgtct ggtgaaggac tacttcccag agcccgtcac agtgtcttgg    480
aacagtggcg ctctgacttc tggggtccac accttttcctg cagtgctgca gtcaagcggg    540
ctgtacagcc tgtcctctgt ggtcaccgtg ccaagttcaa gcctgggaac acagacttat    600
atctgcaacg tgaatcacaa gccatccaat acaaaagtcg acaagaaagt ggaacccaag    660
tcttgtgata aacccatac atgccccct gtcctgcac agagctgct gggaggacca    720
agcgtgttcc tgtttccacc caagcctaaa gatacactga tgattagtag gaccccagaa    780
gtcacatgcg tggtcgtgga cgtgagccac gaggacccccg aagtcaagtt taactggtac    840
gtggacggcg tcgaggtgca taatgccaag actaaaccca gggaggaaca gtacaacagt    900
acctatcgcg tcgtgtcagt cctgacagtg ctgcatcagg attggctgaa cgggaaagag    960
tataagtgca agtgagcaa taaggctctg cccgcaccta tcgagaaaac aatttccaag   1020
gcaaaaggac agcctagaga accacaggtg tacgtgctgc ctccatcaag ggatgagctg   1080
acaaagaacc aggtcagcct gctgtgtctg gtgaaaggat tctatccctc tgacattgct   1140
gtggagtggg aaagtaatgg ccagcctgag aacaattacc tgacctggcc ccctgtgctg   1200
gactcagatg gcagcttctt tctgtatagc aagctgaccg tcgacaaatc ccggtggcag   1260
caggggaatg tgtttagttg ttcagtcatg cacgaggcac tgcacaacca ttacacccag   1320
aagtcactgt cactgtcacc aggg                                          1344
```

<210> SEQ ID NO 55
<211> LENGTH: 119
<212> TYPE: PRT
<213> ORGANISM: Artificial Sequence
<220> FEATURE:
<223> OTHER INFORMATION: H2 clone 3041 VH

<400> SEQUENCE: 55

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
        35                  40                  45

Ala Asp Val Asn Pro Asn Ser Gly Gly Ser Ile Tyr Asn Gln Arg Phe
    50                  55                  60

```
Lys Gly Arg Phe Thr Leu Ser Val Asp Arg Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asn Leu Gly Pro Ser Phe Tyr Phe Asp Tyr Trp Gly Gln Gly
            100                 105                 110

Thr Leu Val Thr Val Ser Ser
            115

<210> SEQ ID NO 56
<211> LENGTH: 448
<212> TYPE: PRT
<213> ORGANISM: Artificial Sequence
<220> FEATURE:
<223> OTHER INFORMATION: H1 clone 3057 Full

<400> SEQUENCE: 56

Glu Val Gln Leu Val Glu Ser Gly Gly Gly Leu Val Gln Pro Gly Gly
  1               5                  10                  15

Ser Leu Arg Leu Ser Cys Ala Ala Ser Gly Phe Thr Phe Thr Asp Tyr
             20                  25                  30

Thr Met Asp Trp Val Arg Gln Ala Pro Gly Lys Gly Leu Glu Trp Val
         35                  40                  45

Ala Asp Val Asn Pro Asn Ser Gly Gly Ser Ile Tyr Asn Gln Arg Phe
 50                  55                  60

Lys Gly Arg Phe Thr Leu Ser Val Asp Arg Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asn Leu Gly Pro Ser Phe Tyr Phe Asp Tyr Trp Gly Gln Gly
            100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
        130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300
```

```
Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Val
            340                 345                 350

Tyr Pro Pro Ser Arg Asp Glu Leu Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Ala Leu Val Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445
```

<210> SEQ ID NO 57
<211> LENGTH: 1344
<212> TYPE: DNA
<213> ORGANISM: Artificial Sequence
<220> FEATURE:
<223> OTHER INFORMATION: H1 clone 3057 Full

<400> SEQUENCE: 57

```
gaagtgcagc tggtcgaatc tggaggagga ctggtgcagc caggagggtc cctgcgcctg     60
tcttgcgccg ctagtggctt cacttttacc gactacacca tggattgggt cgacaggca    120
cctggaaagg gcctggagtg ggtcgccgat gtgaacccaa atagcggagg ctccatctac   180
aaccagcggt tcaagggccg gttcaccctg tcagtggacc ggagcaaaaa caccctgtat   240
ctgcagatga atagcctgcg agccgaagat actgctgtgt actattgcgc ccggaatctg   300
gggccctcct tctactttga ctattggggg cagggaactc tggtcaccgt gagctccgcc   360
tccaccaagg gaccttctgt gttcccactg gctccctcta gtaaatccac atctggggga   420
actgcagccc tgggctgtct ggtgaaggac tacttcccag agcccgtcac agtgtcttgg   480
aacagtggcg ctctgacttc tggggtccac acctttcctg cagtgctgca gtcaagcggg   540
ctgtacagcc tgtcctctgt ggtcaccgtg ccaagttcaa gcctgggaac acagacttat   600
atctgcaacg tgaatcacaa gccatccaat acaaaagtcg acaagaaagt ggaacccaag   660
tcttgtgata aaacccatac atgccccct tgtcctgcac cagagctgct gggaggacca   720
agcgtgttcc tgtttccacc caagcctaaa gatacactga tgattagtag gacccagaa   780
gtcacatgcg tggtcgtgga cgtgagccac gaggacccg aagtcaagtt taactgtac   840
gtggacggcg tcgaggtgca taatgccaag actaaaccca gggaggaaca gtacaacagt   900
acctatcgcg tcgtgtcagt cctgacagtg ctgcatcagg attggctgaa cgggaaagag   960
tataagtgca agtgagcaa taaggctctg cccgcaccta tcgagaaaac aatttccaag  1020
gcaaaaggac agcctagaga accacaggtg tacgtgtatc ctccatcaag ggatgagctg  1080
acaaagaacc aggtcagcct gacttgtctg gtgaaaggat tctatccctc tgacattgct  1140
gtggagtggg aaagtaatgg ccagcctgag aacaattaca gaccacacc cctgtgctg  1200
gactcagatg gcagcttcgc gctggtgagc aagctgaccg tcgacaaatc ccggtggcag  1260
``` cagggaatg tgtttagttg ttcagtcatg cacgaggcac tgcacaacca ttacacccag    1320
aagtcactgt cactgtcacc aggg                                          1344

<210> SEQ ID NO 58
<211> LENGTH: 119
<212> TYPE: PRT
<213> ORGANISM: Artificial Sequence
<220> FEATURE:
<223> OTHER INFORMATION: H1 clone 3057 VH

<400> SEQUENCE: 58

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
        35                  40                  45

Ala Asp Val Asn Pro Asn Ser Gly Gly Ser Ile Tyr Asn Gln Arg Phe
    50                  55                  60

Lys Gly Arg Phe Thr Leu Ser Val Asp Arg Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Gly Pro Ser Phe Tyr Phe Asp Tyr Trp Gly Gln Gly
            100                 105                 110

Thr Leu Val Thr Val Ser Ser
        115

<210> SEQ ID NO 59
<211> LENGTH: 475
<212> TYPE: PRT
<213> ORGANISM: Artificial Sequence
<220> FEATURE:
<223> OTHER INFORMATION: H1 clone 3317 Full

<400> SEQUENCE: 59

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Tyr Pro Tyr
                85                  90                  95

Thr Phe Gly Gln Gly Thr Lys Val Glu Ile Lys Gly Gly Gly Gly Ser
            100                 105                 110

Gly Gly Gly Gly Ser Gly Gly Gly Ser Glu Val Gln Leu Val Glu
        115                 120                 125

Ser Gly Gly Gly Leu Val Gln Pro Gly Gly Ser Leu Arg Leu Ser Cys
    130                 135                 140

Ala Ala Ser Gly Phe Thr Phe Thr Asp Tyr Thr Met Asp Trp Val Arg
145                 150                 155                 160

Gln Ala Pro Gly Lys Gly Leu Glu Trp Val Ala Asp Val Asn Pro Asn
            165                 170                 175

Ser Gly Gly Ser Ile Tyr Asn Gln Arg Phe Lys Gly Arg Phe Thr Leu
        180                 185                 190

Ser Val Asp Arg Ser Lys Asn Thr Leu Tyr Leu Gln Met Asn Ser Leu
    195                 200                 205

Arg Ala Glu Asp Thr Ala Val Tyr Tyr Cys Ala Arg Asn Leu Gly Pro
210                 215                 220

Ser Phe Tyr Phe Asp Tyr Trp Gly Gln Gly Thr Leu Val Thr Val Ser
225                 230                 235                 240

Ser Ala Ala Glu Pro Lys Ser Ser Asp Lys Thr His Thr Cys Pro Pro
                245                 250                 255

Cys Pro Ala Pro Glu Leu Leu Gly Gly Pro Ser Val Phe Leu Phe Pro
            260                 265                 270

Pro Lys Pro Lys Asp Thr Leu Met Ile Ser Arg Thr Pro Glu Val Thr
        275                 280                 285

Cys Val Val Val Asp Val Ser His Glu Asp Pro Glu Val Lys Phe Asn
    290                 295                 300

Trp Tyr Val Asp Gly Val Glu Val His Asn Ala Lys Thr Lys Pro Arg
305                 310                 315                 320

Glu Glu Gln Tyr Asn Ser Thr Tyr Arg Val Val Ser Val Leu Thr Val
                325                 330                 335

Leu His Gln Asp Trp Leu Asn Gly Lys Glu Tyr Lys Cys Lys Val Ser
            340                 345                 350

Asn Lys Ala Leu Pro Ala Pro Ile Glu Lys Thr Ile Ser Lys Ala Lys
        355                 360                 365

Gly Gln Pro Arg Glu Pro Gln Val Tyr Val Tyr Pro Pro Ser Arg Asp
    370                 375                 380

Glu Leu Thr Lys Asn Gln Val Ser Leu Thr Cys Leu Val Lys Gly Phe
385                 390                 395                 400

Tyr Pro Ser Asp Ile Ala Val Glu Trp Glu Ser Asn Gly Gln Pro Glu
                405                 410                 415

Asn Asn Tyr Lys Thr Thr Pro Pro Val Leu Asp Ser Asp Gly Ser Phe
            420                 425                 430

Ala Leu Val Ser Lys Leu Thr Val Asp Lys Ser Arg Trp Gln Gln Gly
        435                 440                 445

Asn Val Phe Ser Cys Ser Val Met His Glu Ala Leu His Asn His Tyr
    450                 455                 460

Thr Gln Lys Ser Leu Ser Leu Ser Pro Gly Lys
465                 470                 475

<210> SEQ ID NO 60
<211> LENGTH: 1425
<212> TYPE: DNA
<213> ORGANISM: Artificial Sequence
<220> FEATURE:
<223> OTHER INFORMATION: H1 clone 3317 Full

<400> SEQUENCE: 60
gacattcaga tgacccagag ccctagctcc ctgagtgcct cagtcgggga cagggtgact      60
atcacctgca aggcttcaca ggatgtcagc attggcgtgg catggtacca gcagaagcca     120
gggaaagcac ccaagctgct gatctatagc gcctcctaca ggtatacagg cgtgccatcc     180
cgcttctctg gcagtgggtc aggaactgac tttacactga ctatttctag tctgcagccc     240
gaagatttcg ccacatacta ttgccagcag tactatatct acccttatac ttttggccag     300

-continued

```
gggaccaaag tggagattaa gggcggagga ggctccggag gaggagggtc tggaggagga      360
ggaagtgagg tccagctggt ggaatctgga ggaggactgg tgcagccagg agggtccctg      420
aggctgtctt gtgccgctag tggcttcacc tttacagact acacaatgga ttgggtgcgc      480
caggcaccag gaaagggact ggaatgggtc gctgatgtga accctaatag cggaggctcc      540
atctacaacc agcggttcaa aggacggttc accctgtcag tggaccggag caagaacacc      600
ctgtatctgc agatgaacag cctgagagcc gaggatactg ctgtgtacta ttgcgccagg      660
aatctgggcc aagcttcta ctttgactat tgggggcagg gaacactggt cactgtgtca      720
agcgcagccg aacccaaatc tctgataag actcacacct gcccaccttg tccagctcca      780
gagctgctgg gaggacctag cgtgttcctg tttccaccca agccaaaaga cactctgatg      840
atttctagaa cccctgaagt gacatgtgtg gtcgtggacg tcagtcacga ggaccccgaa      900
gtcaaattca actggtacgt ggatggcgtc gaggtgcata atgccaagac caaaccccga      960
gaggaacagt acaactcaac ctatcgggtc gtgagcgtcc tgacagtgct gcatcaggac     1020
tggctgaacg gcaaggagta aagtgcaaa gtgagcaaca aggctctgcc tgcaccaatc     1080
gagaagacca tttccaaggc taagggcag ccccgcgaac ctcaggtcta cgtgtatcct     1140
ccaagccgag atgagctgac aaaaaaccag gtctccctga cttgtctggt aagggatt     1200
tacccaagtg acatcgcagt ggagtgggaa tcaaatggcc agcccgaaaa caattataag     1260
accacacccc ctgtgctgga ctctgatggg agtttcgcac tggtctccaa actgaccgtg     1320
gacaagtctc ggtggcagca gggaaacgtc tttagctgtt ccgtgatgca cgaggccctg     1380
cacaatcatt acacacagaa atctctgagt ctgtcacctg gcaag               1425
```

<210> SEQ ID NO 61
<211> LENGTH: 107
<212> TYPE: PRT
<213> ORGANISM: Artificial Sequence
<220> FEATURE:
<223> OTHER INFORMATION: H1 clone 3317 VL

<400> SEQUENCE: 61

```
Asp Ile Gln Met Thr Gln Ser Pro Ser Ser Leu Ser Ala Ser Val Gly
1               5                  10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ile Tyr Pro Tyr
                85                  90                  95

Thr Phe Gly Gln Gly Thr Lys Val Glu Ile Lys
            100                 105
```

<210> SEQ ID NO 62
<211> LENGTH: 119
<212> TYPE: PRT
<213> ORGANISM: Artificial Sequence
<220> FEATURE:
<223> OTHER INFORMATION: H1 clone 3317 VH

<400> SEQUENCE: 62

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
            35                  40                  45

Ala Asp Val Asn Pro Asn Ser Gly Ser Ile Tyr Asn Gln Arg Phe
50                  55                  60

Lys Gly Arg Phe Thr Leu Ser Val Asp Arg Ser Lys Asn Thr Leu Tyr
65              70                  75                  80

Leu Gln Met Asn Ser Leu Arg Ala Glu Asp Thr Ala Val Tyr Tyr Cys
                85                  90                  95

Ala Arg Asn Leu Gly Pro Ser Phe Tyr Phe Asp Tyr Trp Gly Gln Gly
                100                 105                 110

Thr Leu Val Thr Val Ser Ser
            115
```

```
<210> SEQ ID NO 63
<211> LENGTH: 480
<212> TYPE: PRT
<213> ORGANISM: Artificial Sequence
<220> FEATURE:
<223> OTHER INFORMATION: H2 clone 5244 Full

<400> SEQUENCE: 63

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
            35                  40                  45

Tyr Ser Ala Ser Phe Leu Tyr Ser Gly Val Pro Ser Arg Phe Ser Gly
50                  55                  60

Ser Arg Ser Gly Thr Asp Phe Thr Leu Thr Ile Ser Ser Leu Gln Pro
65              70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Gly Gly Ser Gly Gly
                100                 105                 110

Gly Ser Gly Gly Gly Ser Gly Gly Gly Ser Gly Gly Ser Gly Glu
            115                 120                 125

Val Gln Leu Val Glu Ser Gly Gly Gly Leu Val Gln Pro Gly Gly Ser
130                 135                 140

Leu Arg Leu Ser Cys Ala Ala Ser Gly Phe Asn Ile Lys Asp Thr Tyr
145                 150                 155                 160

Ile His Trp Val Arg Gln Ala Pro Gly Lys Gly Leu Glu Trp Val Ala
                165                 170                 175

Arg Ile Tyr Pro Thr Asn Gly Tyr Thr Arg Tyr Ala Asp Ser Val Lys
                180                 185                 190

Gly Arg Phe Thr Ile Ser Ala Asp Thr Ser Lys Asn Thr Ala Tyr Leu
            195                 200                 205

Gln Met Asn Ser Leu Arg Ala Glu Asp Thr Ala Val Tyr Tyr Cys Ser
210                 215                 220

Arg Trp Gly Gly Asp Gly Phe Tyr Ala Met Asp Tyr Trp Gly Gln Gly
225                 230                 235                 240
```

```
Thr Leu Val Thr Val Ser Ser Ala Ala Glu Pro Lys Ser Ser Asp Lys
                245                 250                 255
Thr His Thr Cys Pro Pro Cys Pro Ala Pro Glu Leu Leu Gly Gly Pro
            260                 265                 270
Ser Val Phe Leu Phe Pro Pro Lys Pro Lys Asp Thr Leu Met Ile Ser
            275                 280                 285
Arg Thr Pro Glu Val Thr Cys Val Val Val Asp Val Ser His Glu Asp
290                 295                 300
Pro Glu Val Lys Phe Asn Trp Tyr Val Asp Gly Val Glu Val His Asn
305                 310                 315                 320
Ala Lys Thr Lys Pro Arg Glu Glu Gln Tyr Asn Ser Thr Tyr Arg Val
                325                 330                 335
Val Ser Val Leu Thr Val Leu His Gln Asp Trp Leu Asn Gly Lys Glu
            340                 345                 350
Tyr Lys Cys Lys Val Ser Asn Lys Ala Leu Pro Ala Pro Ile Glu Lys
            355                 360                 365
Thr Ile Ser Lys Ala Lys Gly Gln Pro Arg Glu Pro Gln Val Tyr Val
        370                 375                 380
Leu Pro Pro Ser Arg Asp Glu Leu Thr Lys Asn Gln Val Ser Leu Leu
385                 390                 395                 400
Cys Leu Val Lys Gly Phe Tyr Pro Ser Asp Ile Ala Val Glu Trp Glu
                405                 410                 415
Ser Asn Gly Gln Pro Glu Asn Asn Tyr Leu Thr Trp Pro Pro Val Leu
            420                 425                 430
Asp Ser Asp Gly Ser Phe Phe Leu Tyr Ser Lys Leu Thr Val Asp Lys
            435                 440                 445
Ser Arg Trp Gln Gln Gly Asn Val Phe Ser Cys Ser Val Met His Glu
        450                 455                 460
Ala Leu His Asn His Tyr Thr Gln Lys Ser Leu Ser Leu Ser Pro Gly
465                 470                 475                 480

<210> SEQ ID NO 64
<211> LENGTH: 1440
<212> TYPE: DNA
<213> ORGANISM: Artificial Sequence
<220> FEATURE:
<223> OTHER INFORMATION: H2 clone 5244 Full

<400> SEQUENCE: 64
gacattcaga tgacacagag ccccagctcc ctgagtgctt cagtcggcga cagggtgact      60
atcacctgcc gcgcatccca ggatgtcaac accgctgtgg catggtacca gcagaagcct     120
ggaaaagccc caaagctgct gatctacagc gcttccttcc tgtattctgg cgtgccaagt     180
cggttttctg gaagtagatc aggcactgac ttcacactga ctatctctag tctgcagccc     240
gaagattttg ccacctacta ttgccagcag cactatacca cccccctac attcggacag     300 ggcactaaag tggagattaa gggcgggtca ggcggaggga gcggaggagg gtccggagga     360
gggtctggag gagggagtgg agaggtccag ctggtggaat ctggaggagg actggtgcag     420
cctggaggct cactgcgact gagctgtgcc gcttccggct ttaacatcaa agacacatac     480
attcattggg tcaggcaggc accagggaag ggactggaat gggtggcccg catctatccc     540
acaaatgggt acactcgata tgccgacagc gtgaaaggac ggtttaccat ttctgctgat     600
accagtaaga cacagcata cctgcagatg aacagcctgc gcgcagagga tacagccgtg     660
tactattgca gtcgatgggg gggagacggc ttctacgcca tggattattg gggccagggg     720
```

```
actctggtca ccgtgtcaag cgcagccgaa cctaaatcct ctgacaagac ccacacatgc    780
ccaccctgtc ctgctccaga gctgctggga ggaccatccg tgttcctgtt tcctccaaag    840
cctaaagata cactgatgat tagccgcact cccgaagtca cctgtgtggt cgtggacgtg    900
tcccacgagg accccgaagt caagttcaac tggtacgtgg acggcgtcga ggtgcataat    960
gccaagacta aaccaagaga ggaacagtac aattcaacct atagggtcgt gagcgtcctg   1020
acagtgctgc atcaggattg gctgaacggc aaggagtata agtgcaaagt gtctaacaag   1080
gccctgcccg ctcctatcga aagactatt agcaaggcaa aagggcagcc acgggaaccc   1140
caggtctacg tgctgccccc tagcagagac gagctgacca aaaaccaggt ctccctgctg   1200
tgtctggtga agggctttta tcctagtgat atcgctgtgg agtgggaatc aaatgggcag   1260
ccagaaaaca attacctgac atggccaccc gtgctggaca cgatgggtc cttctttctg   1320 tattccaaac tgactgtgga caagtctaga tggcagcagg gaaacgtctt cagctgttcc   1380
gtgatgcacg aggccctgca caatcattac acccagaagt ctctgagtct gtcacccggc   1440
```

<210> SEQ ID NO 65
<211> LENGTH: 107
<212> TYPE: PRT
<213> ORGANISM: Artificial Sequence
<220> FEATURE:
<223> OTHER INFORMATION: H2 clone 5244 VL

<400> SEQUENCE: 65

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys
            100                 105
```

<210> SEQ ID NO 66
<211> LENGTH: 120
<212> TYPE: PRT
<213> ORGANISM: Artificial Sequence
<220> FEATURE:
<223> OTHER INFORMATION: H2 clone 5244 VH

<400> SEQUENCE: 66

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
```

```
                65                  70                  75                  80
Leu Gln Met Asn Ser Leu Arg Ala Glu Asp Thr Ala Val Tyr Tyr Cys
                    85                  90                  95
Ser Arg Trp Gly Gly Asp Gly Phe Tyr Ala Met Asp Tyr Trp Gly Gln
            100                 105                 110
Gly Thr Leu Val Thr Val Ser Ser
            115                 120
```

<210> SEQ ID NO 67
<211> LENGTH: 6
<212> TYPE: PRT
<213> ORGANISM: Artificial Sequence
<220> FEATURE:
<223> OTHER INFORMATION: H2 clones 5244,720 CDRL1 and L1 clone 5034
      CDRL1 and H1 clone 719 CDRL1

<400> SEQUENCE: 67

```
Gln Asp Val Asn Thr Ala
1               5
```

<210> SEQ ID NO 68
<211> LENGTH: 3
<212> TYPE: PRT
<213> ORGANISM: Artificial Sequence
<220> FEATURE:
<223> OTHER INFORMATION: H2 clones 5244,720 CDRL2 and L1 clone 5034
      CDRL2 and H1 clone 719 CDRL2

<400> SEQUENCE: 68

```
Ser Ala Ser
1
```

<210> SEQ ID NO 69
<211> LENGTH: 9
<212> TYPE: PRT
<213> ORGANISM: Artificial Sequence
<220> FEATURE:
<223> OTHER INFORMATION: H2 clones 5244,720 CDRL3 and L1 clone 5034
      CDRL3 and H1 clone 719 CDRL3

<400> SEQUENCE: 69

```
Gln Gln His Tyr Thr Thr Pro Pro Thr
1               5
```

<210> SEQ ID NO 70
<211> LENGTH: 8
<212> TYPE: PRT
<213> ORGANISM: Artificial Sequence
<220> FEATURE:
<223> OTHER INFORMATION: H1 clone 5244 CDRH1

<400> SEQUENCE: 70

```
Gly Phe Asn Ile Lys Asp Thr Tyr
1               5
```

<210> SEQ ID NO 71
<211> LENGTH: 8
<212> TYPE: PRT
<213> ORGANISM: Artificial Sequence
<220> FEATURE:
<223> OTHER INFORMATION: H1 clone 5244 CDRH2

<400> SEQUENCE: 71

```
Ile Tyr Pro Thr Asn Gly Tyr Thr
1               5
```

```
<210> SEQ ID NO 72
<211> LENGTH: 13
<212> TYPE: PRT
<213> ORGANISM: Artificial Sequence
<220> FEATURE:
<223> OTHER INFORMATION: H1 clone 5244 CDRH3

<400> SEQUENCE: 72

Ser Arg Trp Gly Gly Asp Gly Phe Tyr Ala Met Asp Tyr
1               5                   10
```